(12) United States Patent
Murabayashi et al.

(10) Patent No.: US 7,630,613 B2
(45) Date of Patent: Dec. 8, 2009

(54) INFORMATION-SIGNAL PROCESS APPARATUS AND INFORMATION-SIGNAL PROCESSING METHOD

(75) Inventors: Noboru Murabayashi, Saitama (JP); Hiroshige Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 976 days.

(21) Appl. No.: 10/501,840

(22) PCT Filed: Jan. 14, 2003

(86) PCT No.: PCT/JP03/00204
§ 371 (c)(1),
(2), (4) Date: Mar. 21, 2005

(87) PCT Pub. No.: WO03/065711
PCT Pub. Date: Aug. 7, 2003

(65) Prior Publication Data
US 2005/0180580 A1    Aug. 18, 2005

(30) Foreign Application Priority Data
Jan. 18, 2002    (JP)    ............ 2002-009777

(51) Int. Cl.
H04N 5/91    (2006.01)
(52) U.S. Cl. .................. 386/69; 386/46; 386/126
(58) Field of Classification Search ........... 386/46, 386/52, 55, 69, 95, 96, 106, 109, 121, 124–126; 348/563; 715/500.1, 203; 345/716, 719, 345/721, 723, 968; 707/1–10, 100–104.1; 709/328–332; 717/162–167; 725/22, 51, 725/91–93, 111, 112, 114, 116, 131–133
See application file for complete search history.

(56) References Cited

U.S. PATENT DOCUMENTS 5,949,955 A * 9/1999 Nakai .................. 386/106

(Continued)

FOREIGN PATENT DOCUMENTS

JP    3-292572    12/1991

(Continued)

OTHER PUBLICATIONS

Patent Abstracts of Japan, 2001-298641, publication date Oct. 26, 2001.

(Continued)

Primary Examiner—Thai Tran
Assistant Examiner—Mishawn Dunn
(74) Attorney, Agent, or Firm—Frommer Lawrence & Haug LLP; William S. Frommer; Thomas F. Presson

(57) ABSTRACT

A recording/reproduction apparatus that effectively and efficiently utilizes a large-quantity information signal recorded onto a recording medium and efficiently utilizing the recording medium for recording the information signal. In a process to record a video signal onto the recording medium, a video classification process unit employed in the recording/reproduction apparatus recognizes similar pictures of the video signal, classifies pictures of the signal into similar-picture segments each including similar pictures and classifies the similar-picture segments into groups each including similar-picture segments resembling each other. Then, the recording/reproduction apparatus displays a picture as a thumbnail picture for each of the similar-picture segments on a classification display unit.

18 Claims, 35 Drawing Sheets

U.S. PATENT DOCUMENTS

| | | | |
|---|---|---|---|
| 6,366,296 B1 * | 4/2002 | Boreczky et al. | 715/719 |
| 6,704,750 B2 * | 3/2004 | Asazu | 707/104.1 |
| 6,751,776 B1 * | 6/2004 | Gong | 715/203 |
| 7,356,830 B1 * | 4/2008 | Dimitrova | 725/51 |

FOREIGN PATENT DOCUMENTS

| | | |
|---|---|---|
| JP | 6 309797 | 11/1994 |
| JP | 7-45050 | 2/1995 |
| JP | 7-59003 | 3/1995 |
| JP | 8 251540 | 9/1996 |
| JP | 9-107517 | 4/1997 |
| JP | 10 32776 | 2/1998 |
| JP | 10 214270 | 8/1998 |
| JP | 10-336574 | 12/1998 |
| JP | 2000 285243 | 10/2000 |
| JP | 2001 177806 | 6/2001 |
| JP | 2001-218164 | 8/2001 |
| JP | 2003-61035 | 2/2003 |

OTHER PUBLICATIONS

Patent Abstracts of Japan, 11-136573, publication date May 21, 1999.
Patent Abstracts of Japan, 10-243323, publication date Sep. 11, 1998.

* cited by examiner

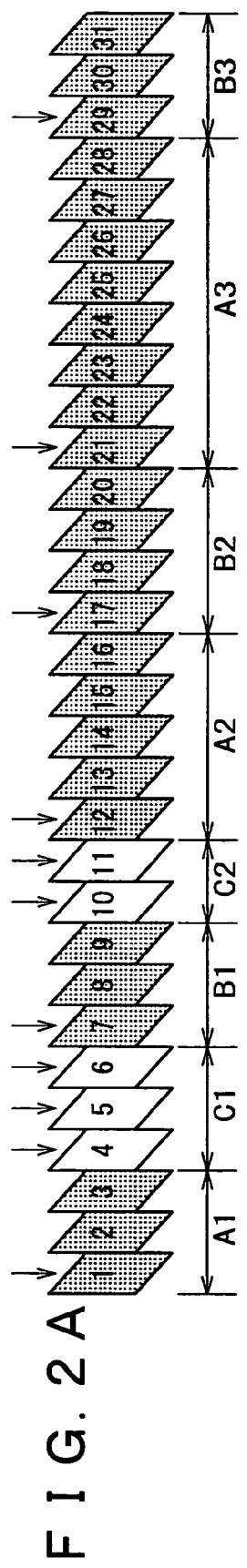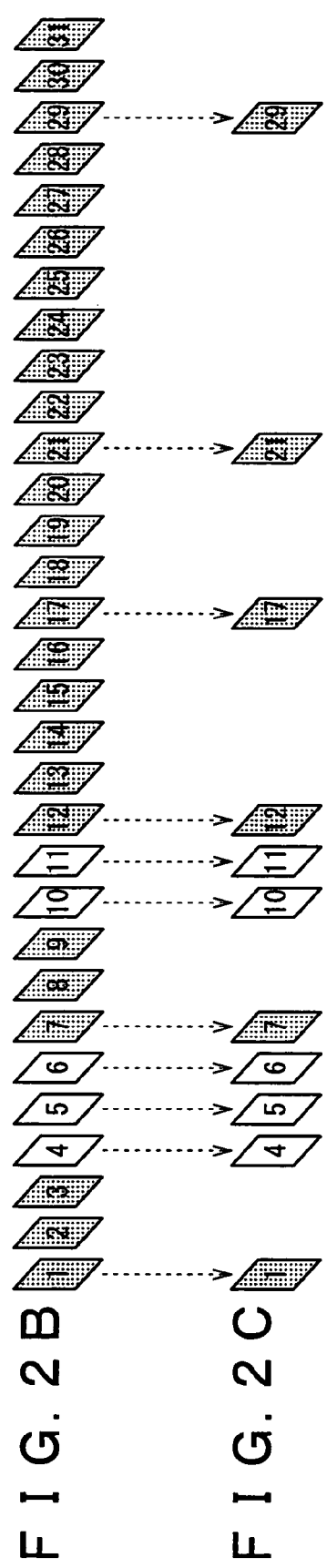
F I G. 2A  F I G. 2B  F I G. 2C

F I G. 3

|    | r1 | r2 | r3 | r4 | r5 | r6 | r7 | r8 |
|----|----|----|----|----|----|----|----|----|
| c1 | 1  | 12 | 13 |    |    |    |    |    |
| c2 | 7  | 17 | 29 |    |    |    |    |    |
| c3 | 4  | 10 |    |    |    |    |    |    |
| c4 |    |    |    |    |    |    |    |    |
| c5 |    |    |    |    |    |    |    |    |
| c6 |    |    |    |    |    |    |    |    |
| c7 |    |    |    |    |    |    |    |    |
| c8 |    |    |    |    |    |    |    |    |

FIG. 5

| a0  | a1  | a2  | a3  | a4  |
|-----|-----|-----|-----|-----|
| a5  | a6  | a7  | a8  | a9  |
| a10 | a11 | a12 | a13 | a14 |
| a15 | a16 | a17 | a18 | a19 |
| a20 | a21 | a22 | a23 | a24 |

FIG. 6

$$Ay = (ay0, ay1, \cdots\cdots, ay24) \quad \cdots (1)$$
$$Ab = (acb0, acb1, \cdots\cdots, acb24) \quad \cdots (2)$$
$$Ar = (acr0, acr1, \cdots\cdots, acr24) \quad \cdots (3)$$
$$Vd = \Sigma \left( |Ay - Ayt| + |Ab - Abt| + |Ar - Art| \right) \cdots (4)$$

F I G. 8
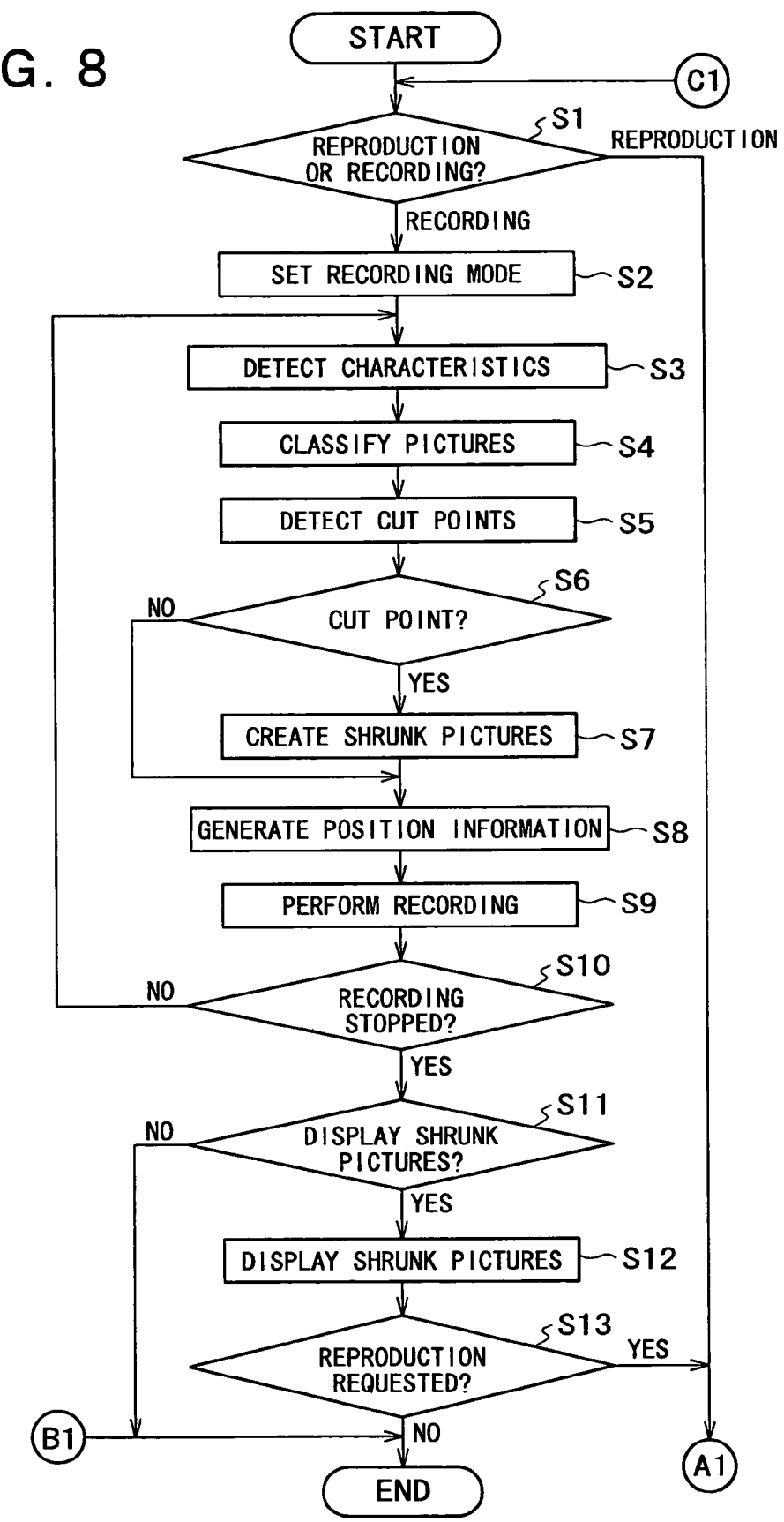

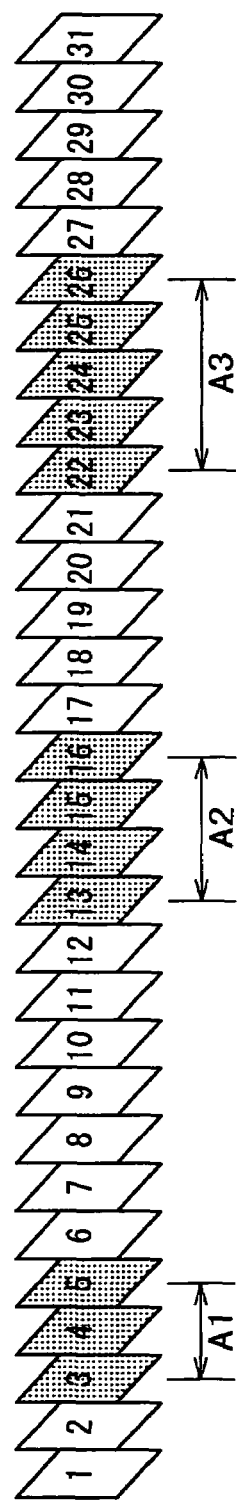
F I G. 13 A
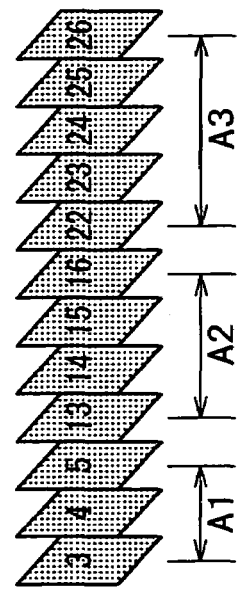
F I G. 13 B

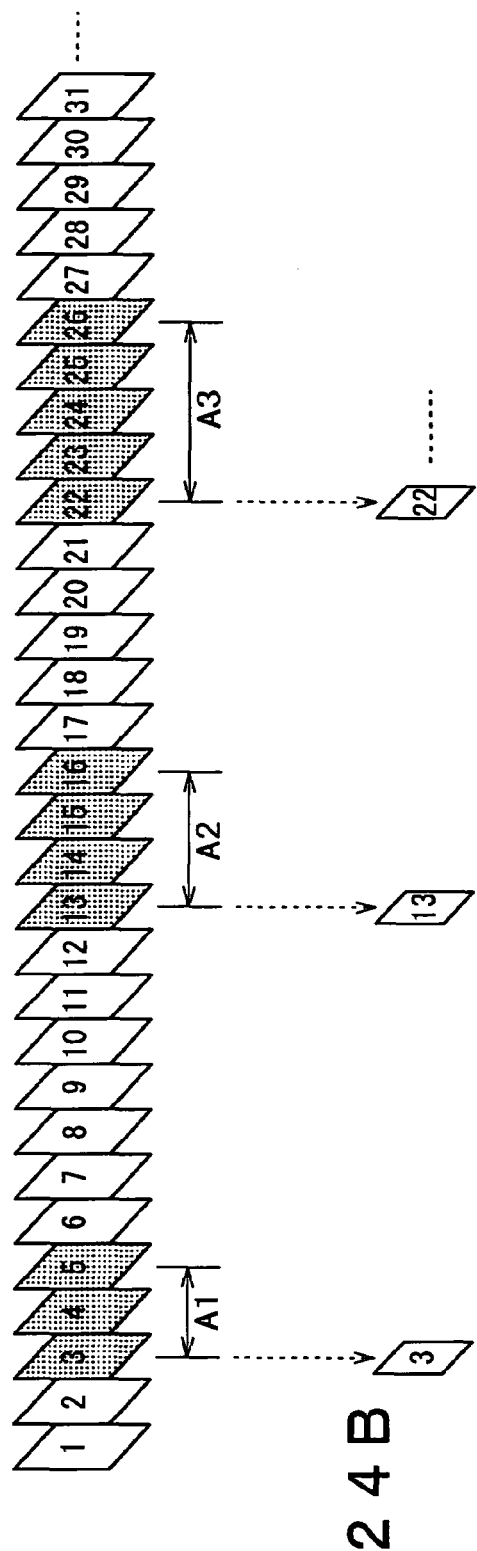
F I G. 2 4 A
F I G. 2 4 B

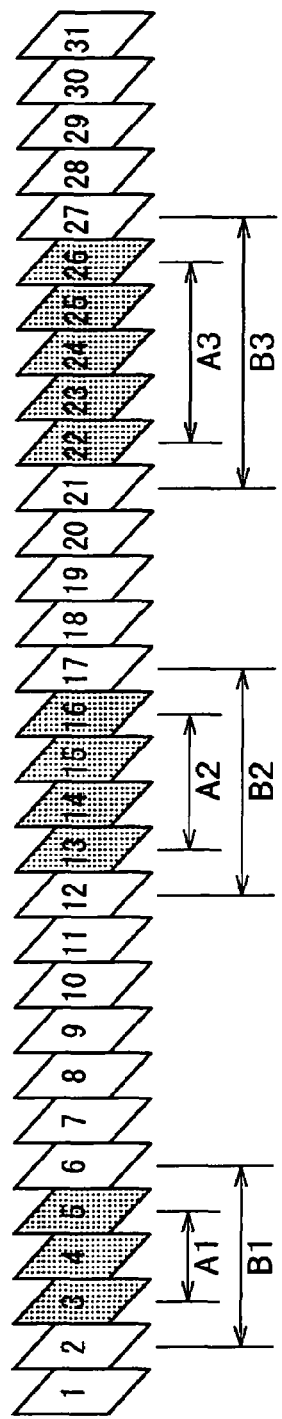
F I G. 2 8 A
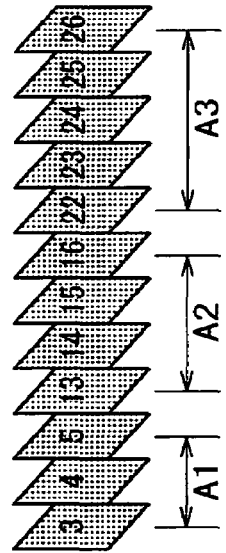
F I G. 2 8 B
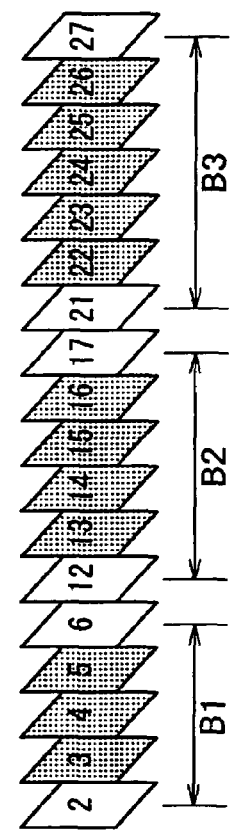
F I G. 2 8 C

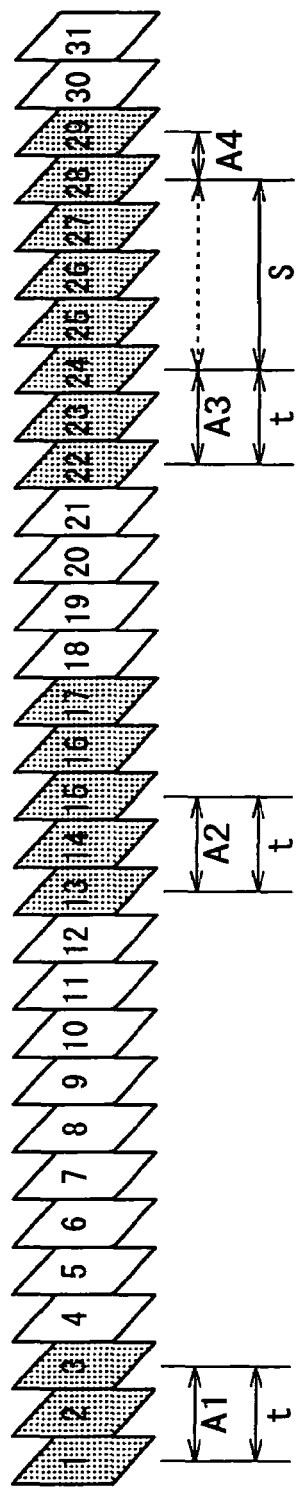
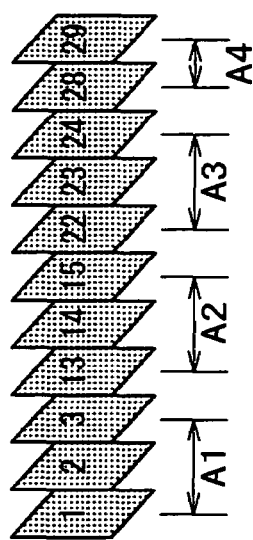
F I G. 3 3 A
F I G. 3 3 B

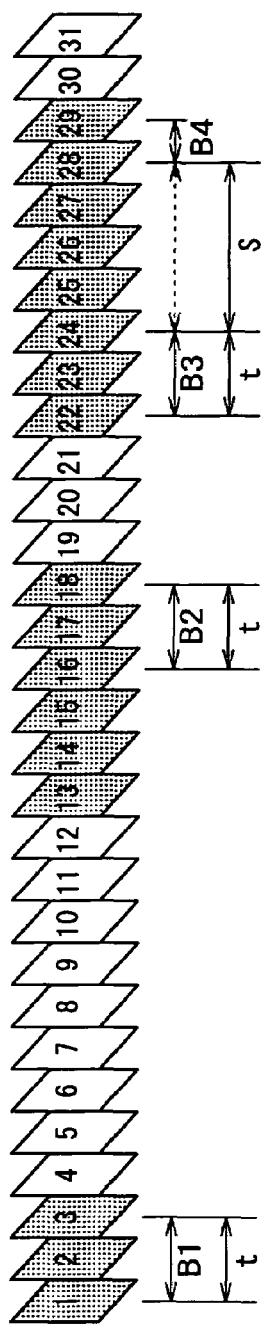
F I G. 34 A
F I G. 34 B
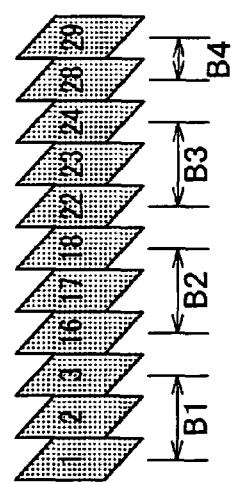
F I G. 34 C

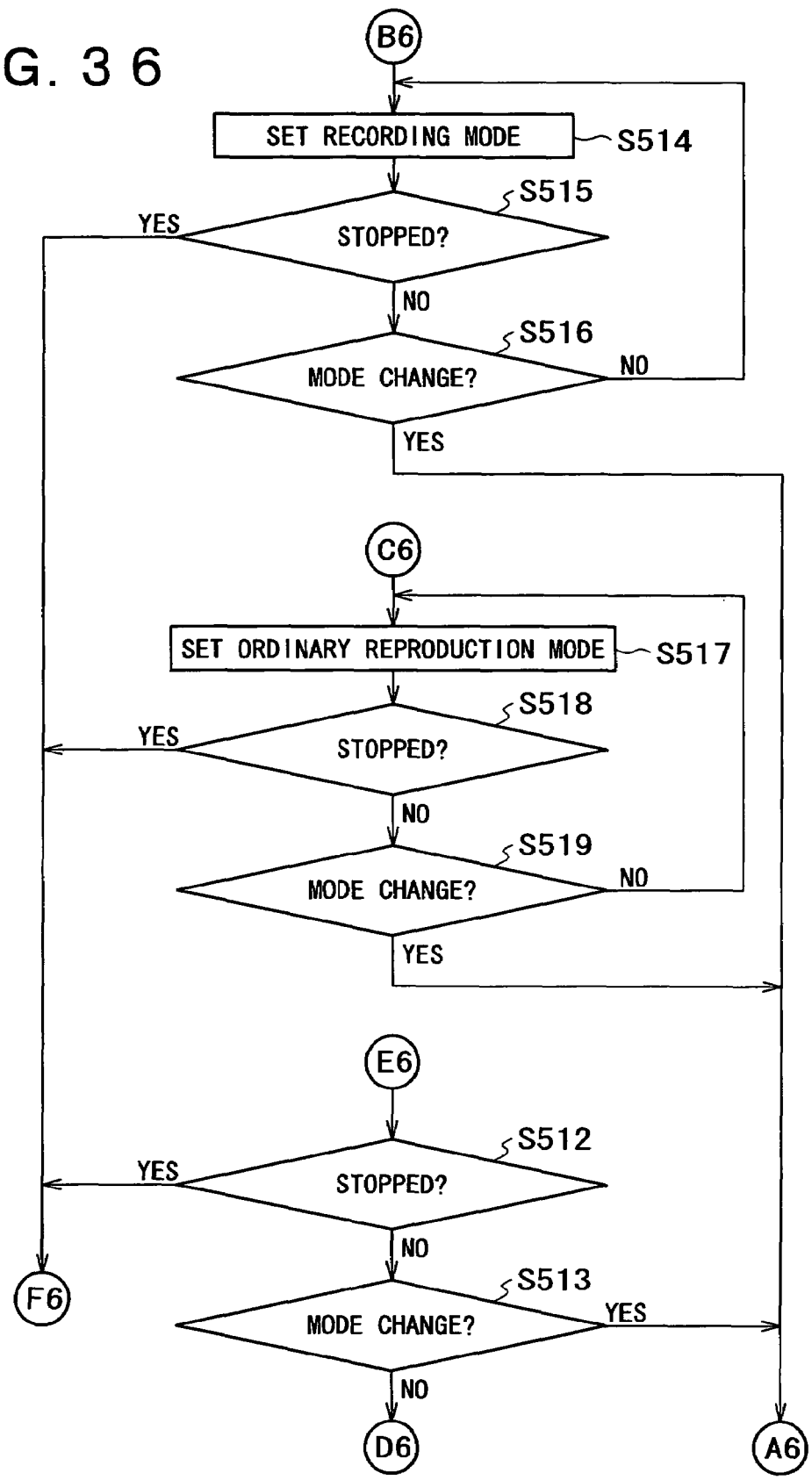

INFORMATION-SIGNAL PROCESS APPARATUS AND INFORMATION-SIGNAL PROCESSING METHOD

TECHNICAL FIELD

The present invention typically relates to an information-signal process apparatus for recording information signals such as audio and video signals onto a recording medium and an information-signal process method adopted by such an information-signal process apparatus as well as relates to an information-signal process apparatus for reproducing an information signal from a recording medium and an information-signal process method adopted by such an information-signal process apparatus.

BACKGROUND ART

In recent years, a large number of various video and audio signals is presented not only through the conventional ground-wave broadcasting but also through a variety of communication routes such as BS (Broadcasting Satellite) digital broadcasting and communication networks. Speaking about the communication networks, a large number of digital video and audio signals is presented to the end user at a high speed.

In addition, the storage capacities of a variety of recording mediums or the storage capacities of various kinds of recording media are increasing at a very high pace and, at the same time, the prices of the recording mediums are decreasing in a short period of time. The recording mediums include a magnetic disk such as a hard disk, an optical disk such as a DVD (Digital Versatile Disk) and a magneto-optical disk known as an MO disk. Thus, the end user can store a large number of information signals such as video and audio signals presented to the user through a variety of communication routes in a recording medium owned by the user itself by using a recording/reproduction apparatus also of its own as a large amount of data and use the signals.

By the way, if information signals such as video and audio signals of a broadcast program have been stored in a disk-shaped recording medium such as a hard disk having a large storage capacity as described above, a conceivably rising demand for effective and efficient utilization of the information signals can be met by taking advantage of the accessibility merit, which is offered by the disk-shaped recording medium to allow the medium to be searched for a desired scene of a desired broadcast program at a high speed so as to allow the scene to be reproduced quickly.

Even though the storage capacity of the recording medium is large, the capacity is by no means unlimited, requiring considerations to utilize the recording medium as efficiently as possible and to avoid a problem caused by an insufficient storage capacity.

It is thus an object of the present invention addressing the above problems to provide an information-signal process apparatus capable of recording a large number of information signals effectively and with a high degree of efficiency onto a recording medium having a large storage capacity for storing the information signals and capable of utilizing the recording medium with a high degree of efficiency as well as provide an information-signal process method to be adopted by the information-signal process apparatus.

DISCLOSURE OF INVENTION

In a process to record video and audio signals of a television broadcast program or the like onto a recording medium, a recording/reproduction apparatus provided by the present invention detects information on characteristics of the video signal, carries out a similarity determination process based on the detected characteristics and carries out a process to classify pictures into similar-picture segments each consisting of similar pictures.

In a recording/reproduction apparatus implemented by another embodiment of the present invention, principal information and summary information are managed by associating the principal information and the summary information with each other. When the storage size of a recording area remaining in a recording medium becomes insufficient, the summary information is deliberately left in the recording medium, taking precedence of the principal information, so that the recording medium can be utilized effectively and with a high degree of efficiency and, in addition, it is possible to efficiently and effectively make use of an information signal such as a video signal remaining on the recording medium.

On top of that, in a recording/reproduction apparatus implemented by a further embodiment of the present invention, when the storage size of a recording area remaining in a first recording medium becomes smaller than a predetermined value, least recent principal information is moved to a second recording medium to increase the storage size of the recording area remaining in the first recording medium and, hence, allocate a larger residual recording area in the first recording medium, before recording new principal information onto the first recording medium. Thus, it is possible to avoid a problem such as an inability to store principal information of a new program due to an insufficient residual storage capacity of the first recording medium.

Furthermore, in a recording/reproduction apparatus implemented by a still further embodiment of the present invention, in a process to record video and audio signals of a plurality of television broadcast programs onto a recording medium, similar-picture segments are identified, pictures located at the heads of the similar-picture segments are displayed as shrunk pictures (or thumb-nail pictures) in a tabular format (a multi-picture format) and the display in the tabular format is updated from time to time. Thus, contents of the television broadcast programs recorded on the recording medium can be grasped effectively and with a high degree of efficiency even if the display of shrunk pictures varies with the lapse of time.

Moreover, in a recording/reproduction apparatus implemented by a still further embodiment of the present invention, an effective digest reproduction mode to be used for reproducing a program from a recording medium is selected in accordance with the genre of the program or in accordance with a command entered by the user so that an effective as well as efficient digest reproduction process can be carried out.

BRIEF DESCRIPTION OF DRAWINGS

FIGS. 2A to 2C are explanatory diagrams showing an outline of operations carried out by the recording/reproduction apparatus implemented by the first embodiment shown in FIG. 1;

FIG. 3 is an explanatory diagram showing an outline of operations carried out by the recording/reproduction apparatus implemented by the first embodiment shown in FIG. 1;

FIG. 5 is a diagram showing operations carried out by the picture classification process unit employed in the recording/reproduction apparatus implemented by the first embodiment shown in FIG. 1;

FIG. 6 is a diagram showing operations carried out by the picture classification process unit employed in the recording/reproduction apparatus implemented by the first embodiment shown in FIG. 1;

FIG. 8 shows a flowchart referred to in explanation of operations carried out by the recording/reproduction apparatus implemented by the first embodiment shown in FIG. 1;

FIGS. 13A and 13B are explanatory diagrams showing an outline of operations carried out by the recording/reproduction apparatus implemented by the second embodiment shown in FIG. 12;

FIGS. 24A to 24B are an explanatory diagrams showing an outline of operations carried out by the recording/reproduction apparatus implemented by the fourth embodiment shown in FIG. 23;

FIGS. 28A to 28C are explanatory diagrams showing an outline of operations carried out by the recording/reproduction apparatus implemented by the fifth embodiment shown in FIG. 27;

FIGS. 33A and 33B are explanatory diagrams showing an outline of operations carried out by the recording/reproduction apparatus implemented by the sixth embodiment shown in FIG. 27;

FIGS. 34A to 34C are explanatory diagrams showing an outline of operations carried out by the recording/reproduction apparatus implemented by the sixth embodiment shown in FIG. 27;

FIG. 36 shows a continuation flowchart of the flowchart shown in FIG. 35.

BEST MODES FOR CARRYING OUT THE INVENTION

By referring to diagrams, the following description explains embodiments implementing an information-signal process apparatus and an information-signal process method, which are provided by the present invention. The embodiments described below each implement the information-signal process apparatus and information-signal process method provided by the present invention in their typical applications to a recording/reproduction apparatus for recording video and audio signals of a television broadcast program onto a recording medium and reproducing video and audio signals from a recording medium.

First Embodiment

Figure 1:
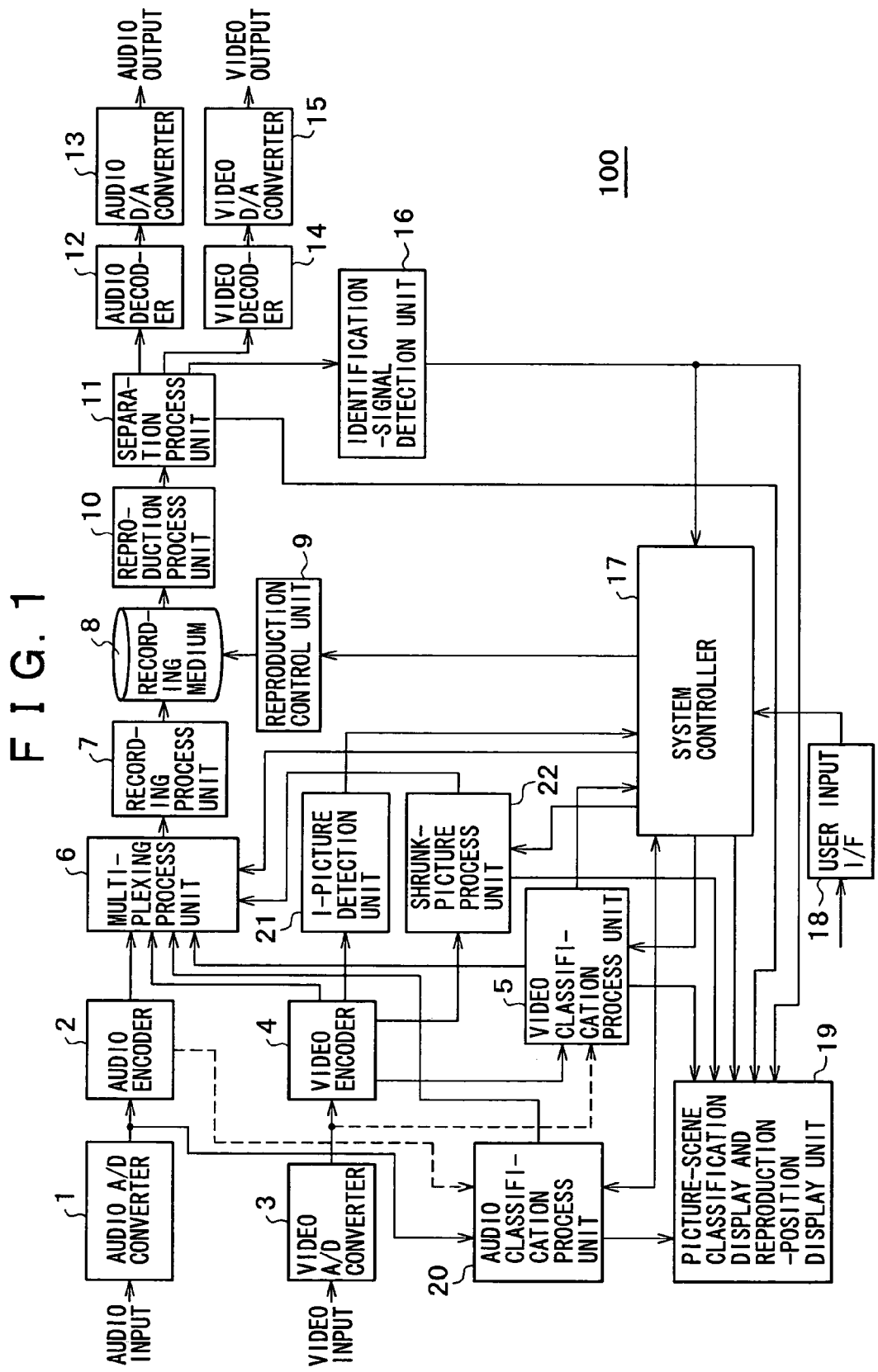
FIG. 1 is an explanatory block diagram showing a recording/reproduction apparatus implemented by a first embodiment to which an embodiment of an information-signal process apparatus and information-signal process method provided by the present invention is applied.

FIG. 1 is an explanatory block diagram showing a recording/reproduction apparatus 100 implemented by a first embodiment to which an embodiment of an information-signal process apparatus and information-signal process method provided by the present invention is applied. FIGS. 2A to 2C and 3 are explanatory diagrams showing the principle of operation of the recording/reproduction apparatus 100 implemented by this embodiment.

The recording/reproduction apparatus 100 implemented by the first embodiment is capable of playing back an information signal of typically a television broadcast program from a recording medium having good accessibility and a large storage capacity without reproducing all details of the signal so as to allow recorded contents of the signal to be grasped quickly, simply and accurately, hence, promoting effective and efficient use of the recorded signal. An example of such a recording medium is a hard disk.

<Principle of Operation>

First of all, the principle of operation of the recording/reproduction apparatus 100 implemented by the first embodiment is explained. The recording/reproduction apparatus 100 shown in FIG. 1 is capable of receiving an analog video and audio signals of typically a television broadcast program as information signals, converting the signals into digital data and compressing the digital data by adopting an MPEG (Moving Picture Experts Group) method. The recording/reproduction apparatus 100 is also capable of multiplexing the compressed video data and the compressed audio data on a time-division basis before recording the multiplexed compressed data onto a recording medium 8. The recording medium 8 is typically a disk-shaped recording medium having a large storage capacity. An example of such a disk-shaped recording medium is a hard disk.

In addition, the recording/reproduction apparatus 100 shown in FIG. 1 is also capable of reading out a multiplexed compressed signal from the recording medium 8 and demultiplexing the multiplexed compressed signal read out from the recording medium 8 to generate compressed video data and audio data. The recording/reproduction apparatus 100 is also capable of decompressing the compressed video and audio data to restore pre-compression video and audio data respectively as well as converting the pre-compression video and audio data into analog signals.

In the process to record video and audio signals onto the recording medium 8, the recording/reproduction apparatus 100 shown in FIG. 1 carries out processing to classify the video signal into segments each consisting of similar pictures. The classification processing is applied to compressed video data, which is referred to as MPEG data. It is to be noted that, since a pictorial image can be assumed to be an image not changing frequently from frame to frame, the classification processing is carried out by detecting similarity only for each I (Intra-code) picture (frame) to classify frames into segments each consisting of similar pictures or frames. The classification processing is thus carried out to identify similar-picture segments each consisting of consecutive similar frames and to identify similar-picture segments that resemble each other.

As will also be described later, the video classification process unit 5 employed in the recording/reproduction apparatus 100 shown in FIG. 1 carries out processing to detect similar pictures and processing to classify the detected similar pictures into similar-picture segments. Thus, each similar-picture segment including consecutive similar pictures can be identified and it is also possible to determine similar-picture segments resembling each other.

As an example, assume an input picture signal series consisting of 31 successive pictures as shown in FIG. 2A. This input picture signal series is subjected to the classification processing to identify similar-picture segments A1, A2, A3, B1, B2 and B3, in each of which I pictures are similar to each other. On the other hand, the classification processing also detects segments C1 and C2 as non-similar-picture segments, in each of which I pictures are not similar to each other.

In addition, the recording/reproduction apparatus 100 shown in FIG. 1 also has a function capable of recognizing an I picture not similar to an immediately preceding I picture as an I picture located at a scene-change point. By executing this function, the recording/reproduction apparatus 100 is capable of detecting I pictures each pointed to by an arrow in FIG. 2A as I pictures each located at a scene-change point. That is to say, the $1^{st}$, $4^{th}$, $5^{th}$, $6^{th}$, $7^{th}$, $10^{th}$, $11^{th}$, $12^{th}$, $17^{th}$, $21^{st}$ and $29^{th}$ I pictures are each detected as an I picture located at a scene-change point.

Moreover, the classification processing is carried out also to further classify similar-picture segments in order to put similar-picture segments resembling each other in a group of similar-picture segments resembling each other. In the case of this input picture signal series, the similar-picture segments A1, A2 and A3 are put in a group of similar-picture segments resembling each other, the similar-picture segments B1, B2 and B3 are put in another group of similar-picture segments resembling each other and the similar-picture segments C1 and C2 are put in a further group of similar-picture segments resembling each other.

Thus, when the recording/reproduction apparatus 100 implemented by this embodiment receives the input picture signal series shown in FIG. 2A, the recording/reproduction apparatus 100 classifies the similar-picture segments included in the input picture signal series into 3 groups of similar-picture segments resembling each other, i.e., the first group consisting the similar-picture segments A1, A2 and A3 resembling each other, the second group consisting the similar-picture segments B1, B2 and B3 resembling each other and the third group consisting the non-similar-picture segments C1 and C2 resembling each other. The recording/reproduction apparatus 100 also finds how many I pictures are included in each of the similar-picture segments composing each of the groups.

In the process to record an information signal onto the recording medium 8, as described above, the recording/reproduction apparatus 100 implemented by this embodiment shown in FIG. 1 carries out the processing to detect similarity among pictures and classify the pictures into similar-picture segments. Then, with a predetermined timing such as the timing of a recording-process end, a result of the classification of the similar-picture segments is displayed as shown in FIG. 3.

In this case, the result of the classification is displayed for each group of similar-picture segments resembling each other. A result of the classification for a group of similar-picture segments resembling each other is displayed on a row as an array of shrunk forms of I pictures each positioned at the head of one of the similar-picture segments. To put it concretely, the display begins with an array having a highest similarity detection frequency or an array accommodating a largest number of similar I pictures. In addition, every array starts with an I picture having a smallest frame number among the I pictures accommodated in the array to be followed by I pictures arranged in an order of increasing frame numbers. The I pictures displayed in every array are each a shrunk form of a picture located at a change-over point in the group represented by the array or a scene-change point detected by the classification process.

Note that it is necessary to pay attention to the fact that a similar-picture segment with a camera pan has picture scenes changing with the camera pan. Thus, when taking such a similar-picture segment into consideration from the picture-similarity point of view, the picture scenes are considered to be pictures not similar to each other. With a camera pan merely existing, on the other hand, the segment can also be considered to be a segment not including a cut point (or a scene change). That is to say, there is no absolute standard usable for determining whether or not certain pictures are similar to each other and a change-over point of time in a group may not necessarily be the same as a scene-change point of time.

In addition, in the example described above, if two or more groups each consisting of similar-picture segments resembling each other have equal similarity detection frequencies, the group starting with an I picture having the smallest frame number is displayed first to be followed by a group starting with an I picture having a larger frame number.

In the typical display shown in FIG. 3, the screen is divided into a matrix of 8×8 small screen units used for displaying only shrunk forms of pictures each located at an scene-change point in the array of I pictures obtained as a result of a classification process as shown in FIG. 2A. To be more specific, the small screen units on each horizontal row of the matrix are used for displaying shrunk forms of pictures located at scene-change points at the heads of similar-picture segments included in a group of the similar-picture segments resembling each other, and the small screen units on each vertical column of the matrix are used for displaying shrunk forms of pictures each located at an scene-change point at the head of every similar-picture segment.

Thus, to put it concretely, in the typical display shown in FIG. 3, the top horizontal row c1 is used for displaying shrunk forms of the $1^{st}$, $12^{th}$ and $21^{st}$ I pictures located at scene-change points at the heads of the similar-picture segments A1, A2 and A3 respectively.

By the same token, the second row c2 is used for displaying shrunk forms of the $7^{th}$, $17^{th}$ and $29^{th}$ I pictures located at scene-change points at the heads of the similar-picture segments B1, B2 and B3 respectively. In the same way, the horizontal row c3 is used for displaying shrunk forms of the $4^{th}$ and $10^{th}$ I pictures located at scene-change points at the heads of the non-similar-picture segments C1 and C2 resembling each other.

As described above, the recording/reproduction apparatus 100 implemented by the first embodiment carries out the processing to detect similarity among pictures and classify the pictures into similar-picture segments in the recording process and displays a result of the pictures classification processing at a recording-execution time, at a recording-end time or with a proper timing after the end of the recording process. Thus, it is possible to quickly and reliably know what broadcast program has been recorded onto the recording medium. That is to say, the contents of the recorded broadcast program can be grasped quickly and reliably without reproducing all details of the recorded information signal and, hence, the information signal can be utilized effectively and efficiently.

In addition, in order to provide a tabular display (or a multi-picture display) showing a result of classification as shown in FIG. 3, shrunk pictures (or thumb-nail pictures) are required. FIG. 2B is a diagram showing an array of shrunk pictures arranged in the same time sequence shown in FIG. 2A as a time sequence of the I pictures with their data compressed by using the MPEG method. By storing this sequence of shrunk pictures in the recording medium in advance, a tabular display of the shrunk pictures (or the thumb-nail pictures) can be provided immediately after the classification processing.

Here, consider a case in which shrunk pictures are displayed as shown in FIG. 3 at the recording-end time. In this case, during the recording process, the shrunk pictures are created and stored onto the recording medium along with the original picture data to shorten the signal-processing time. If the shrunk pictures are not created in the process to record the original pictures, both a process to decode the original data and a process to create the shrunk pictures must be carried out. This is because the data of the original pictures is compressed data. Thus, the shrunk pictures cannot be displayed quickly.

In order to solve this problem, the shrunk pictures are created along with the original picture data as shown in FIG. 2B and stored onto the recording medium along with the original picture data to shorten the signal-processing time. In addition, each of the original pictures, which are I pictures, can be associated easily with a shrunk picture thereof.

If the shrunk pictures shown in FIG. 2B are all stored in the recording medium, however, the amount of shrunk-picture data is large so that there may be conceivably a case in which the recording medium having a limited storage capacity can no longer be utilized effectively due to the large amount of shrunk-picture data. In order to solve this problem, the recording/reproduction apparatus 100 implemented by the first embodiment shown in FIG. 1 stores only shrunk pictures located at scene-change points by associating the shrunk pictures with the original pictures each located at the scene-change point in order to reduce the amount of shrunk-picture data to a minimum.

Now, consider the amount of data of shrunk pictures in a base-band region for which the tabular display (or the multi-picture display) shown in FIG. 3 is expressed in terms of "0" and "1". In the case of the typical display shown in FIG. 3, the data of a shrunk picture has a size equal to ⅛ times (one-eighth) of the size of the original picture corresponding to the shrunk picture. That is to say, the height (vertical dimension) and width (horizontal dimension) of a shrunk picture are ⅛ times the vertical and horizontal dimensions of the original picture.

Let the data of each original picture be expressed in terms of a Y signal (luminance signal), a Cb signal (blue color-difference signal) and a Cr signal (red color-difference signal), which each have a size of 8 bits, and the resolution of each original picture be 352 (horizontal direction)×240 (vertical direction). In this case, the amount of data per shrunk picture can be expressed in accordance with Eq. (1) as follows:

$$\text{Amount of data per shrunk picture} = 3 \times 8 \text{ bits} \times (352 \times 240) \times (1/8) \times (1/8) = 31{,}680 \text{ bits} \approx 4 \text{ Kbyte} \quad (1)$$

Assume for example that the recording time of a broadcast program is two hours, the program comprises 30 frames per second, being compressed into an MPEG stream composed of 15 pictures per GOP (group of pictures). In this case, the amount of data of all shrunk pictures can be expressed in accordance with Eq. (2) as follows:

$$\text{Amount of data of all shrunk pictures} = 2H \times 60 \text{ min/H} \times 60 \text{ sec/min} \times 31{,}680 \text{ bit} \times 30 \text{ frames/sec} \times (1/15) = 54 \text{ Mbyte} \quad (2)$$

As is obvious from the above equation, even the amount of data of all shrunk pictures is large.

However, pictures included in any similar-picture segment shown in FIG. 2A are similar to each other. Thus, for every similar-picture segment, it is necessary to generate only a shrunk picture of the original picture located at the head of the similar-picture segment, that is, a shrunk picture of the original picture located at a scene-change point of the similar-picture segment. By storing only such shrunk pictures along with the original pictures, the amount of data of the shrunk pictures can be reduced.

For example, since the $1^{st}$, $2^{nd}$ and $3^{rd}$ original pictures in the similar-picture segment A1 are similar to each other, only the shrunk picture of the $1^{st}$ original picture located at the scene-change point of the similar-picture segment A1 is created and stored in the recording medium. The technique of selecting an original picture for which a shrunk picture is to be generated is applied to the other similar-picture segments A2, A3, B1, B2 and B3.

As for the non-similar-picture segments C1 and C2, pictures included therein are not similar to each other. Thus, a shrunk picture is created for each of all original pictures included in every non-similar-picture segment and stored in the recording medium along with the original ones. To put it concretely, in the case of the non-similar-picture segment C1, a shrunk picture is created for each of the $4^{th}$, $5^{th}$ and $6^{th}$ original pictures and stored in the recording medium. The technique of selecting original pictures for each of which a shrunk picture is to be generated is applied to the other non-similar-picture segment C2.

By selecting original pictures, for each of which a shrunk picture is to be generated, as described above, the $1^{st}$, $4^{th}$, $5^{th}$, $6^{th}$, $7^{th}$, $10^{th}$, $11^{th}$, $12^{th}$, $17^{th}$, $21^{st}$ and $29^{th}$ original pictures shown in FIG. 2C are each selected as an original picture for which a shrunk picture is to be generated and the generated shrunk pictures are stored in the recording medium along with all original pictures.

Thus, the amount of data of shrunk pictures created for original pictures shown in FIG. 2C can be made much smaller than the amount of data of shrunk pictures created for original pictures shown in FIG. 2B. This is because the shrunk pictures for the array shown in FIG. 2C are basically created only for original pictures each located at the head of a similar-picture segment, that is, original pictures each located at a scene-change point of the similar-picture segment. If it is assumed that the recording time of a broadcast program is two hours as described above and the average duration of similar-picture segments is about three seconds, the creation of shrunk pictures only for original pictures selected by using the method to process fewer original pictures like those shown in FIG. 2C reduces the amount of data of the shrunk pictures to about 18 Mbyte.

It is to be noted that a shrunk picture can further be compressed by adoption of a data compression technique such as the JPEG (Joint Photographic Expert Group) to further reduce the amount of data of the shrunk picture.

The recording/reproduction apparatus 100 implemented by the first embodiment shown in FIG. 1 is capable of adopting the method to select only original pictures like those shown in FIG. 2B and the method to select only original pictures like those shown in FIG. 2C. In the following description, however, it is assumed that the method to select only original pictures like those shown in FIG. 2C is mainly adopted.

<Operations and Configuration of the Recording/Reproduction Apparatus 100 Implemented by the First Embodiment>

The following description explains operations and configuration of the recording/reproduction apparatus 100 implemented by the first embodiment shown in FIG. 1. The configuration shown in FIG. 1 can be divided into portions on the left and right sides of the recording medium 8. The portion on the left side is mainly a recording system while the portion on the right side is mainly a reproduction system.

<Recording System>

First of all, the recording system is explained. An analog audio signal (an audio input) supplied to the recording/reproduction apparatus 100 implemented by the first embodiment is fed to an audio analog-to-digital converter 1, which is abbreviated hereafter to an audio A/D converter, for converting the analog audio signal into a digital audio signal to be supplied to an audio encoder 2 and an audio classification process unit 20.

The audio encoder 2 carries out a band compression process on the digital audio signal by adoption of a predetermined compression technique such as an MPEG audio method. Audio data obtained as a result of the band compression process carried out on the digital audio signal is supplied to a multiplexing process unit 6.

The audio classification process unit 20 detects continuity of a frequency spectrum peak in the digital audio signal typically for each predetermined segment to determine whether or not the digital audio signal is a musical signal. The result of the determination is supplied to the multiplexing process unit 6, a system controller 17 and a picture-scene classification display and reproduction-position display unit 19. The picture-scene classification display and reproduction-position display unit 19 is also properly referred to hereafter as a classification display unit.

It is to be noted that, instead of processing the digital audio signal received from the audio A/D converter 1, the audio classification process unit 20 can also be designed into a configuration for receiving the audio data, which is obtained as a result of the band compression process carried out by the audio encoder 2 on the digital analog signal generated by the audio A/D converter 1, as indicated by a dashed line shown in FIG. 1, and carrying out the classification processing described earlier on the audio data.

On the other hand, an analog video signal (a video input) supplied to the recording/reproduction apparatus 100 implemented by the first embodiment is fed to a video analog-to-digital converter 3, which is abbreviated hereafter to a video A/D converter, for converting the analog video signal into a digital video signal to be supplied to a video encoder 4.

The video encoder 4 carries out a band compression process on the digital video signal supplied thereto, by adoption of a predetermined compression technique such as an MPEG2 method. Video data obtained as a result of the band compression process carried out on the digital video signal is supplied to a video classification process unit 5, the multiplexing process unit 6, an I-picture detection unit 21 and a shrunk-picture process unit 22.

The video classification process unit 5 detects picture characteristics of I pictures of the video data received from the video encoder 4 and recognizes picture similarity on the basis of the detected characteristics. In addition, the video classification process unit 5 also carries out a series of picture classification processes including identification of similar-picture segments, non-similar-picture segments and groups each consisting similar-picture segments resembling each other as explained earlier by referring to FIGS. 2A to 2C. The video classification process unit 5 also generates an identification information signal for identifying the similar-picture segments, the non-similar-picture segments and the groups each consisting similar-picture segments resembling each other, supplying the signal to the multiplexing process unit 6 and the classification display unit 19.

The identification information signal includes position information of the video data. The position information of the video data includes information on how many similar frames are included in each similar-picture segment. In addition, the video classification process unit 5 is also capable of detecting scene-change points on the processing of picture-similarity determination, and reporting them to the system controller 17.

It is to be noted that, instead of receiving the compressed video data from the video encoder 4, the video classification process unit 5 may also receive the digital video signal output by the video A/D converter 3 as indicated by a dashed line shown in FIG. 1 and carries out the processes to identify and classify similar pictures of the digital video data in frame units as described above on the basis of the digital video signal.

In addition, it is also possible to provide a configuration in which the identification information signals obtained as results of the processes to classify the video and audio signals can also be generated by the system controller 17 on the basis of the classification-process results received from the video classification process unit 5 and the audio classification process unit 20 and supplied to the multiplexing process unit 6.

Shown in none of the figures, the system controller 17 is a microcomputer including a CPU (Central Processing Unit), a ROM (Read Only Memory), a RAM (Random Access Memory), a non-volatile memory and a timer circuit, which are used for controlling the other components composing the recording/reproduction apparatus 100.

In addition, the I-picture detection unit 21 in the configuration shown in FIG. 1 is a component for detecting I pictures from the video data and reporting detection information such as detection timings to the system controller 17. Only I pictures are detected because, as described above, the recording/reproduction apparatus 100 implemented by this embodiment carries out the picture-similarity detection process and the picture classification process in I-picture units. The system controller 17 is capable of controlling the video classification process unit 5 and the shrunk-picture process unit 22 on the basis of the detection information received from the I-picture detection unit 21.

In accordance with the control executed by the system controller 17, the shrunk-picture process unit 22 generates shrunk-picture data from video data (to be more specific, I pictures each located at a scene-change point) received thereby and supplies the data to the multiplexing process unit 6 and the classification display unit 19.

In this embodiment, the classification display unit 19 receives the classification result from the audio classification process unit 20, the identification information signal from the video classification process unit 5 and the shrunk-picture data from the shrunk-picture process unit 22, displaying classifications of shrunk pictures, which are arranged on matrix rows each corresponding to a group of similar-picture segments resembling each other and each represent one of the similar-picture segments as shown in FIG. 3. That is to say, the recording/reproduction apparatus 100 implemented by this embodiment is capable of displaying thumb-nail pictures for recorded original pictures concurrently with the process to record the original pictures onto the recording medium.

In addition, the multiplexing process unit 6 generates multiplexed data by typically carrying out a time-division multiplexing process on the audio data, the video data, the shrunk-picture data and the identification information signal which is received from the video classification process unit 5, supplying the multiplexed data to the recording process unit 7. The recording process unit 7 carries out processing including a process of adding error correction codes to the multiplexed data and a process of interleaving the data to create a signal to be recorded, recording the signal into a predetermined area in the recording medium 8.

Then, in the case of this embodiment, as described before, by using the identification information signal multiplexed in the multiplexed data, it is possible to identify similar-picture segments, non-similar-picture segments and groups each consisting of similar-picture segments resembling each other and associate original pictures with shrunk pictures representing the original pictures. Thus, it is possible to display classifications of shrunk pictures, which are arranged on matrix rows each corresponding to a group of similar-picture segments resembling each other and each represent one of the similar-picture segments as shown in FIG. 3, during a recording process or at a recording-end time or with a predetermined timing after the end of the recording process.

<Picture Classification Processing>

Figure 4:
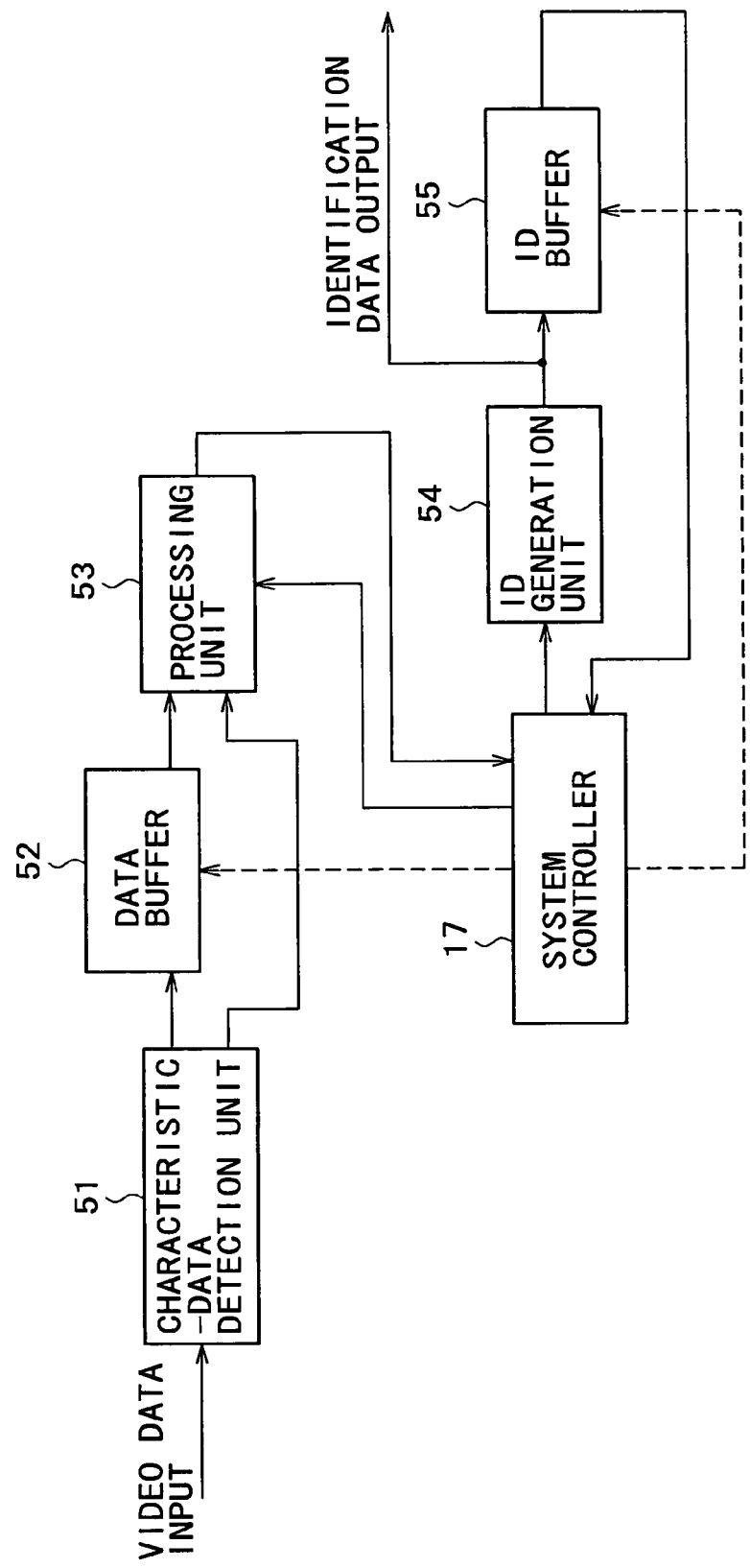
FIG. 4 is an explanatory block diagram showing a picture classification process unit employed in the recording/reproduction apparatus implemented by the first embodiment shown in FIG. 1.

The picture classification processing carried out by the video classification process unit 5 employed in the recording/reproduction apparatus 100 is explained concretely as follows. FIG. 4 is an explanatory block diagram showing the picture classification process unit 5 whereas FIGS. 5 and 6 are diagrams each showing the principle of operation of the picture classification processing carried out by the video classification process unit 5.

In this embodiment, the video classification process unit 5 detects characteristics of the video data from the video data compressed by typically adopting the MPEG2 method in order to classify pictures.

When a characteristic-data detection unit 51 employed in the video classification process unit 5 receives an I picture from the video encoder 4, the characteristic-data detection unit 51 divides the frame data of the I picture into 25 picture areas or 25 divided-picture areas like those shown in FIG. 5. Then, the characteristic-data detection unit 51 generates a luminance vector Ay, which is a $25^{th}$-degree vector having 25 components as expressed by Eq. (1) shown in FIG. 6. The 25 components are average values of DC coefficients selected among DCT (Discrete Cosine Transform) components of Y components (or luminance components) in the 25 picture areas respectively. By the same token, the characteristic-data detection unit 51 generates a blue color-difference vector Ab, which is a $25^{th}$-degree vector having 25 components as expressed by Eq. (2) shown in FIG. 6. The 25 components are average values of DC coefficients selected among DCT components of Cb components (or blue color-difference components) in the 25 picture areas respectively. In the same way, the characteristic-data detection unit 51 generates a red color-difference vector Ar, which is a $25^{th}$-degree vector having 25 components as expressed by Eq. (3) shown in FIG. 6. The 25 components are average values of DC coefficients selected among DCT components of Cr components (or red color-difference components) in the 25 picture areas respectively.

The characteristic-data detection unit 51 supplies the pieces of vector data generated sequentially in this way to a data buffer 52, in which the data stored, and to a processing unit 53. The data buffer 52 and the processing unit 53 are included in the configuration shown in FIG. 4. The processing unit 53 computes an inter-vector distance Vd between reference vector data at a classification-processing time and the vector data of each frame in accordance with Eq. (4) shown in FIG. 6. The vector data of each frame has already been stored in the data buffer 52 for all frames. The reference vector data at the classification-processing time is vector data most recently supplied by the characteristic-data detection unit 51 to the processing unit 53. Then, the processing unit 53 finds the shortest distance Vdmin among the inter-vector distances Vd computed for all the frames.

A ID buffer 55 is a memory used for storing IDs (identifications) assigned to the pieces of vector data, which have been stored in the data buffer 52. The IDs are assigned to the pieces of vector data on a one-to-one basis. That is to say, the IDs are assigned to the frames, whose pieces of vector data have bee stored in the data buffer 52, on a one-to-one basis.

Then, on the basis of processing results output by the processing unit 53, the system controller 17 refers to the ID buffer 55 to obtain an ID assigned to a specific frame with a vector having an inter-vector distance from the reference vector equal to the shortest distance Vdmin. Subsequently, if the shortest distance Vdmin does not exceed a threshold value Th determined in advance, the system controller 17 determines the specific frame with a vector having an inter-vector distance from the reference vector equal to the shortest distance Vdmin to be a frame similar to the frame having the reference vector. In this case, an identification IDdet, which is the ID of the specific frame, is output as an identification information signal, bypasses an ID generation unit 54, and is stored in the ID buffer 55. As implicitly explained in a description given earlier, the specific frame and the frame having the reference vector are each an I picture.

The ID generation unit 54 included in the configuration shown in FIG. 4 is a 16-bit counter having an initial value of 0 (zero). If the shortest distance Vdmin exceeds the threshold value Th determined in advance, the system controller 17 determines the specific frame (an I picture) with a vector having an inter-vector distance from the reference vector equal to the shortest distance Vdmin to be a frame not similar to the frame (an I picture) having the reference vector. In this case, the current value of the ID generation unit 54 is output as an ID assigned to the frame having the reference vector and also stored in the ID buffer 55. Then, the ID generation unit 54 increments the contents thereof by 1 to generate an ID to be assigned to a next processed frame.

As described above, the same ID is assigned to frames (I pictures) having a high degree of similarity. Thus, a segment consisting of frames having the same ID can be determined to be a similar-picture segment. In addition, similar-picture segments separated from each other by other segments can be determined to be segments pertaining to a group of similar-picture segments resembling each other.

Moreover, the video classification process unit 5 is capable of determining whether or not a specific I picture completing the classification process is a picture located at a scene-change point (or a cut point) from a difference between the I picture completing the classification process and an I picture immediately preceding the specific I picture. By detecting scene-change points in this way, it is possible to easily implement the process to generate shrunk pictures for only original pictures located at the scene-change points and display the shrunk pictures on the classification display unit 19 as thumbnail pictures as shown in FIG. 2C and the process to multiplex the shrunk pictures into the aforementioned multiplexed data to be stored onto the recording medium.

Then, the system controller 17 of this embodiment creates an identification information signal on the basis of information received from the video classification process unit 5 and supplies this signal to the multiplexing process unit 6. The identification information signal includes information identifying a recorded television broadcast program, information identifying each shrunk picture of the television broadcast program, information indicating the position of each identified shrunk picture on a multi-picture display and information identifying an original picture, for which the identified shrunk picture is generated.

It is to be noted that the information indicating the position of an identified shrunk picture on a multi-picture display can be found from the number of I pictures of a specific similar-picture segment and a group of similar-picture segments. As the information identifying an original picture, for which the identified shrunk picture is generated, a frame number or a timestamp can be used.

<Sound Classification Processing>

Figure 7:
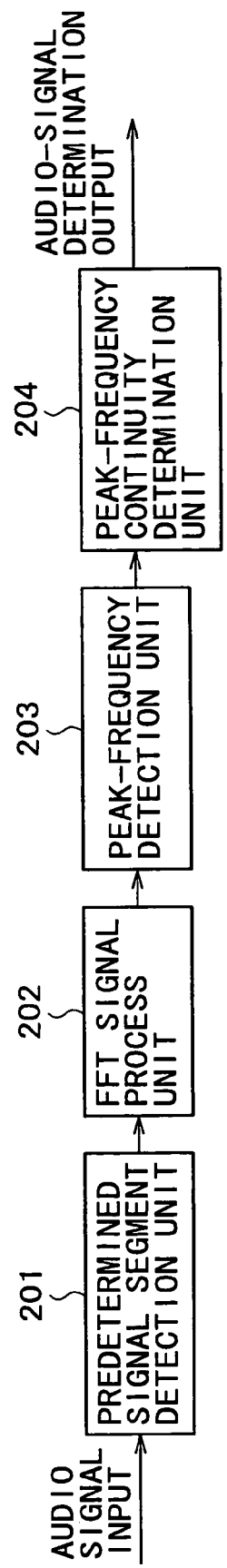
FIG. 7 is an explanatory block diagram showing a sound classification process unit employed in the recording/reproduction apparatus implemented by the first embodiment shown in FIG. 1.

The following description concretely explains processing carried out by the audio classification process unit 20 employed in the recording/reproduction apparatus 100 described above to classify sounds. FIG. 7 is an explanatory block diagram showing the concrete configuration of the sound classification process unit 20. The audio classification process unit 20 of this embodiment can be considered to be a unit including a musical-signal portion for recognizing a musical audio signal and a voice-signal portion for recognizing a conversational-voice audio signal.

A digital audio signal generated by the audio A/D converter 1 is supplied to a predetermined signal segment detection unit 201 employed in the audio classification process unit 20. The predetermined signal segment detection unit 201 extracts an audio-signal segment with a length in the range 0.5 to 5 seconds from the digital audio signal supplied thereto and supplies the extracted audio-signal segment to an FFT signal process unit 202.

The audio-signal segment extracted from the digital audio signal has a length in a predetermined range as described above because, if the duration of the audio-signal segment is too short, it is impossible to determine whether the audio signal is a musical audio signal or a conversational-voice audio signal with a high degree of accuracy.

The FFT signal process unit 202 carries out FFT (Fast Fourier Transformation) processing on the digital audio signal supplied thereto to transform the signal into information on frequency components. Then, the FFT signal process unit 202 supplies the information on frequency components to a peak-frequency detection unit 203. The peak-frequency detection unit 203 detects spectrum-peak frequencies from the information on frequency components of the supplied digital audio signal and supplies the detected spectrum-peak frequencies to the peak-frequency continuity determination unit 204.

On the basis of the supplied spectrum-peak frequencies, the peak-frequency continuity determination unit 204 determines whether or not the spectrum-peak frequencies exist continuously in a predetermined range in order to determine whether or not the audio signal being processed is a musical audio signal.

The peak-frequency continuity determination unit 204 supplies a result of the determination to the multiplexing process unit 6 as explained earlier by referring to FIG. 1. The multiplexing process unit 6 multiplexes the result of the determination into the multiplexed signal as information indicating whether or not the audio signal being processed is a musical audio signal. The peak-frequency continuity determination unit 204 also supplies the result of the determination to the classification display unit 19 by way of the system controller 17 or directly. The classification display unit 19 uses the result of the determination in a predetermined screen to display thumb-nail pictures of the audio signal by classifying the thumb-nail pictures into a musical portion and a non-musical portion.

In addition, the determination result output by the audio classification process unit 20 can also be used to classify the audio signal into a musical-signal segment and a non-musical-signal segment, and a scene at a point of time marking a change of the segment category of the audio signal is displayed as a shrunk picture in the same way as the display of a thumb-nail picture located at a scene-change point described earlier. In this case, the broadcast program is displayed by clearly separating the musical and explanatory portions of the program from each other so that it is possible to reproduce for example only the musical portion or the explanatory portion.

<Reproduction System>

Next, the reproduction system is explained. A control signal generated by the system controller 17 controls the reproduction control unit 9 to read out multiplexed data specified by the user from the recording medium 8 and supply the data to the reproduction process unit 10. The reproduction process unit 10 carries out predetermined processes including deinterleave processing on the multiplexed data supplied thereto and supplies the processed multiplexed data to the separation process unit 11. The separation process unit 11 demultiplexes the multiplexed data supplied thereto to generate audio data, video data, shrunk-picture data and an identification information signal to mention a few.

The audio data generated by the separation process unit 11 is supplied to an audio decoder 12. The audio data supplied to the audio decoder 12 is data compressed by adoption of a predetermined compression method. The audio decoder 12 thus decompresses the compressed audio data supplied thereto and supplies audio data obtained as a result of the decompression to an audio digital/analog converter 13, which is abbreviated hereafter to an audio D/A converter.

The audio D/A converter 13 converts the digital audio signal supplied thereto into an analog audio signal and outputs the analog audio signal to a speaker. The speaker generates a sound according to the analog audio signal supplied thereto.

In addition, the video data generated by the separation process unit 11 is supplied to a video decoder 14. The video data supplied to the video decoder 14 is data compressed by adoption of a predetermined compression method. The video decoder 14 thus decompresses the compressed video data supplied thereto and supplies video data obtained as a result of the decompression to a video digital/analog converter 15, which is abbreviated hereafter to a video D/A converter.

The video D/A converter 15 converts the digital video signal supplied thereto into an analog video signal and outputs the analog video signal to a monitor receiver. The monitor receiver displays a picture according to the analog video signal supplied thereto.

The identification information signal generated by the separation process unit 11 is supplied to an identification-signal detection unit 16. The identification-signal detection unit 16 detects necessary identification information signal from the identification information signal supplied thereto and supplies the identification information to the system controller 17 and the classification display unit 19.

In addition, the identification-signal detection unit 16 also extracts a predetermined timestamp signal or frame numbers from the identification information signal supplied thereto and supplies the timestamp signal or the frame numbers to the system controller 17. By detecting a reproduction point of time on the basis of the timestamp signal, a reproduction position can also be displayed on the classification display unit 19.

Then, when a command is entered via the user input I/F 18 as a command making a request for a display classifying a broadcast program recorded on the recording medium 8, the system controller 17 controls the reproduction control unit 9 on the basis of the identification information signal supplied to the system controller 17 to read out shrunk pictures of the desired broadcast program from the recording medium 8 and supplies the shrunk pictures to the classification display unit 19 by way of the reproduction process unit 10 and the separation process unit 11. In addition, the system controller 17 controls the classification display unit 19 on the basis of the identification information signal to display a classification of the broadcast program recorded on the recording medium 8 as shown in FIG. 3.

As described above, even with a predetermined timing after the end of the recording process, by using the identification information signal as well as the shrunk-picture signal, which have been generated on the basis of the picture-similarity determination processing and the classification processing and then stored in the recording medium, a classification of pictures can be displayed as shown in FIG. 3.

It is to be noted that this embodiment has been exemplified by giving a case of recording one television broadcast program as an example. However, the embodiment is by no means limited to such a case. For example, the embodiment can also be applied to display a classification obtained as a result of picture-similarity determination processing and classification processing, which are carried out for a specified channel, a specified program segment or a specified time segment. Typically, the specified channel, the specified program segment or the specified time segment may involve all programs broadcasted through a predetermined channel, a portion of a predetermined program or a predetermined time segment of a predetermined broadcasting channel. That is to say, the picture-similarity determination processing and the classification processing are carried out only during a proper segment to display a classification of pictures for the segment.

In addition, it is also possible to generate picture data for a digest reproduction process and picture data for a skimming reproduction process during a recording process and store these pieces of data along with the main picture data of the broadcast program so that the digest and skimming reproduction processes of the broadcast program can be carried out.

It is to be noted that, in this specification, the digest reproduction process means a process to reproduce a broadcast program recorded on a recording medium by jumping from a location to another in the program so as to allow the user to grasp an outline of the program. For example, the digest reproduction process can be implemented by continuously reproducing portions of a broadcast program only from physically separated signal segments, which each precede and succeed a scene change as well as have an audio level equal to or higher than a predetermined value.

On the other hand, the skimming reproduction process is a process to reproduce only a scene selected among those of a broadcast program recorded on a recording medium as a scene similar to one specified by the user.

If it is desired to carry out a predetermined special reproduction process such as the digest or skimming reproduction process, the user needs to enter a command via the user input I/F 18. Receiving the command information entered by the user, the system controller 17 controls the reproduction control unit 9 to read out picture data for the desired special reproduction method so as to allow pictures of the desired special reproduction method to be reproduced.

<Operations of the Recording/Reproduction Apparatus 100>

Figure 9:
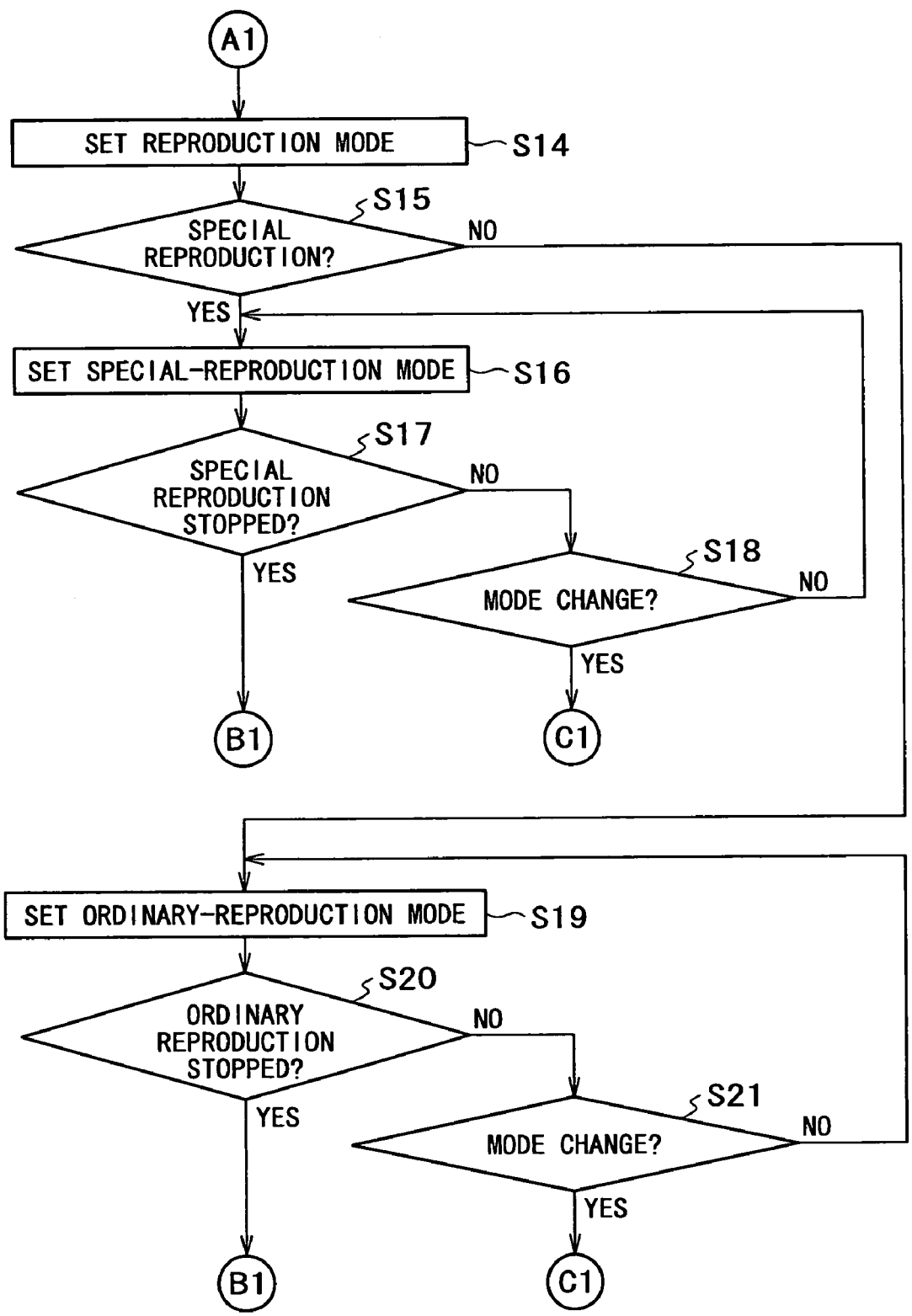
FIG. 9 shows a continuation flowchart of the flowchart shown in FIG. 8.

Next, operations carried out by the recording/reproduction apparatus 100 implemented the first embodiment described above in a recording process are explained by referring to flowcharts shown in FIGS. 8 to 11. FIGS. 8 and 9 show a flowchart referred to in explanation of operations carried out by the recording/reproduction apparatus 100 implemented by the first embodiment. The following description explains a typical case in which pictures each located at a scene-change point are stored in the recording medium as shrunk pictures as shown in FIG. 2C and the shrunk pictures are displayed as a result of classification at the end of the recording process.

Receiving an operation command entered by the user via the user input I/F 18, the system controller 17 carries out operations represented by the flowchart shown in FIGS. 8 and 9. The flowchart begins with a step S1 to determine whether the process requested by the command is a reproduction or recording process. If the determination result obtained at the step S1 indicates that the requested process is a recording process, the flow of the operations goes on to a step S2 at which the system controller 17 controls components employed in the recording/reproduction apparatus 100 to put themselves in a recording mode starting the process to record audio and video signals onto the recording medium 8.

Then, at the next step S3, the video classification process unit 5 detects picture characteristics of each I picture as explained earlier by referring to FIGS. 4 to 6. Subsequently, at the next step S4, the video classification process unit 5 carries out the similarity determination processing and the classification processing on the I pictures. The pieces of processing carried out at the step S4 correspond to the processing to generate an identification information signal as described earlier.

Then, at the next step S5, the system controller 17 compares a specific I picture currently being processed with an I picture immediately preceding the specific I picture on the basis of a result of the classification processing in order to determine whether or not the specific I picture is an I picture located at a cut point (or a scene-change point) by finding out whether or not the specific I picture is not similar to the immediately preceding I picture. The operation of the step S5 is carried out for all the successive I pictures.

Subsequently, at the next step S6, the system controller 17 examines a particular I picture currently being processed to determine whether or not the particular I picture is an I picture located at any one of the cut points detected at the step S5. If the particular I picture currently being processed is an I picture located at any one of the cut points, the flow of the operations goes on to a step S7 at which the system controller 17 controls the shrunk-picture process unit 22 to generate a shrunk picture of the particular I picture and supplies the generated shrunk picture to the multiplexing process unit 6.

After the operation carried out at the step S7 is completed or the determination result obtained at the step S6 indicates that the particular I picture currently being processed is not an I picture located at any one of the cut points, the flow of the operations goes on to a step S8 at which the system controller 17 creates information indicating, among others, how many consecutive frames are similar to each other as information indicating positions, and supplies the information indicating positions to the multiplexing process unit 6 at a step 8. It is to be noted that, in the case of MPEG data, timestamp information can be used as information indicating a position.

Then, at the next step S9, the multiplexing process unit 6 multiplexes the identification information signal with the original signal to be recorded in order to generate a multiplexed signal and records the multiplexed signal onto the recording medium 8 by way of the recording process unit 7. Comprising audio and video data, the original signal to be recorded has been supplied to the multiplexing process unit 6 earlier. The identification information signal includes the information indicating positions or a timestamp signal.

Subsequently, at the next step S10, the system controller 17 determines whether or not the user has entered a command to stop the recording process by way of the user input I/F 18. If the determination result indicates that the user has not entered a command to stop the recording process, the flow of the operations goes back to the step S3 to repeat the operations described above from this step in order to continue the process to record audio and video signals supplied to the recording/reproduction apparatus 100 onto the recording medium.

If the determination result obtained at the step S10 indicates that the user has entered a command to stop the recording process, on the other hand, the flow of the operations goes on to a step S11 to determine whether or not a classification display has been requested. Typically, prior to the start of the recording process, the user indicates whether of not a request for a classification display is to be made at the end of the process.

If the determination result obtained at the step S11 indicates that a request for a classification display is not made, the execution of the operations represented by the flowchart shown in FIGS. 8 and 9 is ended. Then, the recording/reproduction apparatus 100 typically enters a state of waiting for the user to enter a next command. If the determination result obtained at the step S11 indicates that a request for a classification display is made, on the other hand, the flow of the operations goes on to a step S12 at which a classification display is output to the classification display unit 19 to show shrunk pictures stored on the recording medium as shown in FIG. 3.

After a picture classification is displayed, the flow of the operations goes on to a step S13 at which the system controller 17 determines whether or not the user has entered a reproduction command. If the determination result obtained at the step S13 indicates that the user did not enter a reproduction command, the execution of the operations represented by the flowchart shown in FIGS. 8 and 9 is ended. Then, the recording/reproduction apparatus 100 typically enters a state of waiting for the user to enter a next command.

It is to be noted that the recording/reproduction apparatus 100 implemented by this embodiment is capable of reproducing only a group of similar-pictures segments, which resemble each other and include an original picture corresponding to a shrunk picture selected from those shown in the classification display.

If the determination result obtained at the step S1 indicates that the requested process is a reproduction process or if the determination result obtained at the step S13 indicates that the user has entered a reproduction command, on the other hand, the flow of the operations goes on to a step S14 of a continuation flowchart shown in FIG. 9. At this step, the system controller 17 controls components employed in the reproduction system to put the recording/reproduction apparatus 100 in a reproduction mode.

Then, at the next step S15, the system controller 17 determines whether the requested reproduction process is a special reproduction process or an ordinary reproduction process. Examples of the special reproduction process are the digest reproduction and the skimming reproduction processes.

If the determination result obtained at the step S15 indicates that the requested reproduction process is a special reproduction process, the flow of the operations goes on to a step S16 at which the system controller 17 controls components employed in the reproduction system to put the recording/reproduction apparatus 100 in the mode of the requested special reproduction process and carry out the requested special reproduction process. In this requested special reproduction process, the digest reproduction, the skimming reproduction or the classification display reproduction is carried out as a special reproduction operation requested by the user.

Then, at the next step S17, the system controller 17 determines whether or not the user has entered a command to stop the special reproduction process. If the determination result indicates that the user has entered a command to stop the special reproduction process, the execution of the operations represented by the flowchart shown in FIGS. 8 and 9 is ended. Then, the recording/reproduction apparatus 100 typically enters a state of waiting for the user to enter a next command.

If the determination result obtained at the step S17 indicates that the user has not entered a command to stop the special reproduction process, on the other hand, the flow of the operations goes on to a step S18 to determine whether or not a recording process has been requested, that is, whether or not a command has been entered to change the reproduction mode to a recording mode.

If the determination result obtained at the step S18 indicates that a recording process has not been requested, the flow of the operations goes back to the step S18 to continue the special reproduction process. If the determination result obtained at the step S18 indicates that a recording process has been requested, on the other hand, the flow of the operations goes back to the step S1 of the main flowchart shown in FIG. 8 to repeat the operations described above all over again from this step.

If the determination result obtained at the step S15 indicates that the requested reproduction process is not a special reproduction process, on the other hand, the flow of the operations goes on to a step S19 at which the system controller 17 controls components employed in the reproduction system to put the recording/reproduction apparatus 100 in the mode of the ordinary reproduction process and carry out the ordinary reproduction process.

Then, at the next step S20, the system controller 17 determines whether or not the user has entered a command to stop the ordinary reproduction process. If the determination result indicates that the user has entered a command to stop the ordinary reproduction process, the execution of the operations represented by the flowchart shown in FIGS. 8 and 9 is ended. Then, the recording/reproduction apparatus 100 typically enters a state of waiting for the user to enter a next command.

If the determination result obtained at the step S20 indicates that the user has not entered a command to stop the ordinary reproduction process, on the other hand, the flow of the operations goes on to a step S21 to determine whether or not a recording process has been requested, that is, whether or not a command has been entered to change the reproduction mode to a recording mode.

If the determination result obtained at the step S21 indicates that a recording process has not been requested, the flow of the operations goes back to the step S19 to continue the ordinary reproduction process. If the determination result obtained at the step S21 indicates that a recording process has been requested, on the other hand, the flow of the operations goes back to the step S1 of the main flowchart shown in FIG. 8 to repeat the operations described above all over again from this step.

Figure 10:
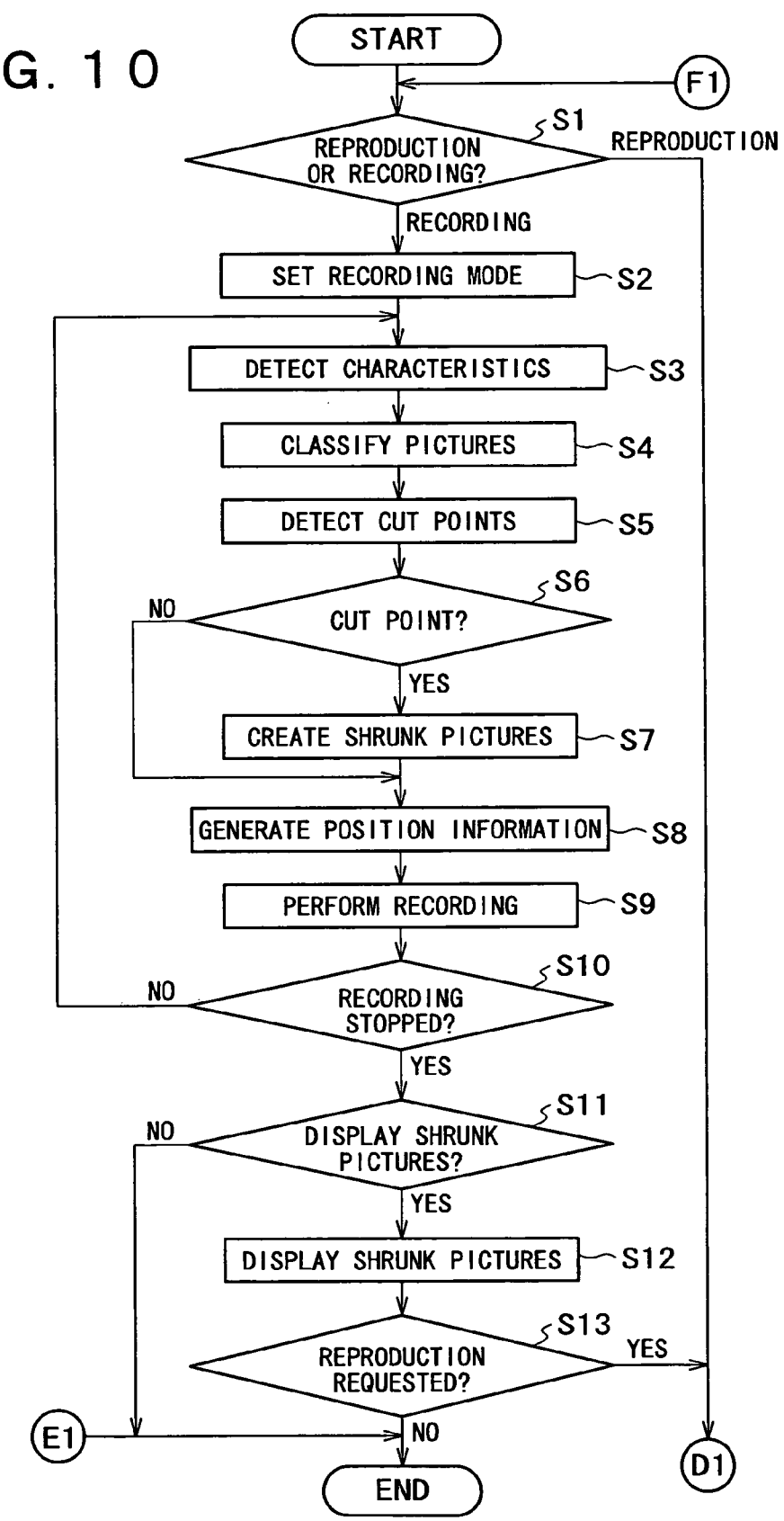
FIG. 10 shows a flowchart referred to in explanation of other operations carried out by the recording/reproduction apparatus implemented by the first embodiment shown in FIG. 1.
Figure 11:
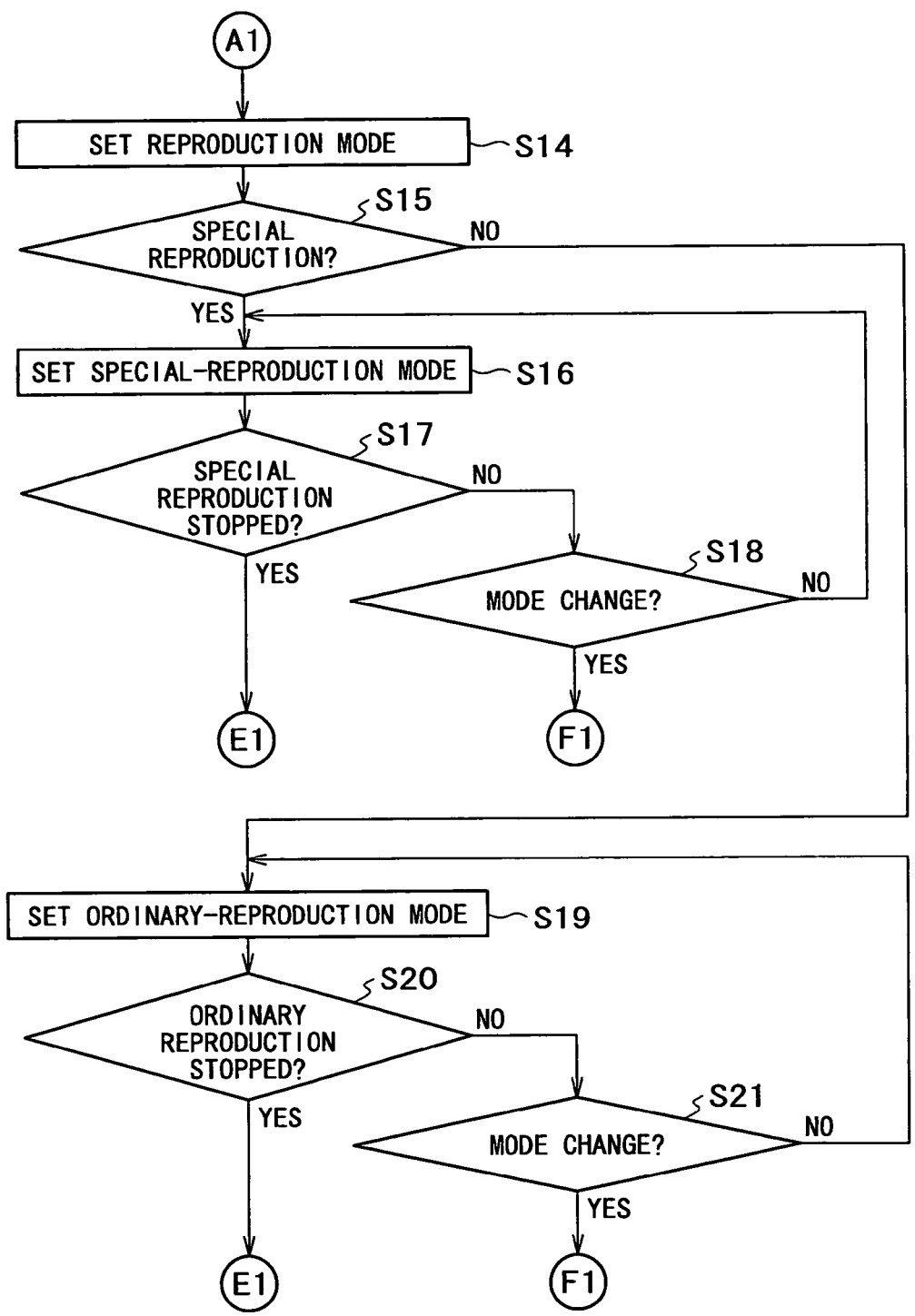
FIG. 11 shows a continuation flowchart of the flowchart shown in FIG. 10.

It is to be noted that FIGS. 10 and 11 show a flowchart referred to in explanation of other operations carried out by the recording/reproduction apparatus to display shrunk pictures of all original pictures in the same frame order as the original pictures as shown in FIG. 2B. The flowchart shown in FIGS. 10 and 11 is all but the same as the flowchart shown in FIGS. 8 and 9 but, since the shrunk pictures are recorded in the same frame order as the original pictures, the information indicating positions is not required. Thus, the operation carried out at the step S8 of the flowchart shown in FIG. 8 is not required in the flowchart shown in FIG. 10.

The other steps of the flowchart shown in FIGS. 10 and 11 are the same as those of the flowchart shown in FIGS. 8 and 9. In the flowchart shown in FIGS. 10 and 11, the other steps identical with their counterparts in the flowchart shown in FIGS. 8 and 9 are denoted by the same reference numerals as the counterparts and the explanations of the counterpart steps are not repeated.

<Summary of the First Embodiment>

As described above, in the process to record video and audio signals of a television broadcast program onto a recording medium, the recording/reproduction apparatus 100 implemented by the first embodiment recognizes characteristics of pictures included in the video signal and carries out similarity determination processing and classification processing to classify similar pictures on the basis of the recognized characteristics.

At the same time, scene-change points are detected. If a plurality of successive frames has similar pictures, shrunk pictures of only original pictures located at the scene-change of the classified pictures are created and information indicating positions of the shrunk and original pictures on the time base or information indicating positions of the frames or the like is detected. Then, an identification information signal such as the data of the shrunk pictures and the information indicating positions is recorded onto the recording medium along with the original video data.

The shrunk pictures are displayed fast for each classification of the classification processing included in the recording process at the same time as the recording process, at the end of the recording process or with a predetermined timing after the recording process. That is to say, a multi-picture display like the one shown in FIG. 3 appears on the display unit as a classification display. From this classification display, recorded data can be grasped efficiently and effectively. In addition, a special process such as the digest reproduction process can be carried out immediately.

Thus, this embodiment is capable of solving problems such as inability to recognize recorded video data without reproducing the entire video data as is the case with the conventional VTR (Video Tape Recorder). That is to say, recorded video data can be grasped quickly and accurately at the same time as the recording process, right after the end of the recording process or with a predetermined timing after the recording process.

It is to be noted that, in the description of the first embodiment, a first information signal serving as the principal object of recording includes video and audio signals of a television broadcast program or the like. However, the first information signal serving as the principal object of recording is by no means limited to such signals. For example, the first information signal serving as the principal object of recording can be either the video signal or the audio signal only.

If the first information signal is an audio signal only, as a second information signal, it is possible to use typically a display message created in the recording/reproduction apparatus. Examples of such a display message are a first musical portion, a second musical portion, a male-voice portion and a female-voice portion.

It is to be noted that, while a musical-sound portion and a conversational-voice portion are detected as described above, a male-voice portion and female-voice portion of an audio signal can be detected on the basis of frequency components of the audio signal.

In addition, the first information signal can be combination data comprising a video signal, program data and text data or combination data including an audio signal, program data and text data. That is to say, the present invention can be applied to other cases as long as in each of the other cases, the similarity determination processing is carried out in predetermined units and an information signal that can be classified into similar-picture segments is used as the first information signal.

In addition, the similarity determination processing and the classification processing can not only be carried out in program units, but also be carried out all the time during a recording process. As another alternative, the time base is divided into time segments and the similarity determination processing as well as the classification processing can also be carried out for each of the time segments. As a further alternative, the similarity determination processing and the classification processing can also be carried out for only a proper unit such as a time unit within a program or a first predetermined time period.

In addition, it may be impossible to accommodate a classification display in a screen. In this case, the classification display can be scrolled in the horizontal (width) direction or the vertical (height) direction so as to make the user capable of viewing all shrunk pictures.

Second Embodiment

Figure 12:
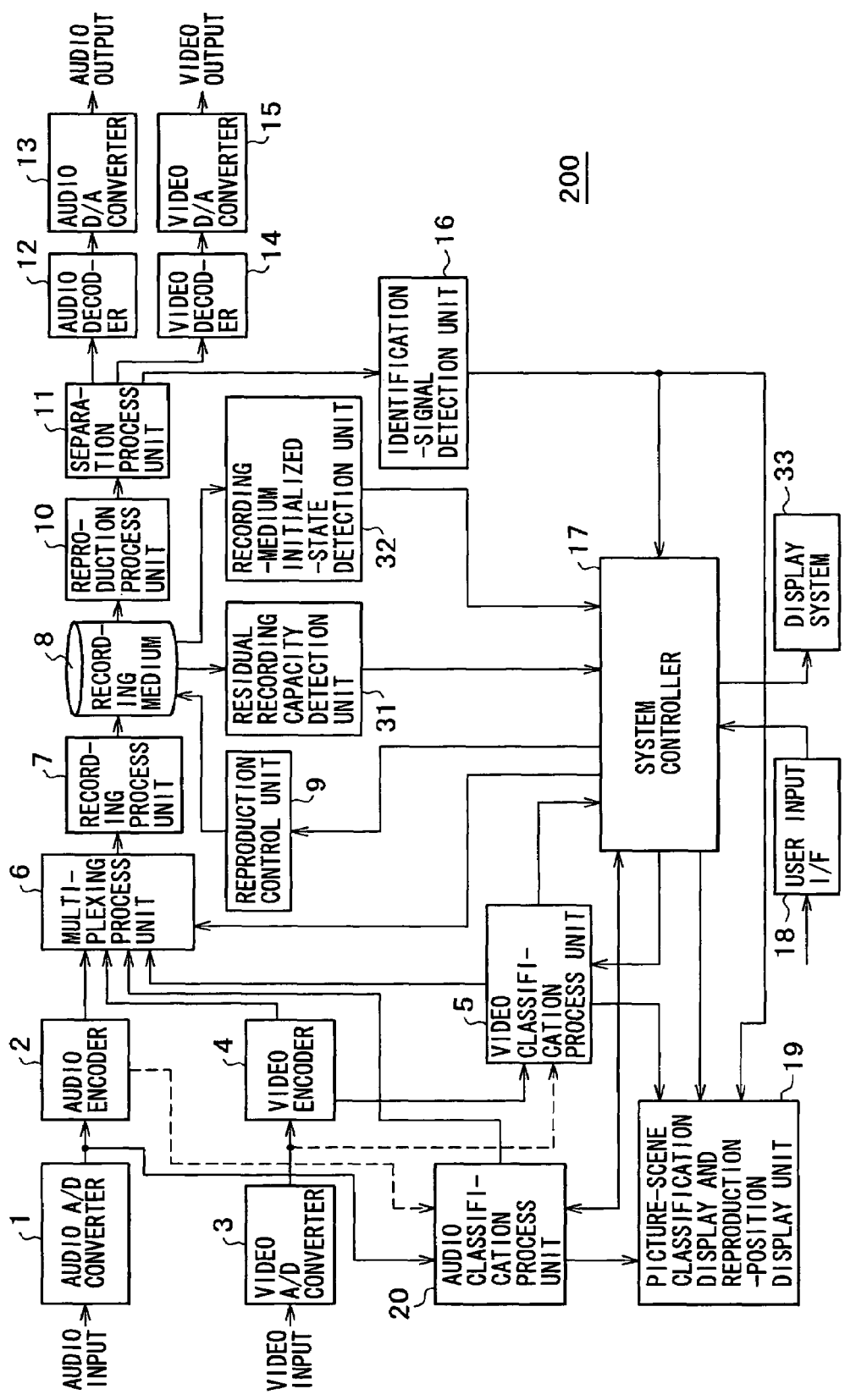
FIG. 12 is an explanatory block diagram showing a recording/reproduction apparatus implemented by a second embodiment to which an embodiment of the information-signal process apparatus and information-signal process method provided by the present invention is applied.

FIG. 12 is an explanatory block diagram showing a recording/reproduction apparatus 200 implemented by a second embodiment to which an embodiment of the information-signal process apparatus and information-signal process method provided by the present invention is applied. FIGS. 13A, 13B, 14 and 15 are explanatory diagrams showing the principle of operation of the recording/reproduction apparatus implemented by the second embodiment.

The recording/reproduction apparatus 200 implemented by the second embodiment shown in FIG. 12 has all but the same configuration as that of the recording/reproduction apparatus implemented by the first embodiment shown in FIG. 1 except that the recording/reproduction apparatus 200 implemented by the second embodiment does not include the I-picture detection unit 21 and shrunk-picture process unit 22 employed in the recording/reproduction apparatus 100 of the first embodiment shown in FIG. 1 and that the recording/reproduction apparatus 200 is newly provided with a residual recording capacity detection unit 31, a recording-medium initialized-state detection unit 32 and a display system 33.

For the reason described above, in the recording/reproduction apparatus 200 implemented by the second embodiment shown in FIG. 12, components identical with their counterparts employed in the recording/reproduction apparatus 100 implemented by the first embodiment shown in FIG. 1 are denoted by the same reference numerals as the counterparts and the detailed explanation of the identical counterparts is not repeated.

In addition to principal information (a first information signal) including all video and audio signals of a television broadcast program, the recording/reproduction apparatus 200 implemented by the second embodiment stores a digest-use signal (summary information or a second information signal) on the recording medium 8 and is thus capable of carrying out a digest reproduction process. The digest-use signal includes a digest-reproduction video signal (summary video information) and a digest-reproduction audio signal (summary audio information), which are used for carrying out a digest reproduction process on the television broadcast program.

The summary information forms a pair in conjunction with the principal signal of the television broadcast program. By viewing the summary information reproduced from the recording medium 8, the user can grasp an outline of contents of the principal information and determine whether or not it is necessary to normally reproduce and watch the principal information. Thus, since the user can grasp an outline of contents of the principal information by merely viewing the summary information reproduced from the recording medium 8, there are many cases in which it is not necessary to normally reproduce the principal information.

In addition, even though the storage capacity of the recording medium is large, the capacity is by no means unlimited. Thus, if the principal information and the summary information are always managed as a pair, it is quite within the bounds of possibility that necessary summary information is also inadvertently erased. If a recording area for storing the principal information and a recording area for storing the summary information are managed by completely separating them from each other, however, it is difficult to associate the principal information with the summary information.

Thus, in order to solve this problem, in the recording/reproduction apparatus implemented by the second embodiment, principal information and summary information are managed by associating the principal information and the summary information with each other and, when the storage capacity of a recording area remaining in the recording medium 8 becomes insufficient for storing new principal information, principal information of a least recent date is erased from the recording medium 8 but summary information is deliberately left in the recording medium 8, taking precedence of principal information so that the recording medium 8 can be utilized effectively. As a result, an information signal such as a video signal stored on the recording medium 8 can be used effectively and with a high degree of efficiency.

It is to be noted that the summary information is information used for carrying out a digest reproduction process. An example of the summary information is information created by extracting video and audio signals of segments, which each precede and succeed a scene change resulting typically from a change of a camera work as well as have an audio level equal to or higher than a predetermined value, from the principal signal.

To put it concretely, summary information like one shown in FIG. 13B is created by extracting video and audio signals of segments A1, A2 and A3, which each precede and succeed a scene change as shown in FIG. 13A as well as have an audio level equal to or higher than a predetermined value.

In addition, as another example, summary information for digest reproduction use may also be conceivably created from audio and video signals of similar portions detected as portions having similar audio signals of a television broadcast program. Consider a news program as this other example. In this case, by merely reproducing a scene of the appearance of a newscaster, it is conceivably possible to grasp an outline of the news. In addition, in the case of a popular-song program, by merely carrying out a digest reproduction process on a scene broadcasting music, the contents of the program can be grasped.

It is to be noted that, in the second embodiment described above, summary information is created by extracting video and audio signals of segments, which each precede and succeed a scene change and have an audio level equal to or higher than a predetermined value, as shown in FIGS. 13A and 13B.

<Principle of Operation>

First of all, the principle of operation of the recording/reproduction apparatus 200 implemented by the second embodiment is explained. As also described earlier, the recording/reproduction apparatus 200 implemented by the second embodiment is capable of storing both principal information, which includes all video and audio signals of a television broadcast program, and summary information on the recording medium 8. The summary information is the so-called abstract of the principal information. The summary information is a digest-reproduction signal used to grasp an outline of a television broadcast program, which can otherwise be viewed only by reproducing the principal information.

Figure 14A:
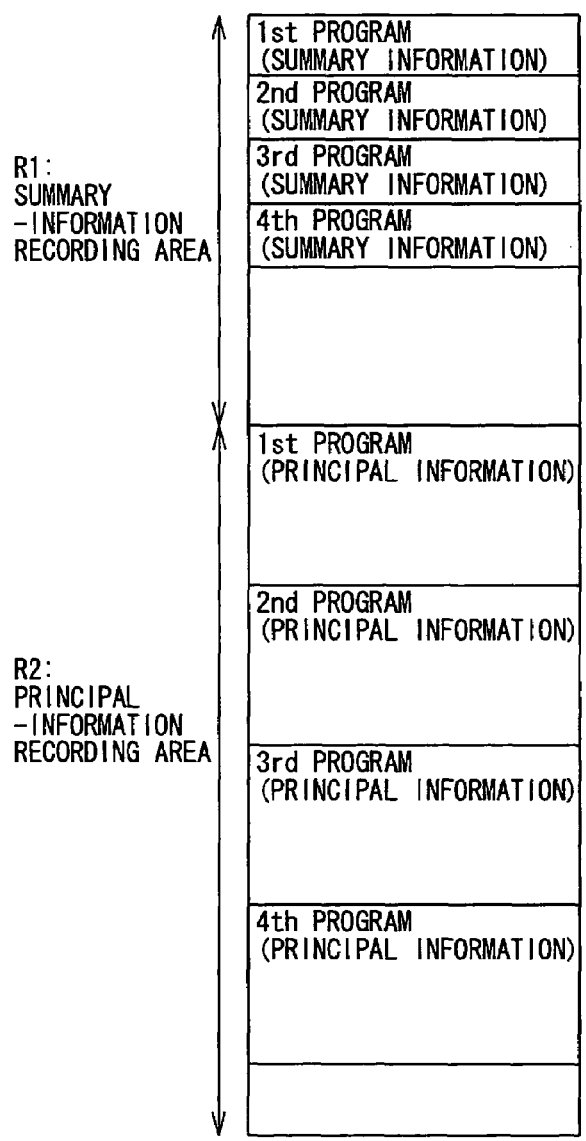
FIGS. 14A to 14B are an explanatory diagrams showing an outline of operations carried out by the recording/reproduction apparatus implemented by the second embodiment shown in FIG. 12.

In addition, in the case of the recording/reproduction apparatus 200 implemented by the second embodiment, the recording area of the recording medium 8 is divided into an area R1 used as a recording area for storing the summary information only and an area R2 used as a recording area for storing the principal information only as shown in FIG. 14A. Thus, the summary information is stored in the recording area R1 of the recording medium 8 while the principal information is stored in the recording area R2 of the recording medium 8.

The system controller 17 employed in the recording/reproduction apparatus 200 monitors a residual storage capacity of the recording medium 8 through the residual recording capacity detection unit 31. The following description explains a case in which the remaining storage capacity of the recording area R2 for storing principal information becomes insufficient as detected in an operation to record the summary information and the principal information, which pertain to a fifth program, after operations to store the summary information and the principal information are completed for first to fourth programs as shown in FIG. 14A.

Figure 14B:
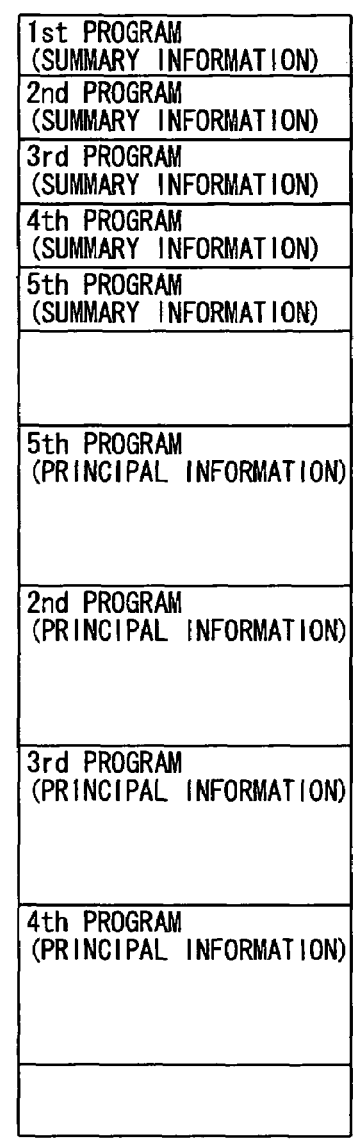

In such a case, the summary information of the fifth program is stored as it is in the recording area R1 provided in the recording medium 8 as an area allocated to summary information, and the principal information of the fifth program is stored in a recording area for storing the principal information of the first program recorded on a least recent recording date, overwriting (being superposed on) the principal information of the first program as shown in FIG. 14B.

If the principal information of the fifth program cannot all be accommodated in the recording region for storing the principal information of the first program, the remaining information of the principal information of the fifth program is recorded in a region following a recording region for storing the principal information of the fourth program.

By storing the information of the fifth program as described above, however, even though the principal information of the first program is unavoidably erased, the principal information of the fifth program, which is the most recent program, can be stored in the recording medium 8. On top of that, since the summary information of the first program is not deleted, by carrying out a digest reproduction process to reproduce the summary information of the first program at any time, an outline of the first program can be grasped.

It is to be noted that, if it is feared that the size of the recording area R1 itself left in the recording medium 8 also becomes insufficient, the system controller 17 reports this situation to the user through the display system 33, to prompt the user to pay attention to this situation. That is to say, the user is requested to rearrange information already stored on the recording medium 8 or extend the recording area thereof.

Figure 15A:
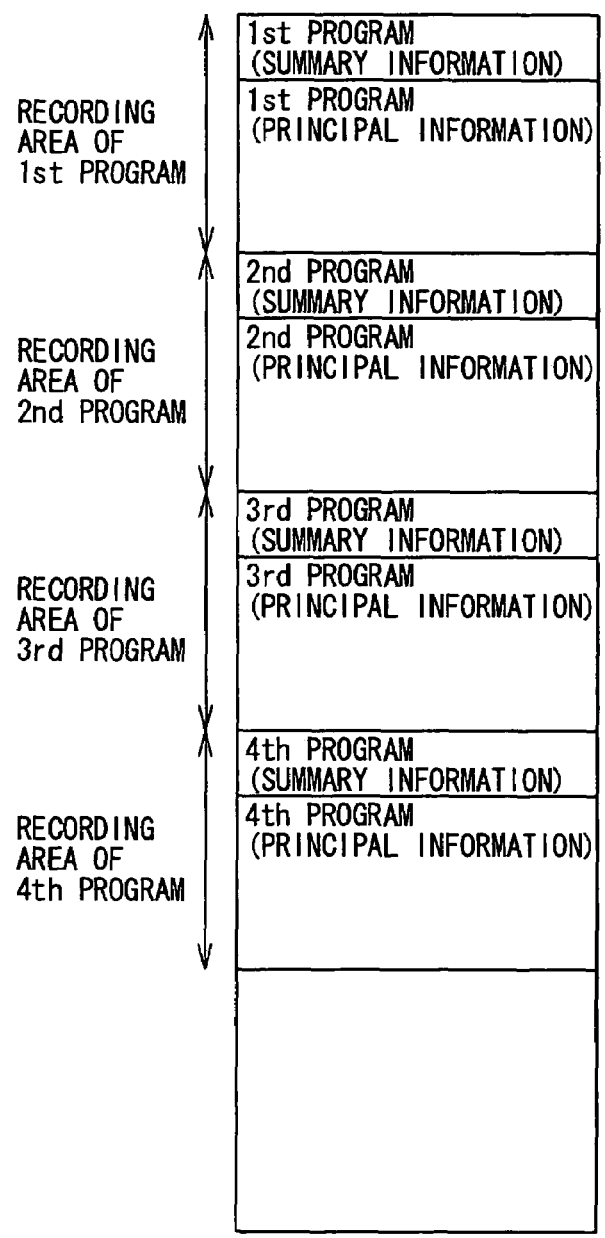
FIGS. 15A to 15B are an explanatory diagrams showing an outline of operations carried out by the recording/reproduction apparatus implemented by the second embodiment shown in FIG. 12.
Figure 15B:
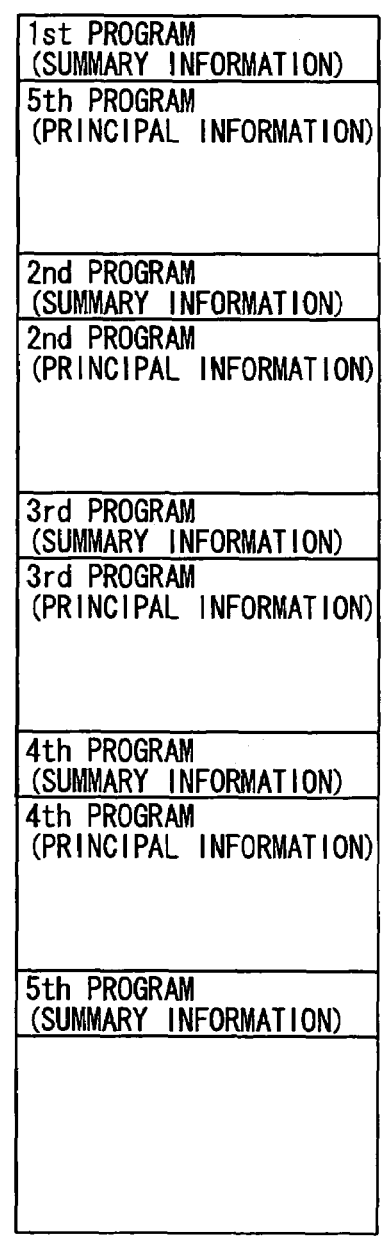

In the case of the example shown in FIG. 14, the recording area of the recording medium 8 is divided into the recording area R1 allocated to summary information and the recording area R2 allocated to principal information in advance as described above. It is worth noting, however, that the use of the recording area of the recording medium 8 is by no means limited to such division. For example, each principal information and summary information for the principal information can also be stored in areas adjacent to each other as shown in FIG. 15A. As the remaining recording area is expected to become insufficient, the principal information of the fifth program, which is the most recent program, is stored in a recording area for storing the principal information of the first program recorded on a least recent recording date, overwriting (being superposed on) the principal information of the first program as shown in FIG. 15B.

In a word, by replacing the least recent principal information by most recent principal information but leaving the summary information for the least recent principal information in the recording area as it is, it is possible to avoid a situation in which summary information associated with principal information of interest to the user is also inevitably deleted so that an outline of the principal information of interest to the user cannot be grasped.

<Operations and Configuration of the Recording/Reproduction Apparatus 200 Implemented by the Second Embodiment>

The following description explains the configuration of the recording/reproduction apparatus 200 implemented by the second embodiment shown in FIG. 12 and operations carried out thereby. As shown in FIG. 12, the recording/reproduction apparatus 200 implemented by the second embodiment includes the recording-medium initialized-state detection unit 32. The recording-medium initialized-state detection unit 32 is a component for determining whether or not the recording medium 8 is an initialized state, which is a state of no information such as video data and audio data recorded on the recording medium 8.

A determination result produced by the recording-medium initialized-state detection unit 32 is reported to the system controller 17. If the result of determination indicates the initialized state of no information signal recorded on the recording medium 8, the system controller 17 reports this state to the user through the display system 33 to prompt the user to enter an input of selecting either the first recoding method shown in FIG. 14 or the second recoding method shown in FIG. 15 as a technique for recording information signals onto the recording medium 8.

Assume for example that the user prefers the first recoding method shown in FIG. 14. In this case, information signals can be managed by dividing the recording medium 8 into the recording area R1 allocated to summary information and the recording area R2 allocated to principal information. Thus, the recording medium 8 is convenient for a case in which pieces of principal information recorded for typically several weeks need to be accommodated but pieces of summary information recorded for at least several months must be saved.

In the case of the first recoding method, no warning is issued till the recording area allocated to summary information becomes insufficient. Thus, the first recoding method offers a merit that least past summary information can be stored and kept with a high degree of reliability and most recent pieces of principal information can be recorded and saved reliably without frequently rearranging information already stored in the recording medium 8.

In the case of the second recoding method shown in FIG. 15, on the other hand, it is not necessary to allocate large first and second recording areas in advance. Thus, the recording area can be used with a high degree of efficiency. In addition, since there is neither recording area allocated specially to summary information nor recording area allocated specially to principal information, the second recoding method also has a merit of an ability to record summary and principal information over a relatively long period of time. As the recording area is all used up for storing information, however, there may be generated a case in which both summary information and principal information can no longer be recorded.

Either the first recording method or the second recording method needs to be selected in accordance with the way in which the user wants to utilize the recording/reproduction apparatus. The user enters an input specifying which recording method is to be adopted to the recording/reproduction apparatus through the user input I/F 18. Such an input is then set in typically a non-volatile memory employed in the system controller 17. Every time a recording process is carried out, the non-volatile memory is referred to for the recording method to be adopted so that an information signal can be recorded onto the recording medium 8 in accordance with the recording method preferred by the user.

It is to be noted that, typically, the first recoding method shown in FIG. 14 is set in advance in the memory as a default recording method. If necessary, however, the default recording method can be replaced with the second recoding method shown in FIG. 15. It is needless to say that, conversely, the second recoding method shown in FIG. 15 may be set in advance in the memory as a default recording method and, if necessary, the default recording method can be replaced with the first recoding method shown in FIG. 14.

Then, much like the recording/reproduction apparatus 100 implemented by the first embodiment described earlier, in the recording/reproduction apparatus 200 implemented by the second embodiment, the analog audio signal of a television broadcast program is processed by the audio A/D converter 1 and the audio encoder 2 to generate compressed audio data, which is then supplied to the multiplexing process unit 6. On the other hand, the analog video signal of the television broadcast program is processed by the video A/D converter 3 and the video encoder 4 to generate compressed video data, which is then supplied to the multiplexing process unit 6. The multiplexing process unit 6 subsequently multiplexes the video and audio data to produce principal information.

Much like the video classification process unit 5 employed in the recording/reproduction apparatus 100 implemented by the first embodiment described earlier, the video classification process unit 5 employed in the recording/reproduction apparatus 200 implemented by the second embodiment carries out the picture-similarity determination processing to classify the principal information into similar-picture segments and non-similar-picture segments, supplying results of the determination to the system controller 17. In this case, the video classification process unit 5 supplies an identification information to the multiplexing process unit 6 as a signal conveying required information to be added to the principal information.

Much like the audio classification process unit 20 employed in the recording/reproduction apparatus 100 implemented by the first embodiment described earlier, the audio classification process unit 20 employed in the recording/reproduction apparatus 200 implemented by the second embodiment is capable of recognizing a musical-signal segment and a conversational-voice-signal segment. In the case of the second embodiment, however, the recording/reproduction apparatus 200 also detects the audio level of an audio signal and supplies information on the detected audio level to the system controller 17. In this case, the audio classification process unit 20 supplies an identification information to the multiplexing process unit 6 as a signal conveying required information to be added to the principal information.

On the basis of the determination results received from the video classification process unit 5 and the information received from the audio classification process unit 20 as information on a detected audio level, the system controller 17 identifies predetermined video-signal and audio-signal segments, which each precede and succeed a picture located at a scene-change point as well as have an audio level equal to or higher than a predetermined value, as segments to be used in a digest-reproduction process, and supplies information on the identified segments to the multiplexing process unit 6.

On the basis of the segment identification information received from the system controller 17, the multiplexing process unit 6 extracts information of the predetermined segments from the principal information as summary information to be used in a digest reproduction process. That is to say, the multiplexing process unit 6 creates the summary information from the principal information in accordance with control executed by the system controller 17.

The principal and summary information created by the multiplexing process unit 6 is recorded onto the recording medium 8 by way of the recording process unit 7. In this case, the system controller 17 controls the recording process unit 7 to record the principal and summary information onto the recording medium 8 by adoption of either the first recording method shown in FIG. 14 or the second recording method shown in FIG. 15 as a recording technique selected in advance as described above.

As a result, the principal and summary information is recorded onto the recording medium 8 as shown in FIG. 14 or 15. In the second embodiment, the recording process unit 7 has not only a function to create a recording-use signal but also a recording head unit for recording the created recording-use signal onto the recording medium. The system controller 17 controls the position of the recording head unit to select a recording region into which the recording-use signal is to be recorded.

It is to be noted that, much like the classification display of the recording/reproduction apparatus 100 implemented by the first embodiment, shrunk pictures of original pictures located at scene-change points can be displayed on the classification display unit 19 at a recording time, or pictures and a sound, which are extracted for a digest reproduction process, can also be output to the classification display unit 19.

In addition, an information signal already recorded on the recording medium 8 is reproduced in the same way as the recording/reproduction apparatus 100 implemented by the first embodiment. If the determination result indicates that the user enters a command making a request for a digest reproduction process of a program by operating the user input I/F 18, however, the system controller 17 controls the reproduction control unit 9 to read out summary data of a program specified in the command from the recording medium 8 and supply the summary data to the separation process unit 11 by way of the reproduction process unit 10. The separation process unit 11 separates audio and video portions of the summary data from each other.

Then, the separation process unit 11 outputs the audio portion of the summary data to a speaker by way of the audio decoder 12 and the audio D/A converter 13 and outputs the video portion of the summary data to a monitor receiver by way of the video decoder 14 and the video D/A converter 15 in the digest reproduction process.

It is to be noted that the video classification process unit 5 and the audio classification process unit 20 are both capable of carrying out the classification processing on data prior to the compression process.

<Operations of the Recording/Reproduction Apparatus 200>

Figure 16:
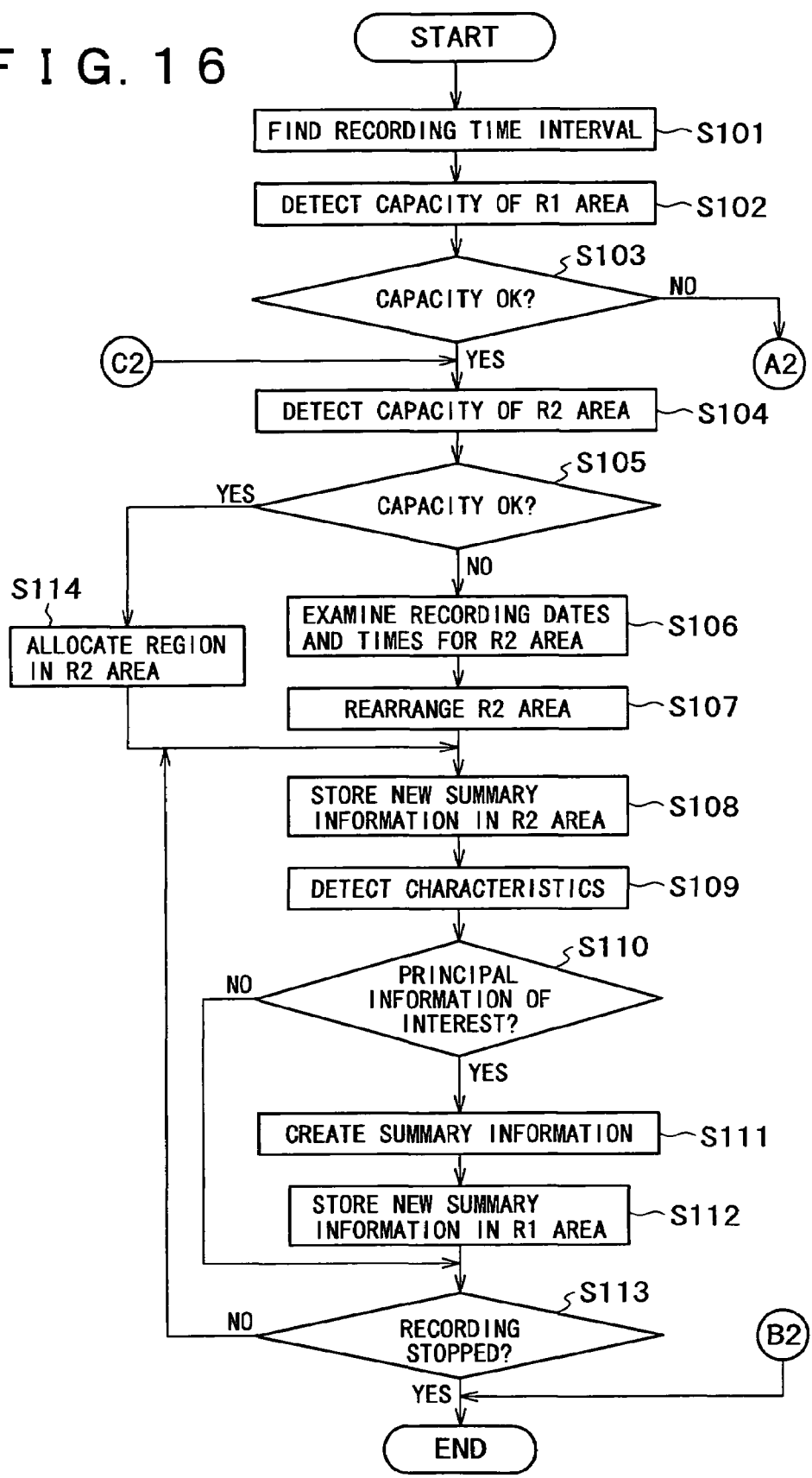
FIG. 16 shows a flowchart referred to in explanation of operations carried out by the recording/reproduction apparatus implemented by the second embodiment shown in FIG. 12.
Figure 17:
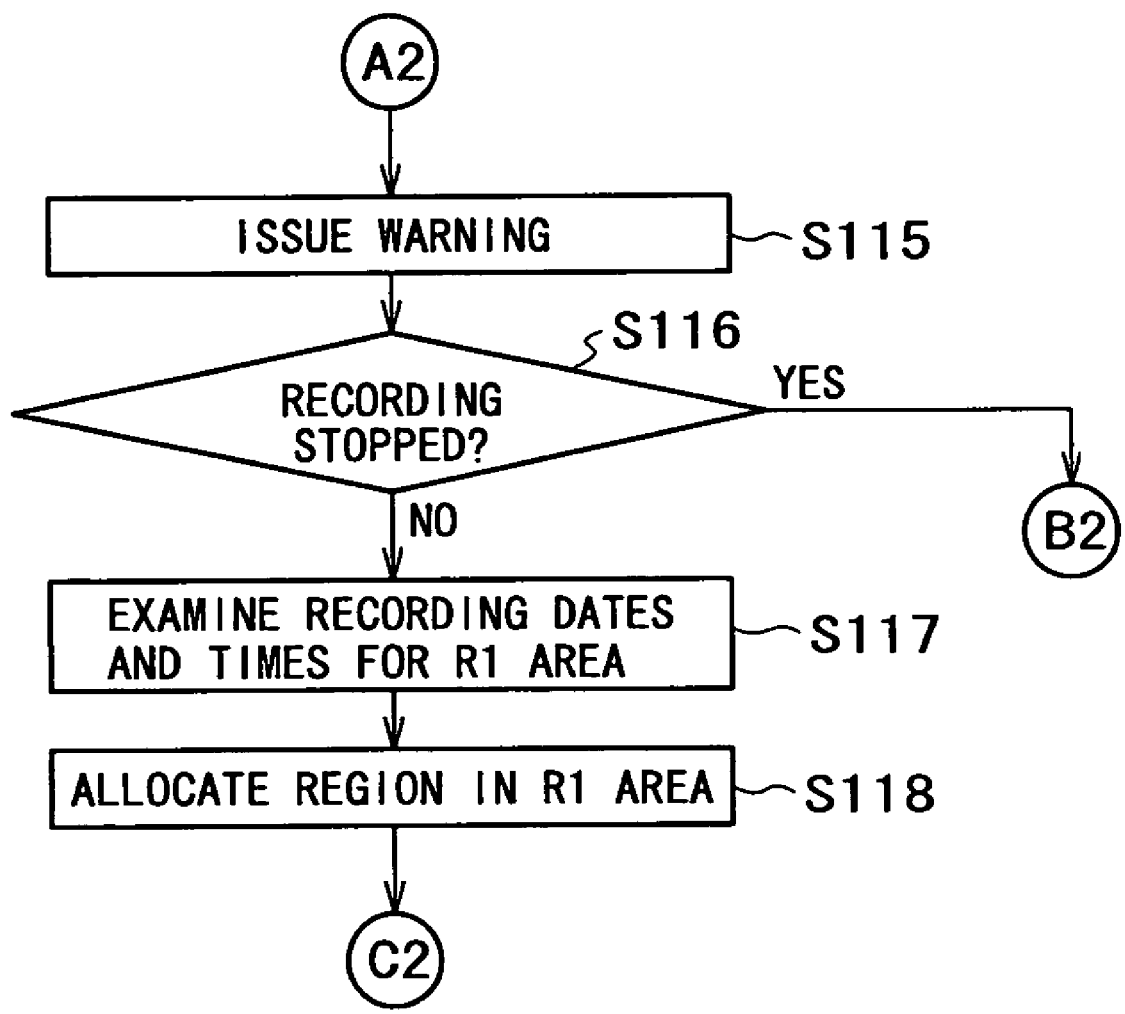
FIG. 17 shows a continuation flowchart of the flowchart shown in FIG. 16.

Next, operations carried out by the recording/reproduction apparatus 200 implemented by the second embodiment are explained by referring to a flowchart shown in FIGS. 16 and 17. In order to make the explanation simple, the flowchart shown in FIGS. 16 and 17 assumes a typical case in which a recording time interval has been set in advance in terms of a recording start time and a recording end time as is the case with timer video recording or reservation video recording.

When the user requests that the timer recording be started, the system controller 17 computes a recording time interval (from the specified recording start time to the specified recording end time) by subtracting the specified recording start time from the specified recording end time at a step S101.

Then, at the next step S102, the system controller 17 computes a residual storage capacity of the recording area R1 allocated to summary information on the basis of a detection output received from the residual recording capacity detection unit 31. Subsequently, at the next step S103, the system controller 17 determines whether or not the computed residual storage capacity is equal to or greater than a value determined in advance, that is, whether or not the computed residual storage capacity is equal to or greater than the amount of summary information estimated for the recording time interval found at the step S101.

If the determination result obtained in the operation carried out at the step S103 indicates that the computed residual storage capacity of the recording area R1 allocated to summary information is equal to or greater than the value determined in advance, the flow of the operations goes on to a step S104 at which the system controller 17 computes a residual storage capacity of the recording area R2 allocated to principal information on the basis of a detection output received from the residual recording capacity detection unit 31. Subsequently, at the next step S105, the system controller 17 determines whether or not the computed residual storage capacity is equal to or greater than a capacity determined in advance, that is, whether or not the computed residual storage capacity is equal to or greater than the amount of principal information estimated for the recording time interval found at the step S101.

If the determination result obtained in the operation carried out at the step S105 indicates that the computed residual storage capacity of the recording area R2 allocated to principal information is equal to or greater than the value determined in advance, the flow of the operations goes on to a step S114 at which the system controller 17 allocates a recording area in the recording medium 8 to the current principal information to be recorded this time. Then, at the next step S108, the system controller 17 records the principal information into the allocated area of the recording medium 8.

If the determination result obtained in the operation carried out at the step S105 indicates that the computed residual storage capacity of the recording area R2 allocated to principal information is not sufficient, on the other hand, the flow of the operations goes on to a step S106 at which the system controller 17 identifies a recording region used for recording the least recent principal information among pieces of principal information already recorded on the recording medium 8. Then, at the next step S107, the system controller 17 starts controlling the recording process unit 7 to record the current principal information into the identified recording region. Subsequently, at the next step S108, the recording process unit 7 overwrites the current principal information being recorded this time on the least recent principal information recorded in the identified recording region.

Then, at the next step S109, characteristics of the principal information are detected by carrying out the picture similarity processing and the picture classification processing in the video classification process unit 5 as well as audio-level detection processing in the audio classification process unit 20. Subsequently, at the next step S110, the system controller 17 identifies signal segments to be used in a digest reproduction process, and determines whether the principal information being processed is principal information of a signal segment for which summary information is to be created.

If the determination result obtained in the operation carried out at the step S110 indicates that the principal information being processed is principal information of a signal segment for which summary information is to be created, the flow of the operations goes on to a step S111 at which operations such as identification processing are carried out to extract the principal information from the segment to be used as the summary information and to attach additional information to the extracted summary information to create the summary information. The additional information attached to the summary information is information that can be used to indicate that the summary information is of the principal information. Then, at the next step S112, the summary information is recorded into the recording area R1 allocated to summary information.

If the determination result obtained in the operation carried out at the step S110 indicates that the principal information being processed is not principal information of a signal segment for which summary information is to be created, on the other hand, the flow of the operations goes on to a step S113. The flow of the operations also goes on to a step S113 after the operation carried out at the step S112 is completed. At the step S113, the system controller 17 determines whether or not the user has entered a command to stop the recording process. If the system controller 17 determines that the user has not entered a command to stop the recording process, the flow of the operations goes back to the step S108 to repeat the operations described above from this step.

If the determination result obtained in the operation carried out at the step S113 indicates that the user has entered a command to stop the recording process, on the other hand, the execution of the operations represented by the flowchart shown in FIGS. 16 and 17 is ended. Then, the recording/reproduction apparatus 200 typically enters a state of waiting for the user to enter a next command.

If the determination result obtained in the operation carried out at the step S103 indicates that the computed residual storage capacity of the recording area R1 allocated to summary information is not sufficient, on the other hand, the flow of the operations goes on to a step S115 of a continuation flowchart shown in FIG. 17. At the step S115, the system controller 17 issues a warning to the user by way of the display system 33. Then, at the next step S116, the system controller 17 determines whether or not the user has entered a command to stop the recording process. If the determination result obtained in the operation carried out at the step S116 indicates that the user has entered a command to stop the recording process, the system controller 17 ends the execution of the operations represented by the flowchart shown in FIGS. 16 and 17.

If the determination result obtained in the operation carried out at the step S116 indicates that the user did not enter a command to stop the recording process or the user has entered a command to continue the recording process, on the other hand, the flow of the operations goes on to a step S117 at which the system controller 17 identifies the least recent summary information among pieces of summary information already recorded in the recording area R1 allocated to summary information. Then, at the next step S118, the system controller 17 sets the recording region used for storing the identified least recent summary information as a recording region for storing the current summary information. Subsequently, the flow of the operations goes back to the step S104 of the main flowchart shown in FIG. 16 to repeat the operations described above from this step.

Figure 18:
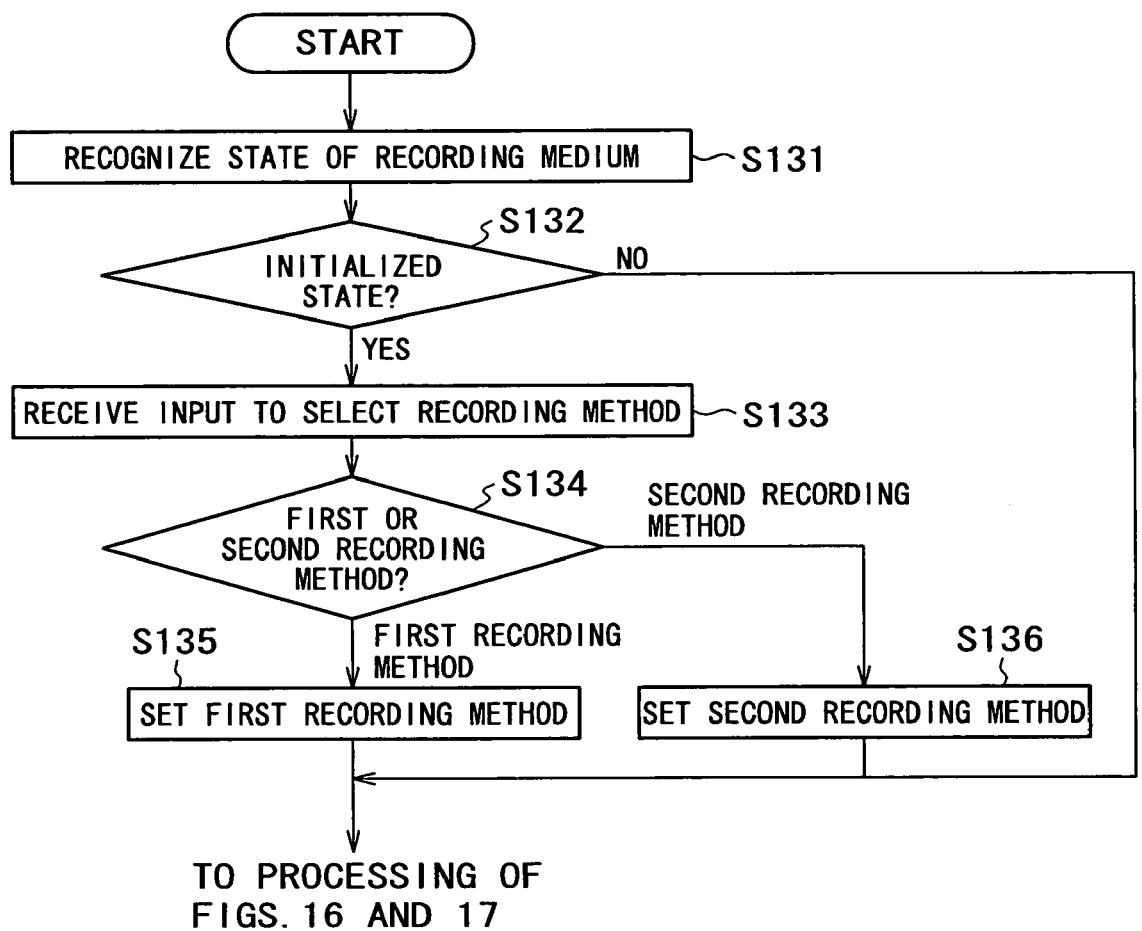
FIG. 18 shows a flowchart referred to in explanation of other operations carried out by the recording/reproduction apparatus implemented by the second embodiment shown in FIG. 12.

The following description explains operations carried out by the recording/reproduction apparatus 200 for a case in which the recording medium 8 is still in an initialized state as it is, allowing a recording method to be selected. FIG. 18 shows a flowchart referred to in explanation of the other operations carried out by the recording/reproduction apparatus 200 for a case in which the recording medium 8 is still in an initialized state as it is, allowing a recording method to be selected.

The operations represented by the flowchart shown in FIG. 18 are a process carried out in accordance with a command entered as a request for execution of the process such as a setting process including a timer recording process. The processing represented by the flowchart shown in FIG. 18 begins with a step S131 at which the system controller 17 recognizes the state of the recording medium 8 on the basis of a detection result received from the recording-medium initialized-state detection unit 32.

Then, at the next step S132, the system controller 17 determines whether or not the recording medium 8 is still in an initialized state as it is with no information signal recorded thereon.

If the determination result obtained in the operation carried out at the step S132 indicates that an information signal has been recorded on the recording medium 8, the recording/reproduction apparatus 200 exits from the process represented by the flowchart shown in FIG. 18. Then, typically, the recording/reproduction apparatus 200 carries out the process represented by the flowchart shown in FIGS. 16 and 17.

If the determination result obtained in the operation carried out at the step S132 indicates that the recording medium 8 is still in an initialized state as it is, on the other hand, the flow of the process goes on to a step S133 at which the system controller 17 shows a message to the user through the display system 33. The message prompts the user to enter an input of selecting a recording method. The system controller 17 then receives an input entered by the user through the user input I/F 18 as the input of selecting a recording method.

Then, at the next step S134, the system controller 17 determines whether or not the input of selecting a recording method selects the first or second recording method. If the determination result obtained in the operation carried out at the step S134 indicates that the input of selecting a recording method selects the first recording method, the flow of the process goes on to a step S135 at which the system controller 17 sets data, which indicates that the first recording method has been selected, in a non-volatile memory employed in the system controller 17.

If the determination result obtained in the operation carried out at the step S134 indicates that the input of selecting a recording method selects the second recording method, on the other hand, the flow of the process goes on to a step S136 at which the system controller 17 sets data, which indicates that the first recording method has been selected, in a non-volatile memory employed in the system controller 17. After the operation carried out at the step S135 or S136 has been completed, the recording/reproduction apparatus 200 exits from the process represented by the flowchart shown in FIG. 18. Then, typically, the recording/reproduction apparatus 200 carries out the process represented by the flowchart shown in FIGS. 16 and 17. It is to be noted that the process represented by the flowchart shown in FIG. 18 can be modified to bypass the operation in case a recording method has been selected before and the data indicating the selected recording method has already been set.

<Summary of the Second Embodiment>

As described above, the recording/reproduction apparatus 200 implemented by the second embodiment manages principal information and summary information by associating a recording area allocated to the principal information with a recording area allocated to the summary information. If the residual storage capacity of the recording medium 8 including the recording areas becomes insufficient, summary information is deliberately left in the recording area of the recording medium 8, taking precedence of principal information associated with the summary information so that the recording medium 8 can be used with a high degree of efficiency. As a result, an information signal such as a video signal recorded on the recording medium 8 can be utilized effectively and with a high degree of efficiency.

That is to say, by preferentially leaving summary information in the recording area of the recording medium 8, it is possible to prevent necessary information from being erased mistakenly and to utilize the recording medium with a high degree of efficiency.

In addition, since summary information is preferentially left in the recording area of the recording medium 8, a digest reproduction process of the summary information can be carried out at any time, making it possible to grasp an outline of the principal information associated with the summary information with a high degree of effectiveness in a short period of time. As a result, the principal information can be reproduced less frequently and, even if principal information is deleted, most other pieces of desired principal information can still be reproduced.

On top of that, even in operations to copy and move information already recorded on a recording medium to another recording medium, the amount of processing to complicatedly process the recorded information can be reduced so that the processing and rearrangement of the recorded information can be carried out with a high degree of efficiency.

It is to be noted that, the second embodiment has been explained by taking video and audio signals of a television broadcast program as a pair of information signals to be recorded. However, the scope of the present invention is by no means limited to this second embodiment. That is to say, the information signal can be only the video signal or only the audio signal. As another alternative, the information signal can also be text data.

In addition, in accordance with the explanation, the recording medium 8 is used mainly for recording video and audio signals. However, the recording medium 8 may include a recording area for storing a program and a recording area for storing various kinds of data.

On top of that, in accordance with the recording method shown in FIG. 15, summary information and principal information forming a pair are stored in recording regions adjacent to each other as described above. However, it is not always necessary to allocate adjacent recording regions to such a pair. Of course, it is possible to allocate a recording region to a piece of summary information at a location separated away from a recording region to a piece of principal information forming a pair with the piece of summary information.

Moreover, it is sufficient to create summary information having such an amount that the summary information can be used to grasp an outline of information represented by the entire principal information associated with the summary information. Thus, in the second embodiment, summary information is generated by extracting portions of principal information for which the summary information is created. The way to generate summary information is by no means limited to the technique adopted by the second embodiment. For example, summary information can also be generated as information different from principal information for which the summary information is created and used in a digest reproduction process.

Third Embodiment

Figure 19:
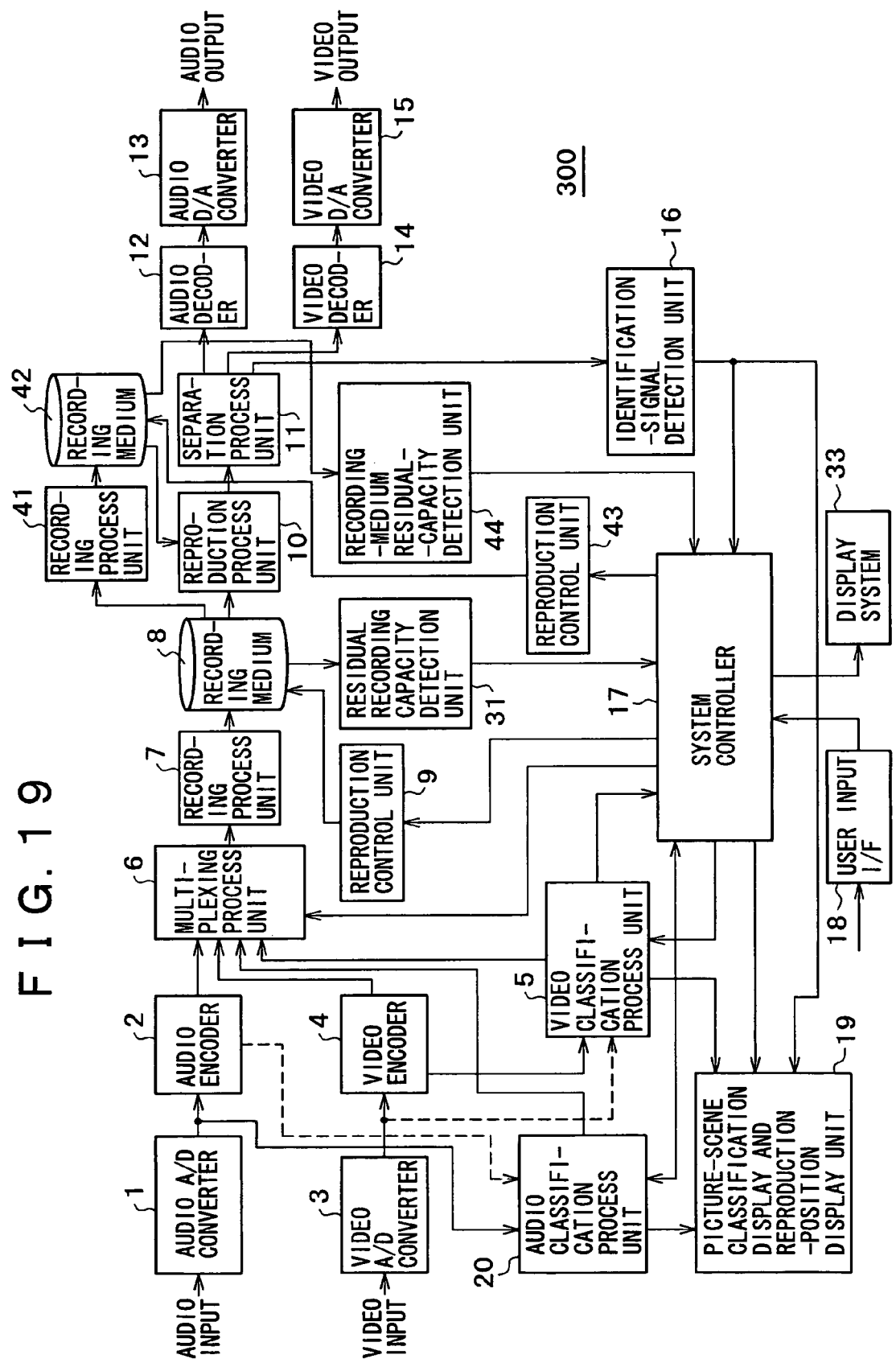
FIG. 19 is an explanatory block diagram showing a recording/reproduction apparatus implemented by a third embodiment to which an embodiment of the information-signal process apparatus and information-signal process method provided by the present invention is applied.

FIG. 19 is an explanatory block diagram showing a recording/reproduction apparatus 300 implemented by a third embodiment to which an embodiment of the information-signal process apparatus and information-signal process method provided by the present invention is applied.

The recording/reproduction apparatus implemented by the third embodiment shown in FIG. 19 is different from the recording/reproduction apparatus 200 implemented by the second embodiment shown in FIG. 12 in that the recording/reproduction apparatus implemented by the third embodiment does not have the recording-medium initialized-state detection unit 32 employed in the recording/reproduction apparatus 200. As a matter of fact, the configuration of the recording/reproduction apparatus implemented by the third embodiment shown in FIG. 19 is all but the same as the configuration of the recording/reproduction apparatus 200 implemented by the second embodiment shown in FIG. 12 except for the fact that the recording/reproduction apparatus implemented by the third embodiment is newly provided with a second recording process unit 41, a second recording medium 42, a second reproduction control unit 43 and a recording-medium residual-capacity detection unit 44.

In addition, as described above, the recording/reproduction apparatus 200 implemented by the second embodiment shown in FIG. 12 includes many portions each having the same configuration as its counterpart employed in the recording/reproduction apparatus 100 implemented by the first embodiment shown in FIG. 1. Thus, in the recording/reproduction apparatus 300 implemented by the third embodiment shown in FIG. 19, many portions having the same configurations as their counterparts employed in the recording/reproduction apparatus 100 implemented by the first embodiment shown in FIG. 1 or their counterparts employed in the recording/reproduction apparatus 200 implemented by the second embodiment shown in FIG. 12 are denoted by the same reference numerals as the counterparts and detailed descriptions of the counterparts are not repeated.

<Principle of Operation>

Much like the recording/reproduction apparatus 200 implemented by the second embodiment, in a process carried out by the recording/reproduction apparatus 300 implemented by the third embodiment to record principal information including all video and audio signals representing a television broadcast signal onto a recording medium 8, identifications are also recorded on the recording medium 8 as information additional to the principal information so that summary information identified by the identifications can be extracted later in a digest-reproduction process to reproduce mutually separated portions of the principal information as explained earlier by referring to FIGS. 13A and 13B.

In the recording/reproduction apparatus 200 implemented by the second embodiment described earlier, summary information is also created as information additional to principal information and recorded on the recording medium. In the case of the recording/reproduction apparatus 300 implemented by the third embodiment, after a recording process, summary information is extracted from principal information to be used in a digest reproduction process.

In the case of the recording/reproduction apparatus 300 implemented by the third embodiment, however, unlike the recording/reproduction apparatus 200 implemented by the second embodiment described earlier, new principal information is not stored in a region allocated to existing principal information, overwriting the existing principal information even if the storage capacity of the recording medium is predicted to become insufficient. Instead, the new principal information is recorded as additional principal information while the existing principal information is kept as it is.

Speaking in an easy-to-understand way, the recording/reproduction apparatus 300 has a first recording medium (or a main recording medium) and a second recording medium (or a sub recording medium). Normally, principal information allowing its summary information to be extracted is stored in the first recording medium. When the residual storage capacity of the first recording medium becomes smaller than a predetermined value, however, principal information already stored in the first recording medium is moved to the second recording medium in order to always keep a free area having at least a predetermined size in the first recording medium. In this way, it is possible to avoid a lack of storage space in the first recording medium. As a result, principal information already existing in the first recording medium can be prevented from being deleted due to an operation to overwrite new principal information on the existing principal information.

In addition, even if principal information is moved to the second recording medium, the summary information associated with the moved principal information is left in the first recording medium so that a digest reproduction process can be carried out readily at any time and, if necessary, the principal information moved to the second recording medium can also be reproduced in an ordinary reproduction process. By adoption of such a technique, the good accessibility displayed by the first recording medium as a merit of a disk-shaped recording medium is not lost.

<Operations and Configuration of the Recording/Reproduction Apparatus 300 Implemented by the Third Embodiment>

As shown in FIG. 19, the recording/reproduction apparatus 300 implemented by the third embodiment includes the second recording process unit 41, the second recording medium 42, the second reproduction control unit 43 and the recording-medium residual-capacity detection unit 44 in addition to the first recording process unit 7, the first recording medium 8, the first reproduction control unit 9 and the residual recording capacity detection unit 31 respectively.

The first recording medium 8 plays the role of the main recording medium cited above. In an ordinary recording process, principal and summary information is recorded onto the first recording medium 8. On the other hand, the second recording medium 42 plays the role of the sub recording medium mentioned before. When the residual storage capacity of the first recording medium 8 becomes insufficient, principal information already stored in the first recording medium 8 is moved to the second recording medium 42. Typically, the second recording medium 42 is a disk reproduction device such as a hard disk or a large-capacity recording medium such as a magnetic tape.

The recording/reproduction apparatus 300 implemented by the third embodiment shown in FIG. 19 is capable of storing an identification added to the principal information in a process to record video and audio signals of a television broadcast program or the like onto the first recording medium 8. The identification allows the summary information to be extracted.

Prior to a recording process, for example, the residual recording capacity detection unit 31 detects the residual storage capacity of the first recording medium 8. If the residual storage capacity is determined to be insufficient, principal information already stored in the first recording medium 8 is moved to the second recording medium 42 by way of the second recording process unit 41 to increase the residual storage capacity of the first recording medium 8. Then, new principal information is stored in the recording medium 8.

In an ordinary reproduction process to reproduce principal information recorded on the second recording medium 42, data of the principal information read out from the second recording medium 42 by the second reproduction control unit 43 in accordance with control executed by the system controller 17 is output to a speaker and a monitor by way of the reproduction process unit 10, the separation process unit 11, the audio decoder 12, the audio D/A converter 13, the video decoder 14 and the video D/A converter 15 in the same way as the process to reproduce principal information stored on the recording medium 8.

It is to be noted that the recording-medium residual-capacity detection unit 44 monitors the residual storage capacity of the second recording medium 42 and reports a result of the monitoring to the system controller 17. If the result of the monitoring indicates that the residual storage capacity of the second recording medium 42 is not adequate, a warning is typically displayed to the user by way of the display system 33 to prompt the user to rearrange information stored in the second recording medium 42 or replace the second recording medium 42 with a new recording medium.

In the case of the recording/reproduction apparatus 300 implemented by the third embodiment described above, at least, summary information is left in the first recording medium 8. When the size of the recording area in the first recording medium 8 becomes insufficient, principal information already stored in the first recording medium 8 is moved to the second recording medium 42 so that new principal information can be stored onto the first recording medium 8.

It is to be noted that, in the recording/reproduction apparatus 300 implemented by the third embodiment shown in FIG. 19, for each similar-picture segment, the video classification process unit 5 and the audio classification process unit 20 create an ID unique to the segment and assign the ID to the segment in the same way as the recording/reproduction apparatus 100 implemented by the first embodiment described earlier. In addition, the audio classification process unit 20 is also capable of detecting the signal level of an audio signal supplied thereto.

On the basis of signals output by the video classification process unit 5 and the audio classification process unit 20, the system controller 17 recognizes signal segments, which each precede and succeed a scene change as well as have an audio level equal to or higher than a predetermined value as segments of summary information. The controller 17 supplies the summary information of the recognized segments to the multiplexing process unit 6 so that the multiplexing unit 6 can add summary-information identifications to summary-information portions of the principal information.

<Operations of the Recording/Reproduction Apparatus 300>

Figure 20:
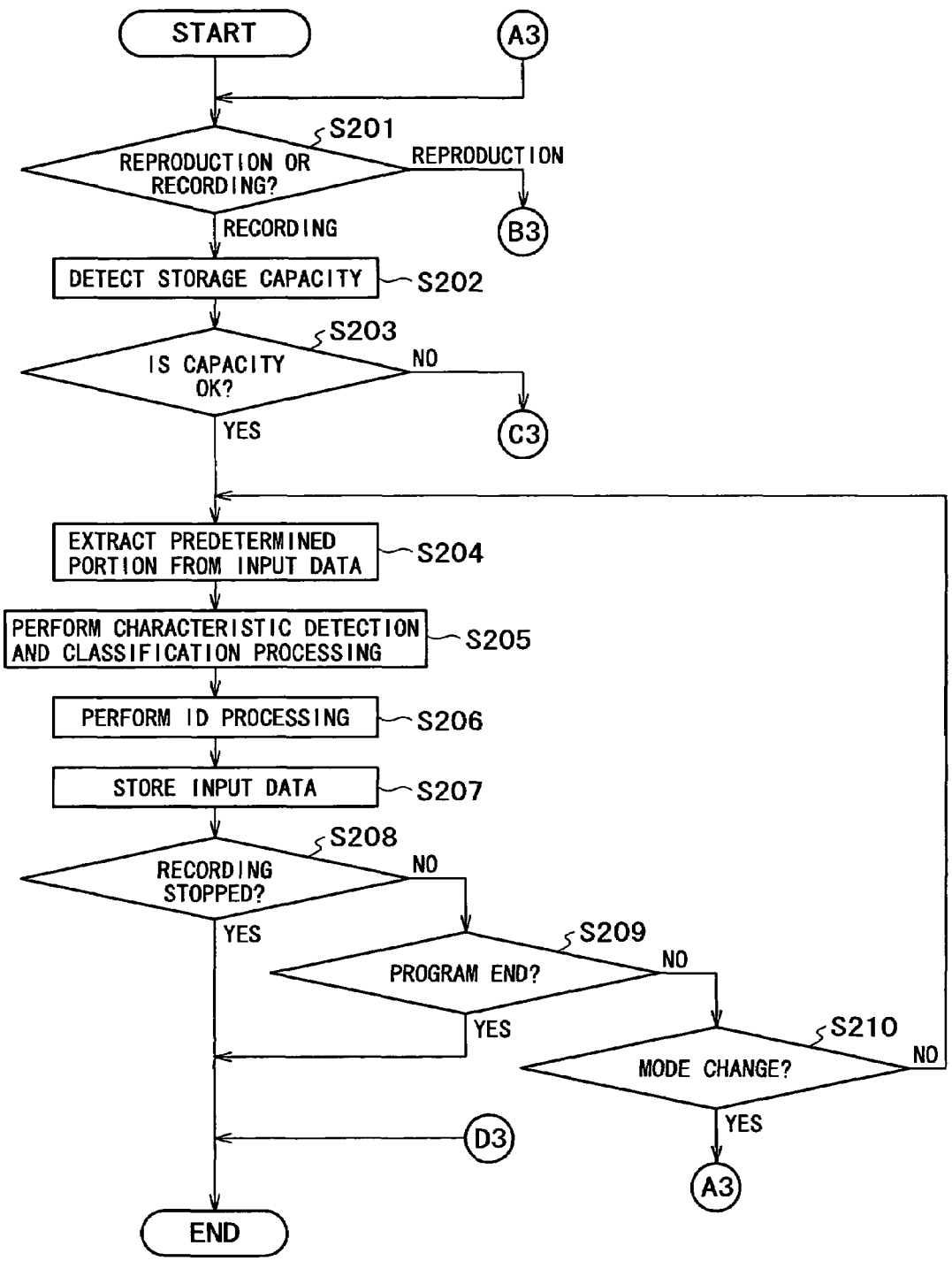
FIG. 20 shows a flowchart referred to in explanation of operations carried out by the recording/reproduction apparatus implemented by the third embodiment shown in FIG. 19.
Figure 21:
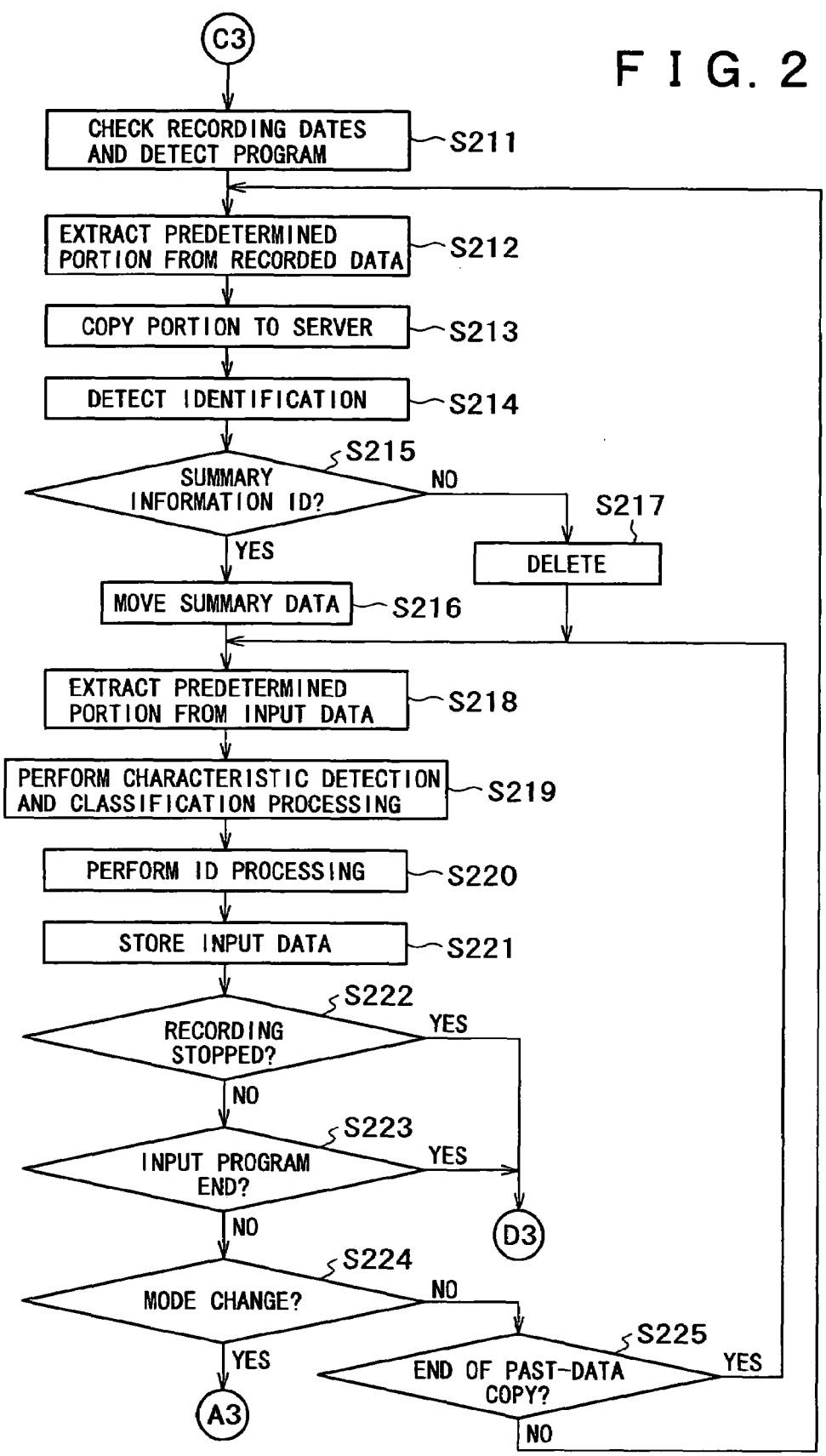
FIG. 21 shows a continuation flowchart of the flowchart shown in FIG. 20.
Figure 22:
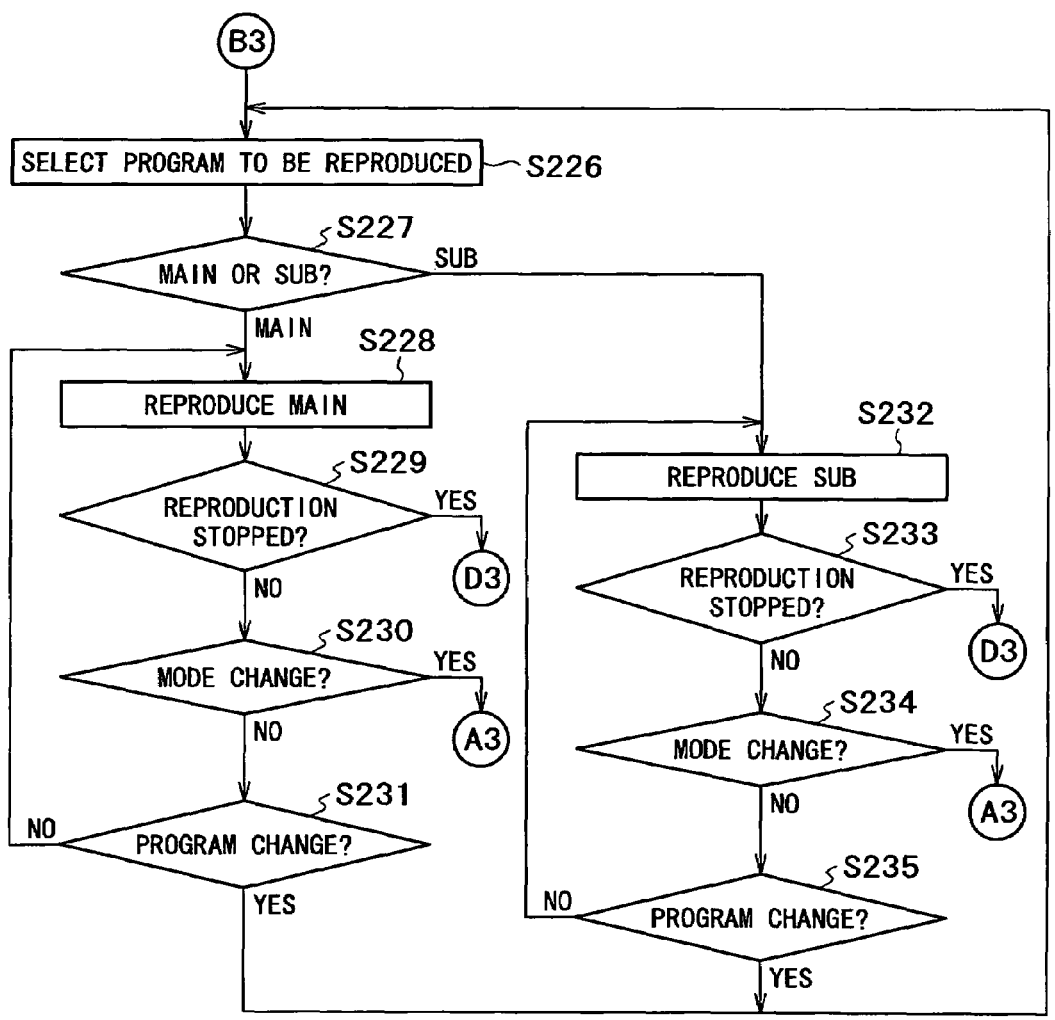
FIG. 22 shows another continuation flowchart of the flowchart shown in FIG. 20.

Next, operations carried out by the recording/reproduction apparatus 300 implemented by the third embodiment are explained by referring to a flowchart shown in FIGS. 20 to 22. The flowchart shown in FIGS. 20 to 22 is a flowchart referred to in explaining recording and reproduction processes carried out by the recording/reproduction apparatus 300 implemented by the third embodiment. It is to be noted that the processing represented by the flowchart shown in FIGS. 20 to 22 is carried out for each predetermined unit, which can consist of 1 frame to a plurality of frames or 1 GOP to a plurality of GOPs.

The flowchart shown in FIGS. 20 to 22 begins with a step S201 at which the system controller 17 determines whether a process specified by an operation command received from the user by way of the user input I/F 18 is a reproduction or recording process. If the determination result produced in the operation carried out at the step S201 indicates that the requested process is a recording process, the flow of the operations goes on to a step S202 at which the system controller 17 detects the residual storage capacity of the first recording medium 8 through the residual recording capacity detection unit 31.

Then, at the next step S203, the system controller 17 determines whether or not the residual capacity is large enough for storing both new principal information and new summary information on the basis of the detection result produced in the operation carried out at the step S202 as a result of detecting the residual storage capacity. At the step S203, for example, a typical threshold value of three hours is used. That is to say, a residual storage capacity corresponding to at least three hours is required. It is to be noted that, in the case of a timer recording mode, for example, a reservation-recording interval can be found from a recording start time and a recording end time. In this case, the residual recording capacity is compared with the reservation-recording interval.

If the determination result produced in the operation carried out at the step S203 indicates that the residual capacity of the first recording medium 8 is large enough, the flow of the operations goes on to a step S204. The system controller 17 controls the audio classification process unit 20 and the video classification process unit 5 to extract signals of a predetermined segment used as a processing unit from input information (input data) supplied to the audio classification process unit 20 and the video classification process unit 5 respectively. Then, at the next step S205, the audio classification process unit 20 and video classification process unit 5 carry out processing to determine similar-picture segments on the basis of detected characteristics and classify the determined similar-picture segments.

Subsequently, at the next step S206, on the basis of results of processing carried out by the audio classification process unit 20 and the video classification process unit 5, the system controller 17 identifies summary-information portions to be used in a digest reproduction process and reports the summary-information portions to the multiplexing unit 6. The multiplexing unit 6 adds identification to a multiplexed signal of the recognized signal segment. Then, at the next step S207, the principal information with the identification added thereto are recorded onto the first recording medium 8 by way of the first recording process unit 7.

Also in this third embodiment, a signal segment of principal information to be used as a segment of summary information is identified on the basis of results of the picture-similarity determination processing and the picture classification processing. However, that the present invention is by no means limited to the technique adopted by this embodiment. As described earlier, similar-picture segments can be identified also for an audio signal. Then, a similar-picture segment and a similar-sound segment can be used as a summary-information segment or, as another alternative, a similar-picture segment is identified by using only either video or audio information and a signal segment is recognized as a segment of summary information.

Then, at the next step S208, the system controller 17 determines whether or not a command to stop the recording process has been received from the user. If the system controller 17 determines that a command to stop the recording process has been received from the user, the execution of the operations represented by the flowchart shown in FIGS. 20 to 22 is ended. Then, the recording/reproduction apparatus 300 typically enters a state of waiting for the user to enter a next command. If the determination result obtained in the operation carried out at the step S208 indicates that a command to stop the recording process was not received from the user, on the other hand, the flow of the operations goes on to a step S209 to determine whether or not the process to record the desired broadcast program has been ended from, for example, the advent of the recording end time or the arrival of another program code.

If the determination result obtained in the operation carried out at the step S209 indicates that the process to record the desired broadcast program has been ended, the execution of the operations represented by the flowchart shown in FIGS. 20 to 22 is ended. Then, the recording/reproduction apparatus 300 typically enters a state of waiting for the user to enter a next command. If the determination result obtained in the operation carried out at the step S209 indicates that the process to record the desired broadcast program has not been ended, on the other hand, the flow of the operations goes on to a step S210 to determine whether or not the user has entered a command to change the operating mode.

If the determination result produced in the processing carried out at the step S210 indicates that the user has not entered a command to change the operating mode, the flow of the operations goes back to the step S204 to repeat the operations described above from this step to continue the process to record a processing unit of principal information and summary information to the recording medium 8. If the determination result produced in the processing carried out at the step S210 indicates that the user has entered a command to change the operating mode, on the other hand, the flow of the operations goes back to the step S201 at which the system controller 17 determines whether the process is a reproduction or recording process.

If the determination result produced in the processing carried out at the step S203 indicates that the residual capacity of the recording medium 8 is not sufficient, on the other hand, the flow of the operations goes on to a step S211 of a continuation flowchart shown in FIG. 21. At the step S211, recording dates of pieces of principal information already recorded on the first recording medium 8 are examined to detect principal information having the oldest date. Then, at the next step S212, a principal signal of a predetermined processing unit of the oldest information is extracted. The principal signal of a predetermined processing unit is also referred to as a principal signal of a predetermined segment. Subsequently, at the next step S213, the principal signal of a predetermined segment is copied to the second recording medium 42 by way of the second recording process unit 41.

Then, the flow of the operations goes on to a step S214 to detect an identification added to the copied principal information as an identification indicating whether or not the segment of the principal information is a segment of summary information. Then, at the next step S215, the detected identification is examined to determine whether or not the identification indicates that the predetermined segment of the principal information copied to the second recording medium 42 is also a summary-information segment usable as summary information.

If the determination result produced by the processing carried out at the step S215 indicates that the predetermined segment of the principal information copied to the second recording medium 42 is also a summary-information segment, the flow of the operations goes on to a step S216. A signal of this portion is moved to a predetermined portion of the first recording medium 8 so as to prevent the pieces of summary information from being scattered at separated locations or to collect the pieces of summary information pertaining to the broadcast program in the predetermined portion of the recording medium 8.

If the determination result produced by the processing carried out at the step S215 indicates that the predetermined segment of the principal information copied to the second recording medium 42 is not a summary-information segment, on the other hand, the flow of the operations goes on to a step S217. Information in the segment is deleted from the first recording medium 8 and the area used for storing the deleted information is used as a free recording area, or the information is put in status of allowing new data to be overwritten thereupon.

After the processing carried out at the step S216 or S217 has been completed, the flow of the operations goes on to a step S218. The system controller 17 controls the audio classification process unit 20 and the video classification process unit 5 to extract signals of a predetermined segment used as a processing unit from input information (input data) supplied to the audio classification process unit 20 and the video classification process unit 5 respectively. Then, at the next step S219, the audio classification process unit 20 and video classification process unit 5 carry out processing to determine similar-picture segments on the basis of detected characteristics and classify the determined similar-picture segments.

Subsequently, at the next step S220, on the basis of results of processing carried out by the audio classification process unit 20 and the video classification process unit 5, the system controller 17 identifies summary-information portions to be used in a digest reproduction process and reports the summary-information portions to the multiplexing unit 6. The multiplexing unit 6 adds identification to a multiplexed signal of the recognized signal segment. Then, at the next step S221, the principal information with identification added thereto are recorded onto the first recording medium 8 by way of the first recording process unit 7.

Then, at the next step S222, the system controller 17 determines whether or not a command to stop the recording process has been received from the user. If the system controller 17 determines that a command to stop the recording process has been received from the user, the execution of the operations represented by the flowchart shown in FIGS. 20 to 22 is ended. Then, the recording/reproduction apparatus 300 typically enters a state of waiting for the user to enter a next command. If the determination result obtained in the operation carried out at the step S222 indicates that a command to stop the recording process was not received from the user, on the other hand, the flow of the operations goes on to a step S223 to determine whether or not the process to record the desired broadcast program has been ended from, for example, the advent of the recording end time or the arrival of another program code.

If the determination result obtained in the operation carried out at the step S223 indicates that the process to record the desired broadcast program has been ended, the execution of the operations represented by the flowchart shown in FIGS. 20 to 22 is ended. Then, the recording/reproduction apparatus 300 typically enters a state of waiting for the user to enter a next command. If the determination result obtained in the operation carried out at the step S223 indicates that the process to record the desired broadcast program has not been ended, on the other hand, the flow of the operations goes on to a step S224 to determine whether or not the user has entered a command to change the operating mode.

If the determination result produced in the processing carried out at the step S224 indicates that the user has entered a command to change the operating mode, the flow of the operations goes back to the step S201 of the main flowchart shown in FIG. 20 to repeat the operations described above from this step. If the determination result produced in the processing carried out at the step S224 indicates that the user has not entered a command to change the operating mode, on the other hand, the flow of the operations goes to the step S225 to determine whether or not the processing to copy all the principal information determined at the step S211 to be principal information having the oldest date from the first recording medium 8 to the second recording medium 42 has been completed.

If the determination result produced in the processing carried out at the step S225 indicates that the processing to copy all the principal information having the oldest date has been completed, the flow of the operations goes back to the step S218 to repeat the operations described above from this step in order to continue the process of recording new principal information onto the first recording medium 8. If the determination result produced in the processing carried out at the step S225 indicates that the processing to copy all the principal information having the oldest date has not been completed, on the other hand, the flow of the operations goes back to the step S212 to repeat the operations described above from this step in order to continue the process of copying the principal information having the oldest date to the second recording medium till completion so that new principal information can be recorded onto the first recording medium 8.

If the determination result produced in the operation carried out at the step S201 indicates that the requested process is a reproduction process, the flow of the operations goes on to a step S226 of another continuation flowchart shown in FIG. 22. At the step S226, the system controller 17 receives an input of selecting a program from the user. This input selects a program stored in the first recording medium 8 (or the main recording medium) or a program stored in the second recording medium 42 (or the sub recording medium) and selects an ordinary reproduction process or a digest reproduction process.

Then, the flow of the operations goes on to a step S227 to determine whether a program stored in the first recording medium 8 or a program stored in the second recording medium 42 is to be reproduced. If the determination result produced by the processing carried out at the step S227 indicates that a program stored in the first recording medium 8 is to be reproduced, the flow of the operations goes on to a step S228. A reproduction mode to reproduce a program from the first recording medium 8 is set. Then, the first reproduction control unit 9 is controlled to read out principal or summary information of the selected program from the first recording medium 8 and reproduce the information by adoption of a selected method.

Subsequently, the flow of the operations goes on to a step S229 at which the system controller 17 determines whether or not the user has entered a command to stop the reproduction process. If the result of the determination indicates that the user has entered a command to stop the reproduction process, the execution of the operations represented by the flowchart shown in FIGS. 20 to 22 is ended. Then, the recording/reproduction apparatus 300 typically enters a state of waiting for the user to enter a next command. If the determination result produced by the processing carried out at the step S229 indicates that the user has not entered a command to stop the reproduction process, on the other hand, the flow of the operations goes on to a step S230 to determine whether or not a command to change the operating mode has been received.

If the determination result produced by the processing carried out at the step S230 indicates that a command to change the operating mode has been received, the flow of the operations goes back to the step S201 of the main routine shown in FIG. 20 to repeat the operations described above from this step. If the determination result indicates that a command to change the operating mode has not been received, on the other hand, the flow of the operations goes on to a step S231 to determine whether or not a command to change the program being reproduced to another one has been received.

If the determination result produced by the processing carried out at the step S231 indicates that a command to change the program being reproduced to another one has not been received, the flow of the operations goes back to the step S228. The operations starting from this step as described above are repeated to continue the process of reproducing the current program. If the determination result indicates that a command to change the program being reproduced to another one has been received, on the other hand, the flow of the operations goes back to the step S226. The operations starting from this step as described above are repeated to start a process of reproducing a new program.

If the determination result produced by the processing carried out at the step S227 indicates that a program stored in the second recording medium 42 is to be reproduced, on the other hand, the flow of the operations goes on to a step S232. A reproduction mode to reproduce a program from the second recording medium 42 is set. Then, the second reproduction control unit 43 is controlled to read out principal information of the selected program from the second recording medium 42 and carry out an ordinary reproduction process.

Subsequently, at the next step S233, the system controller 17 determines whether or not the user has entered a command to stop the reproduction process. If the result of the determination indicates that the user has entered a command to stop the reproduction process, the execution of the operations represented by the flowchart shown in FIGS. 20 to 22 is ended. Then, the recording/reproduction apparatus 300 typically enters a state of waiting for the user to enter a next command. If the determination result produced by the processing carried out at the step S233 indicates that the user has not entered a command to stop the reproduction process, on the other hand, the flow of the operations goes on to a step S234 to determine whether or not a command to change the operating mode has been received.

If the determination result produced by the processing carried out at the step S234 indicates that a command to change the operating mode has been received, the flow of the operations goes back to the step S201 of the main routine shown in FIG. 20 to repeat the operations described above from this step. If the result of the determination indicates that a command to change the operating mode has not been received, on the other hand, the flow of the operations goes on to a step S235 to determine whether or not a command to change the program being reproduced to another one has been received.

If the determination result produced by the processing carried out at the step S235 indicates that a command to change the program being reproduced to another one has not been received, the flow of the operations goes back to the step S232. The operations starting from this step as described above are repeated to continue the process of reproducing the principal information of the current program. If the result of the determination indicates that a command to change the program being reproduced to another one has been received, on the other hand, the flow of the operations goes back to the step S226. The operations starting from this step as described above are repeated to start a process of reproducing a new program.

<Summary of the Third Embodiment>

As described above, when the residual storage capacity of the first recording medium 8 becomes smaller than a value determined in advance, principal information of the oldest date is moved from the first recording medium 8 to the second recording medium 42 to increase the residual storage capacity of the first recording medium 8 before new principal information is stored onto the first recording medium 8. Thus, a problem of an inability to store principal information of a new program due to the fact that the residual storage capacity of the first recording medium 8 becomes insufficient can be prevented from arising.

In addition, the summary information of a program that has the principal information moved to the second recording medium 42 is deliberately left in the first recording medium 8. Therefore, a digest reproduction process of the summary information of the program having the oldest date can be carried out at any time quickly. On top of that, an ordinary reproduction process of the principal information of the new program and a digest reproduction process of the summary information of the program can also be carried out at any time quickly. That is to say, the merits of the accessibility characteristic of the first recording medium 8 do not deteriorate.

Moreover, management to rearrange and preserve information signals stored in the recording medium can be made simpler, making it possible to prepare an environment of promoting effective and efficient use of a large number of presented various video and audio signals.

It is to be noted that, in the recording/reproduction apparatus 300 implemented by the third embodiment, additional identifications are also recorded so as to allow summary information created for principal information to be stored in a recording medium by being associated with the principal information. Thus, the third embodiment allows the summary information to be extracted even after a recording process. However, the present invention is by no means limited to such a scheme.

For example, principal information and summary information are both recorded on the first recording medium 8 as is the case with the recording/reproduction apparatus 200 implemented by the second embodiment described earlier. When the residual storage capacity of the first recording medium 8 becomes insufficient, only principal information of the oldest date is moved from the first recording medium 8 to the second recording medium 42.

In the third embodiment described above, only principal information of one program having the oldest date is moved from the first recording medium 8 to the second recording medium 42. However, principal information of a plurality of programs in ascending order of dates can also be moved from the first recording medium 8 to the second recording medium 42. For example, principal information of two or three programs in ascending order of dates can also be moved from the first recording medium 8 to the second recording medium 42.

In addition, more than one piece of principal information can be moved sequentially one piece after another starting with a piece having the oldest date till a predetermined residual storage capacity of the first recording medium 8 is preserved.

On top of that, as described earlier, the processing to transfer principal information from the first recording medium 8 to the second recording medium 42 can be move processing or copy processing. In the case of the move processing, after principal information is transferred from the first recording medium 8 to the second recording medium 42, the principal information left in the first recording medium 8 as an unnecessary portion is erased from the first recording medium 8 to newly allocate a free area.

In the case of the copy processing, on the other hand, after principal information is transferred from the first recording medium 8 to the second recording medium 42, the principal information left in the first recording medium 8 as an unnecessary portion is put in status of allowing new principal information to be overwritten thereon.

In addition, as described earlier, summary information is deliberately lift in the first recording medium 8. If the summary information associated with the transferred principal information is left at scattered locations in the first recording medium 8, the recording area of the first recording medium 8 is put in a state of being worm-eaten. In order to prevent the recording area from being put in a state of being difficult to use, a so-called defragmentation process is may be carried out to make the recording area of the first recording medium 8 usable effectively.

On top of that, a message can be displayed to the user through the display system 33 to inform the user that the residual storage capacity of the first recording medium 8 has become too small, the residual storage capacity of the second recording medium 42 has become too small, principal information has been or is being transferred from the first recording medium 8 to the second recording medium 42 or a defragmentation process has been or is being carried out to prevent the recording area of the first recording medium 8 from being put in a state of being worm-eaten, or report other facts to the user.

In addition, the second recording medium 42 having a storage capacity greater than that of the recording medium 8 is desirable.

41
Fourth Embodiment

Figure 23:
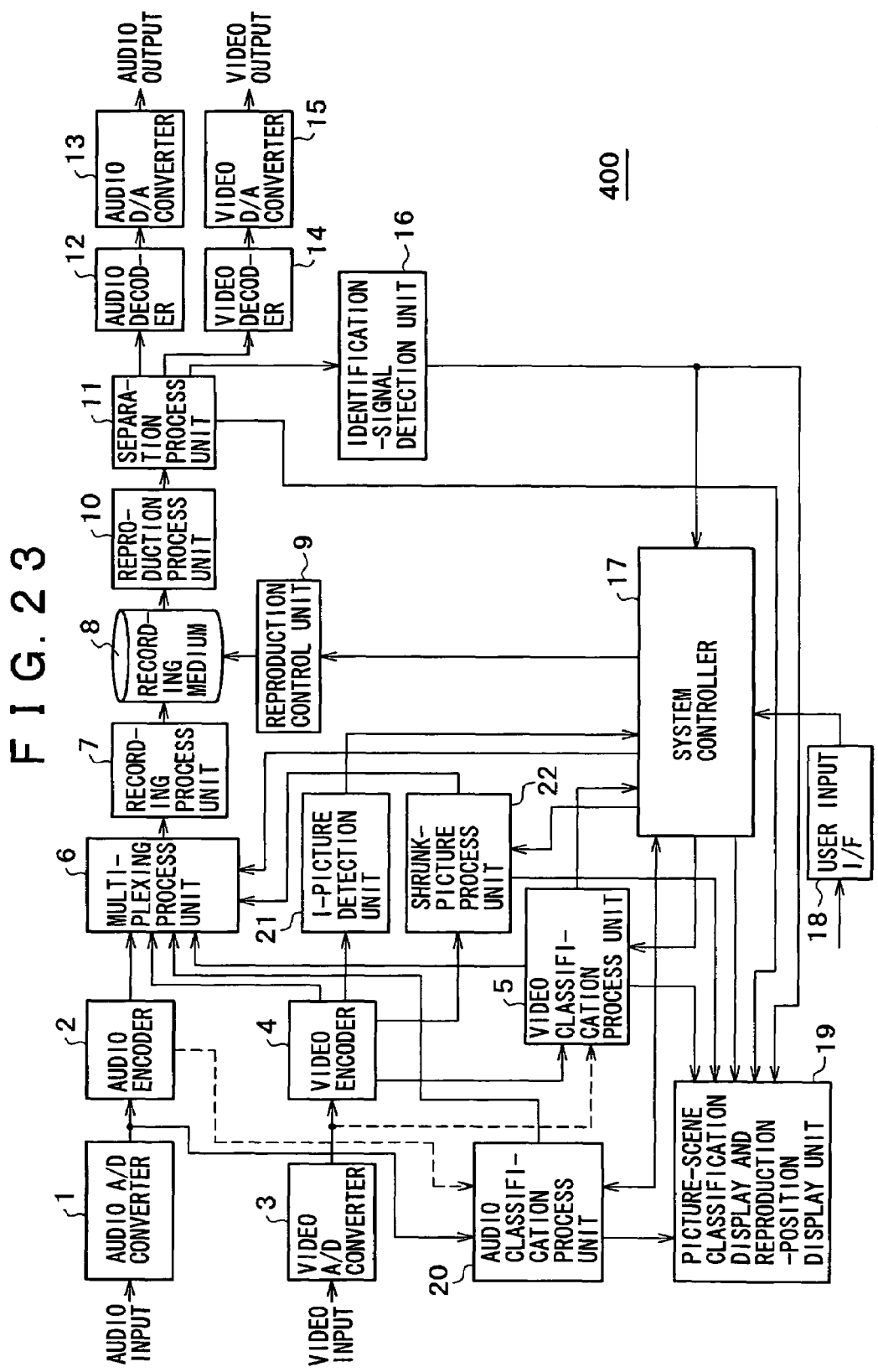
FIG. 23 is an explanatory block diagram showing a recording/reproduction apparatus implemented by a fourth embodiment to which an embodiment of the information-signal process apparatus and information-signal process method provided by the present invention is applied.

FIG. 23 is an explanatory block diagram showing a recording/reproduction apparatus 400 implemented by a fourth embodiment to which an embodiment of the information-signal process apparatus and information-signal process method provided by the present invention is applied. FIGS. 24 and 25A to 25C are explanatory diagrams showing an principle of operations carried out by the recording/reproduction apparatus 400 implemented by the fourth embodiment.

Much like the recording/reproduction apparatus 100 implemented by the first embodiment, the recording/reproduction apparatus 400 implemented by the fourth embodiment is capable of creating shrunk pictures (or thumb-nail pictures) from a video signal of a television broadcast program with predetermined timings in a process of recording the video and audio signals of the program onto a recording medium and displaying the created thumb-nail pictures in a tabular format. The recording/reproduction apparatus 400 implemented by the fourth embodiment is different from the recording/reproduction apparatus 100 implemented by the first embodiment, however, in that the recording/reproduction apparatus 400 adopts a different display format of shrunk pictures from that of the recording/reproduction apparatus 100.

Even though the recording/reproduction apparatus 400 implemented by the fourth embodiment has all but the same configuration as that of the recording/reproduction apparatus 100 implemented by the first embodiment, in order to clarify differences in operation between these embodiments, a block diagram of the recording/reproduction apparatus 400 implemented by the fourth embodiment is shown in FIG. 23. By referring to the block diagram of FIG. 23, the recording/reproduction apparatus 400 implemented by the fourth embodiment is explained in detail as follows.

<Principle of Operation>

First of all, the principle of operation of the recording/reproduction apparatus 400 implemented by the fourth embodiment is described. The recording/reproduction apparatus 400 shown in FIG. 23 receives analog video and audio signals of typically a television broadcast program as an information signals. The recording/reproduction apparatus 400 then converts the analog video and audio signals into digital data, and compresses the digital data by adoption of an MPEG method. Subsequently, the compressed digital video data is time-division multiplexed with the compressed digital audio data to be recorded onto the recording medium 8. The recording medium 8 is a disk-shaped recording medium having a large storage capacity. An example of such a disk-shaped recording medium is a hard disk.

In a reproduction process, the recording/reproduction apparatus 400 shown in FIG. 23 reads out the multiplexed signal from the recording medium 8, separating video and audio data of the multiplexed signal from each other. The video and audio data is then decompressed to recover the pre-compression video and audio data. Subsequently, the video and audio data obtained as a result of the decompression is converted into analog output signals.

In addition, the recording/reproduction apparatus 400 shown in FIG. 23 classifies pictures of the video signal into similar pictures in a process to record the video and audio signals onto the recording medium 8. Much like the recording/reproduction apparatus 100 implemented by the first embodiment, the classification processing is carried out on MPEG video data, which is compressed video data. Similar pictures are detected in I-picture units and I pictures similar to each other are categorized into a similar-picture segment.

FIG. 24A is a diagram showing a series of input video signals composing a news program taken as an example. The series of input video signals comprises 31 I pictures, which are classified into similar-picture segments A1, A2 and A3 each consisting of similar I pictures.

In this case, I pictures included in each of the similar-picture segments A1, A2 and A3 are pictures, which show a news caster reading news and, hence, display relatively few changes in news-caster motion. With only such similar-picture scenes, nevertheless, the contents of the program can be conceivably grasped with a relatively high degree of efficiency. Further consideration of the similar-picture segments A1, A2 and A3 also indicates that, in many cases, the head of each of the similar-picture segments A1, A2 and A3 is conceivably a picture showing a scene in which the news caster starts reading a news article. The head picture of each of the similar-picture segments A1, A2 and A3 generally displays a news telop (or a news headline) at the bottom of the screen.

For the reason described above, shrunk forms of I pictures each positioned at the head of a similar-picture segment of a news program or at a location in close proximity to the head are created as shown in FIG. 24B. Then, with the lapse of time, created shrunk pictures are displayed sequentially in a chronological order as pictures 1a to 1g shown in FIG. 25A. In such a screen, a news telop is also conceivably displayed in each of the pictures 1a to 1g in many cases so that, by merely viewing this tabular display (a multi-picture display) of shrunk pictures, the user can quickly and reliably know what the contents of the news are.

Figure 25A:
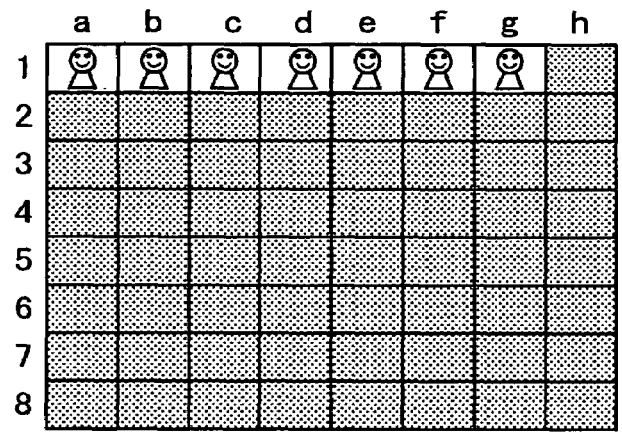
FIGS. 25A to 25C are explanatory diagrams showing an outline of operations carried out by the recording/reproduction apparatus implemented by the fourth embodiment shown in FIG. 23.
Figure 25B:
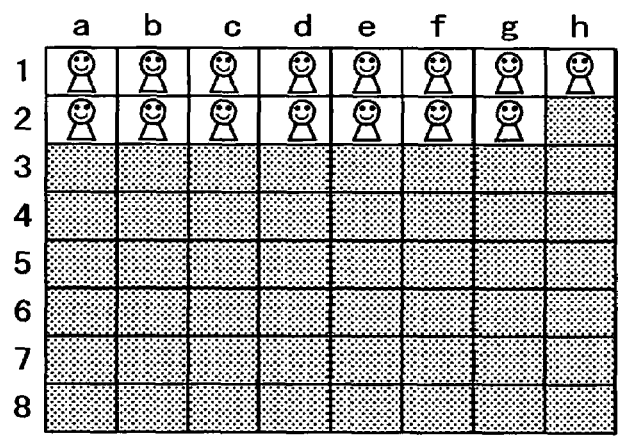

If a news program is broadcasted again after the lapse of a predetermined time period, the same processing carried out on the immediately preceding news program is carried out again on the current news program to generate shrunk pictures 1a to 1h shown in FIG. 25B. The shrunk pictures 1a to 1g shown in FIG. 25A as shrunk pictures of the immediately preceding news program are displayed again on the same screen as pictures 2a to 2g shown in FIG. 25B.

Figure 25C:
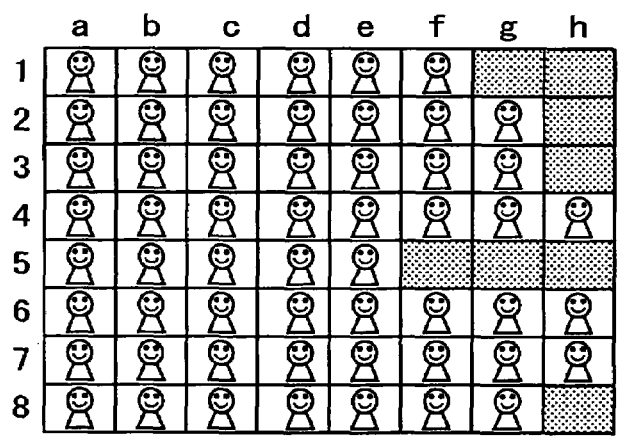

Assume that 8 news programs are broadcasted sequentially and the same processing as that described above is carried out again on the subsequent news programs. In this case, the 8 news programs are displayed on horizontal rows 1 to 8 of the screen respectively as shown in FIG. 25C. On each of columns a to h of every horizontal row, a shrunk picture of a news program appearing on the row is displayed.

As described above, previous news programs each represented by shrunk pictures are displayed sequentially on lower rows arranged in the vertical direction. In this way, it is possible to easily recognize changes of the same news with the lapse of time and new news developed as time goes by.

In addition, by selecting a desired one of shrunk pictures displayed in a tabular format as explained earlier by referring to the flowchart shown in FIGS. 8 and 9, it is possible to reproduce a signal segment including an original picture corresponding to the selected shrunk picture as an original picture positioned at the head thereof or carry out a digest reproduction process so as to let the user know detailed contents of desired news. That is to say, both an ordinary reproduction process and a digest reproduction process can be carried out with a high degree of efficiency.

It is to be noted that, in order to detect a signal of a news telop with a higher degree of accuracy, a telop may be detected along with detection of a similar picture. Since characters composing a telop of a news program are normally displayed in a white color in many cases, the telop is usually displayed at a telop-display position, which is a position on a lower-side portion of the screen in most cases. Thus, by recognizing characteristics of a luminance signal among picture signals displayed at a position corresponding to the lower-side portion of the screen, a screen, which is an I picture or a frame, displaying a telop can be detected.

<Operations and Configuration of the Recording/Reproduction Apparatus 400 Implemented by the Fourth Embodiment>

The following description explains operations and configuration of the recording/reproduction apparatus 400 implemented by the fourth embodiment shown in FIG. 23. The configuration shown in FIG. 23 can be divided into portions on the left and right sides of the recording medium 8. The portion on the left side is mainly a recording system while the portion on the right side is mainly a reproduction system.

<Recording System>

First of all, the recording system is explained. An analog audio signal (an audio input) supplied to the recording/reproduction apparatus 400 implemented by the fourth embodiment is fed to an audio A/D converter 1 for converting the analog audio signal into a digital audio signal to be supplied to an audio encoder 2 and an audio classification process unit 20.

The audio encoder 2 carries out a band compression process on the digital audio signal by adoption of a predetermined compression technique such as an MPEG audio method. Audio data obtained as a result of the band compression process carried out on the digital audio signal is supplied to a multiplexing process unit 6.

The audio classification process unit 20 detects continuity of a frequency spectrum peak in the digital audio signal typically for each predetermined segment to determine whether or not the digital audio signal is a musical signal. The result of the determination is supplied to the multiplexing process unit 6, a system controller 17 and a picture-scene classification display and reproduction-position display unit 19. The picture-scene classification display and reproduction-position display unit 19 is also properly referred to hereafter as a classification display unit.

It is to be noted that, instead of processing the digital audio signal received from the audio A/D converter 1, the audio classification process unit 20 can also be designed into a configuration for receiving the audio data, which is obtained as a result of the band compression process carried out by the audio encoder 2 on the digital analog signal generated by the audio A/D converter 1, as indicated by a dashed line shown in FIG. 23, and carrying out the classification processing described earlier on the audio data.

On the other hand, an analog video signal (a video input) supplied to the recording/reproduction apparatus 400 implemented by the fourth embodiment is fed to a video A/D converter 3 for converting the analog video signal into a digital video signal to be supplied to a video encoder 4.

The video encoder 4 carries out a band compression process on the digital video signal by adoption of a predetermined compression technique such as an MPEG2 method. Video data obtained as a result of the band compression process carried out on the digital video signal is supplied to a video classification process unit 5, the multiplexing process unit 6, an I-picture detection unit 21 and a shrunk-picture process unit 22.

The video classification process unit 5 detects picture characteristics of I pictures of the video data received from the video encoder 4 and recognizes picture similarity on the basis of the detected characteristics. In addition, the video classification process unit 5 also recognizes similar-picture segments as explained earlier by referring to FIG. 24. The video classification process unit 5 also generates an identification information signal for identifying the similar-picture segments and supplies the signal to the multiplexing process unit 6 and the classification display unit 19. The signal identification information includes position information of the video data and the position information of the video data includes information on how many consecutive similar frames are included in each similar-picture segment.

It is to be noted that, instead of receiving the compressed video data from the video encoder 4, the video classification process unit 5 may also receive the digital video signal output by the video A/D converter 3 as indicated by a dashed line shown in FIG. 23 and carries out the processes to identify and classify similar pictures of the digital video data in frame units as described above on the basis of the digital video signal.

In addition, it is also possible to provide a configuration in which the identification information signals obtained as results of the processes to classify the video and audio signals can also be generated by the system controller 17 on the basis of the classification-process results received from the video classification process unit 5 and the audio classification process unit 20 and supplied to the multiplexing process unit 6.

As is the case with the recording/reproduction apparatus 100 implemented by the first embodiment described earlier, the system controller 17 is a microcomputer comprising a CPU (Central Processing Unit), a ROM (Read Only Memory), a RAM (Random Access Memory), a non-volatile memory and a timer circuit, which are used for controlling the each components composing the recording/reproduction apparatus 400.

In addition, an I-picture detection unit 21 in the configuration shown in FIG. 23 is a component for detecting I pictures from the video data and reporting detection information such as detection timings to the system controller 17. Only I pictures are detected because, as described above, the recording/reproduction apparatus 400 implemented by this embodiment carries out the picture-similarity detection process and the picture classification process in I-picture units. The system controller 17 is capable of controlling the video classification process unit 5 and the shrunk-picture process unit 22 on the basis of the detection information received from the I-picture detection unit 21.

In accordance with the control executed by the system controller 17, the shrunk-picture process unit 22 generates shrunk-picture data from video data (to be more specific, I pictures each located at the head of a similar-picture segment or at a location in close proximity to the head) received thereby and supplies the data to the multiplexing process unit 6 and the classification display unit 19.

In this fourth embodiment, the classification display unit 19 receives the classification result from the audio classification process unit 20, the identification information signal from the video classification process unit 5 and the shrunk-picture data from the shrunk-picture process unit 22, displaying shrunk pictures each located at the head of a similar-picture segment in a chronological order in the format shown in FIGS. 25A to 25C. That is to say, the recording/reproduction apparatus 400 implemented by this embodiment is capable of displaying thumb-nail pictures for recorded original pictures concurrently with the process to record the original pictures onto the recording medium.

In addition, the multiplexing process unit 6 generates multiplexed data by typically carrying out a time-division multiplexing process on pieces of information including the audio data, the video data, the shrunk-picture data and the identification information signal received from the video classification process unit 5, supplying the multiplexed data to the recording process unit 7. The recording process unit 7 carries out processing including a process to add error correction codes to the multiplexed data and a process to interleave the data to create a signal to be recorded, recording the signal into a predetermined area in the recording medium 8.

Then, in the case of this embodiment, as described before, by using the identification information signal multiplexed in the multiplexed data, it is possible to identify similar-picture segments and associate original pictures with shrunk pictures representing the original pictures. Thus, it is possible to display shrunk pictures, each located at the head of a similar-picture segment in a chronological order in the format shown in FIGS. 25A to 25C during a recording process or at a recording-end time or with a predetermined timing after the end of the recording process.

It is to be noted that, much like the first embodiment explained earlier by referring to FIGS. 4 to 6, the video classification process unit 5 detects characteristics of video data for each I picture, which is used as a processing unit, recognizes similar pictures on the basis of the detected characteristics and determines similar-picture segments each comprising pictures similar to each other. Also as described earlier, the same identification is assigned to similar pictures so that, by using such an identification, it is possible to identify which range of pictures is included in each similar-picture segment.

In addition, much like the first embodiment explained earlier by referring to FIG. 7, the audio classification process unit 20 recognizes similarity of sounds for each predetermined time unit and, much like the second and third embodiments, the audio classification process unit 20 also detects audio levels.

<Reproduction System>

Next, the reproduction system is explained. A control signal generated by the system controller 17 controls the reproduction control unit 9 to read out multiplexed data specified by the user from the recording medium 8 and supply the data to the reproduction process unit 10. The reproduction process unit 10 carries out predetermined processes including deinterleave processing on the multiplexed data received thereby and supplies the processed multiplexed data to the separation process unit 11. The separation process unit 11 demultiplexes the multiplexed data supplied thereto to generate audio data, video data, shrunk-picture data and an identification information signal to mention a few.

The audio data generated by the separation process unit 11 is supplied to an audio decoder 12. The audio data supplied to the audio decoder 12 is data compressed by adoption of a predetermined compression method. The audio decoder 12 thus decompresses the compressed audio data received thereby and supplies audio data obtained as a result of the decompression to an audio digital/analog converter 13, which is abbreviated hereafter to an audio D/A converter.

The audio D/A converter 13 converts the digital audio signal supplied thereto into an analog audio signal and outputs the analog audio signal to a speaker. The speaker generates a sound according to the analog audio signal supplied thereto.

In addition, the video data generated by the separation process unit 11 is supplied to a video decoder 14. The video data supplied to the video decoder 14 is data compressed by adoption of a predetermined compression method. The video decoder 14 thus decompresses the compressed video data received thereby and supplies video data obtained as a result of the decompression to a video digital/analog converter 15, which is abbreviated hereafter to a video D/A converter.

The video D/A converter 15 converts the digital video signal supplied thereto into an analog video signal and outputs the analog video signal to a monitor receiver. The monitor receiver displays a picture according to the analog video signal supplied thereto.

The identification information signal separated by the separation process unit 11 is supplied to an identification-signal detection unit 16. The identification-signal detection unit 16 detects necessary identification information signal from the identification information signal received thereby and supplies the identification information signal to the system controller 17 and the classification display unit 19.

In addition, the identification-signal detection unit 16 also extracts a predetermined timestamp signal or frame numbers from the identification information signal received thereby and supplies the timestamp signal or the frame numbers to the system controller 17. By detecting a reproduction point of time on the basis of the timestamp signal, a reproduction position can also be displayed on the classification display unit 19.

Then, when a command is entered via the user input I/F 18 as a command making a request for a display classifying a broadcast program recorded on the recording medium 8, the system controller 17 controls the reproduction control unit 9 on the basis of the identification information signal supplied to the system controller 17 to read out shrunk pictures of the desired broadcast program from the recording medium 8 and supplies the shrunk pictures to the classification display unit 19 by way of the reproduction process unit 10 and the separation process unit 11. In addition, the system controller 17 controls the classification display unit 19 on the basis of the identification information signal to display a classification of the broadcast program recorded on the recording medium 8 as shown in FIGS. 25A to 25C.

As described above, even with a predetermined timing after the end of the recording process, by using the identification information signal as well as the shrunk-picture signal, which have been generated on the basis of the picture-similarity determination processing and then stored in the recording medium 8, a classification of pictures can be displayed as shown in FIGS. 25A to 25C.

It is to be noted that, this embodiment has been exemplified by giving a case of recording a news program as an example. However, the embodiment is by no means limited to such a case. For example, the embodiment can also be applied to a case of recording a musical program or the like onto the recording medium. In the case of recording a musical program onto the recording medium, scenes each showing a singer singing a song are classified. A scene showing a desired singer singing a song can thus be found fast from the recording medium and, for example, a program portion including such a scene can therefore be reproduced quickly in the normal mode.

In addition, the processing described above can be carried out in the same way also for a case of recording a sport program such as a baseball of a tennis program. That is to say, a picture located at the head of each similar-picture segment is displayed. In the case of a baseball program, the picture located at the head of a similar-picture segment may be a scene showing a butter entering a butter box or a scene showing a pitcher throwing the ball. In the case of a tennis tournament, a picture located at the head of each similar-picture segment can be used for searching the tennis program for a serve-scene.

On top of that, it is also possible to generate picture data for a digest reproduction process and picture data for a skimming reproduction process during a recording process and store these pieces of data along with the main picture data of the broadcast program so that the digest and skimming reproduction processes of the broadcast program can be carried out.

If it is desired to carry out a special reproduction process such as the digest or skimming reproduction process, the user needs to enter a command making a request for the special reproduction process to the recording/reproduction apparatus 400 via the user input I/F 18. Receiving the command entered by the user, the system controller 17 controls the reproduction control unit 9 to read out picture data for the desired special reproduction method so as to allow pictures of the desired special reproduction method to be reproduced.

<Operations of the Recording/Reproduction Apparatus 400>

Figure 26:
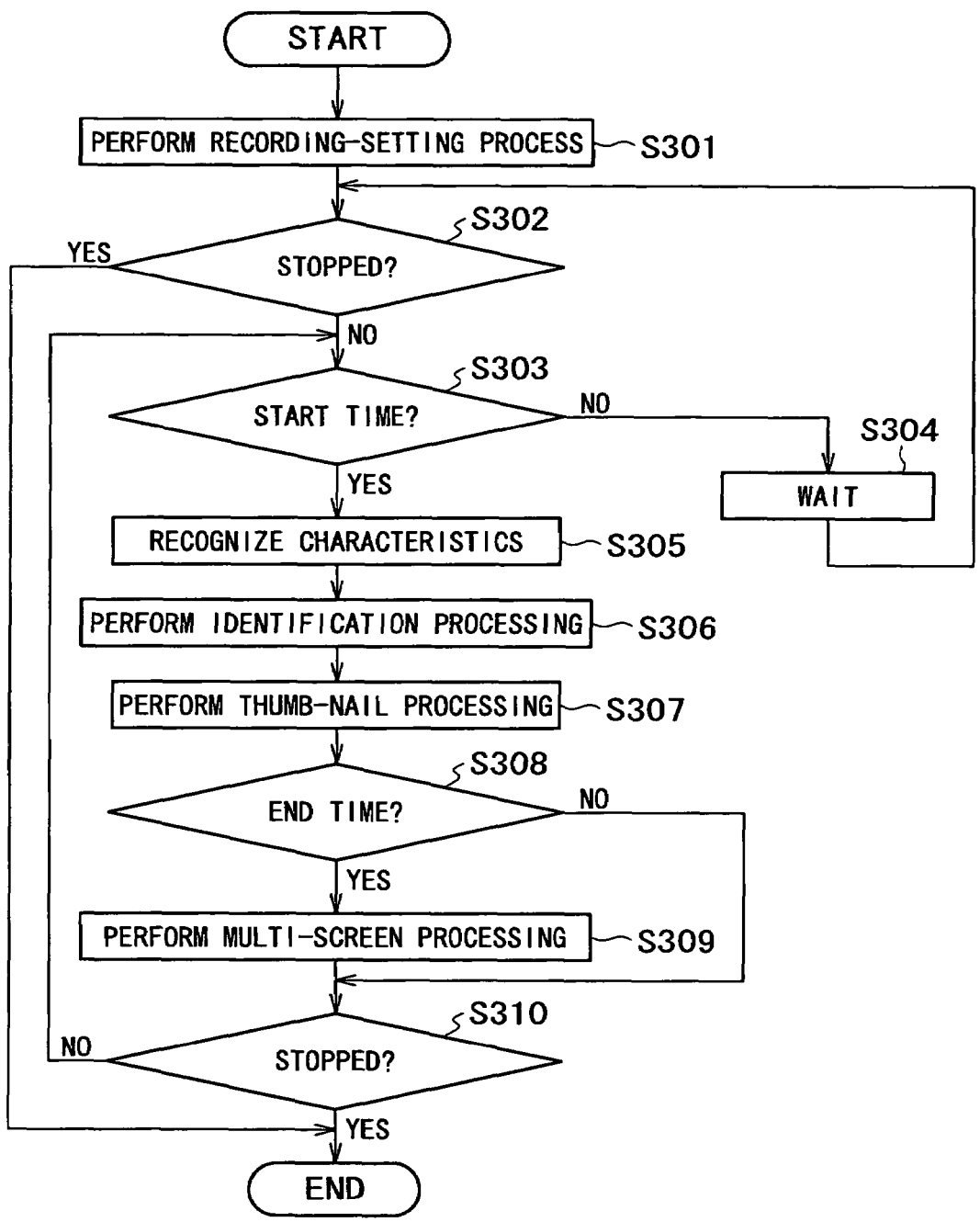
FIG. 26 shows a flowchart referred to in explanation of operations carried out by the recording/reproduction apparatus implemented by the fourth embodiment shown in FIG. 23.

Next, operations carried out by the recording/reproduction apparatus 400 implemented by the fourth embodiment described above in a recording process are explained by referring to a flowchart shown in FIG. 26. FIG. 26 shows a flowchart referred to in explanation of operations carried out by the recording/reproduction apparatus 400 implemented by the fourth embodiment.

The processing represented by the flowchart shown in FIG. 26 is carried out when the system controller 17 receives a command entered by the user to carry out processes to record for example a news program and to display classifications of the program.

The flowchart begins with a step S301, at which the system controller 17 sets start and end times of one or more news programs as recording start times and recording end times respectively in a non-volatile memory of the system controller 17 on the basis of for example an EPG (Electronic Program Guide) presented as a guide included in a broadcast signal of a digital television broadcast.

In the operation carried out at the step S301, start and end times of one or more news programs can also be received as inputs from the user input I/F and set as recording start times and recording end times respectively. That is to say, recording start times and recording end times can also be set manually by the user.

It is to be noted that the system controller 17 includes a clock circuit not shown in FIG. 23. The clock circuit provides the present data, the present day of the week and the present time.

Then, at the next step S302, the system controller 17 determines whether or not the user has entered a command to stop the process to record a news program for example onto the recording medium and stop the process to exhibit a classification display.

If the determination result produced by the operation carried out at the step S302 indicates that the user has not entered a stop command, the flow of the operations goes on to a step S303 to determine whether or not the present time computed by the clock circuit has attained the recording start time of the current news program.

If the determination result produced by the operation carried out at the step S303 indicates that the present time computed by the clock circuit has not attained the recording start time of the current news program, the flow of the operations goes on to a step S304 to enter a wait state (or a standby state) by repeating the operations described above from the step S302.

If the determination result produced by the operation carried out at the step S303 indicates that the present time computed by the clock circuit has attained the recording start time of the current news program, on the other hand, the flow of the operations goes on to a step S305 at which the system controller 17 controls components such as the video classification process unit 5 and the I-picture detection unit 21 to detect characteristics of video data of a news program to be recorded onto the recording medium. Then, at the next step S306, an operation to identify similar pictures is carried out.

It is to be noted that, in the operations carried out at the steps S305 and S306, the audio classification process unit 20 may also be controlled to recognize similar segments in the audio signal to be recorded onto the recording medium, and such segments can also be taken into consideration. For example, segments including similar pictures and similar sounds can each be set as a similar segment.

Then, at the next step S307, the system controller 17 also controls the shrunk-picture process unit 22 to carry out a thumb-nail operation of creating shrunk pictures from I pictures each located at the head of a similar-picture segment. Subsequently, at the next step S308, the system controller 17 determines whether or not the present time computed by the clock circuit has attained the recording end time of the current news program.

If the determination result produced by the operation carried out at the step S308 indicates that the present time computed by the clock circuit has attained the recording end time of the current news program, the flow of the operations goes on to a step S309 at which the system controller 17 controls the classification display unit 19 to show a tabular display of shrunk pictures like those shown in FIGS. 25A to 25C in the multi-picture display format.

If the determination result produced by the operation carried out at the step S308 indicates that the present time computed by the clock circuit has not attained the recording end time of the current news program, on the other hand, the flow of the operations goes on to a step S310. The flow of the operations also goes on to a step S310 after the operation carried out at the step S309 has been completed. At the step S310, the system controller 17 determines whether or not the user has entered a command to stop the process to record a news program onto the recording medium and stop the process to exhibit a classification display.

If the determination result produced by the operation carried out at the step S310 indicates that the user has not entered a stop command, the flow of the operations goes back to the step S303 at which the operations described above are repeated from this step to record a news program received next and carry out the classification display operation for this news program. If the determination result produced by the operation carried out at the step S310 indicates that the user has entered a stop command, on the other hand, the execution of the operations represented by the flowchart shown in FIG. 26 is ended. Then, the recording/reproduction apparatus 400 typically enters a state of waiting for the user to enter a next command.

<Summary of the Fourth Embodiment>

As described above, the recording/reproduction apparatus 400 implemented by the fourth embodiment is capable of identifying similar-picture segments of a video signal and an audio signal of a television broadcast program in a recording process, displaying pictures each located at the head of one of the similar-picture segments as shrunk pictures (or thumb-nail pictures) in a tabular display format (or a multi-picture display format) and updating the tabular display screen by adding an array of shrunk pictures representing a new program on the top row of the screen. Thus, contents of a plurality of programs recorded so far can be grasped effectively and with a high degree of efficiency to show contents always updated with the lapse of time.

In addition, since only some data of an information signal can be displayed in a tabular format instead of displaying the entire data of the signal, contents of the information signal can be grasped with a high degree of accuracy and a high degree of precision in a short period of time.

On top of that, by specifying a shrunk picture, a sequence of pictures starting with a picture corresponding to the shrunk picture can be normally reproduced as a picture sequence beginning at a start point of time corresponding to the shrunk picture.

As described above, since it is possible to identify similar-picture segments, display pictures in a tabular display format and update the tabular display screen every time a new program is processed, processing such as an operation to grasp contents of programs and an operation to specify a reproduction point of time can be carried out quickly and accurately.

In addition, since shrunk pictures are also stored on a recording medium, the stored shrunk pictures can be displayed in a tabular format shown in FIGS. 25A to 25C at any time. Then, a portion represented by one of the shrunk pictures can be reproduced as a desired portion of the information signal represented.

On top of that, if it is impossible to accommodate a classification display in a screen, the classification display can be scrolled in the horizontal direction or the vertical direction so as to make the user capable of viewing all shrunk pictures.

Furthermore, in the case of the fourth embodiment, a video signal is the first information signal while shrunk pictures (thumb-nail pictures) created as a result of shrinking predetermined I pictures of the video signal correspond to the second information signal. As described above, the second information signal can be any signal as long as the signal is obtained as a result of carrying out a predetermined process on predetermined portions of the first information signal. Thus, the second information signal can be generated as thumb-nail pictures each obtained as a result of shrinking picture data contained in 1 frame of a predetermined portion of the video signal.

Moreover, the first information signal is by no means limited to a video signal. For example, the first information signal can be an audio signal. If an audio signal is used as the first information signal, for example, a message created in the fourth embodiment can be used as the second information signal. As another example, text data or the like can be used as the first information signal.

Fifth Embodiment

Figure 27:
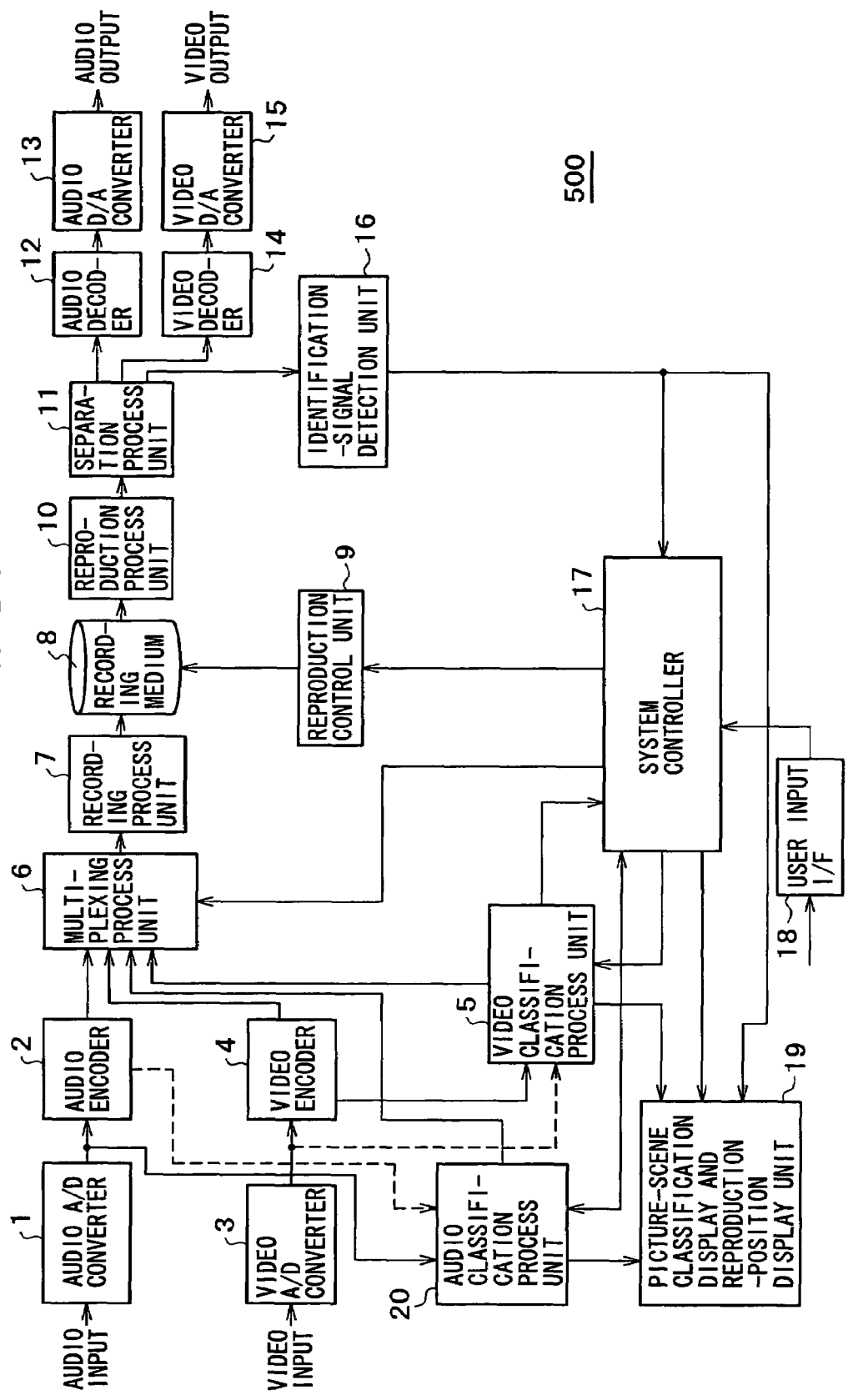
FIG. 27 is an explanatory block diagram showing a recording/reproduction apparatus implemented by fifth and sixth embodiments to which an embodiment of the information-signal process apparatus and information-signal process method provided by the present invention is applied.

FIG. 27 is an explanatory block diagram showing a recording/reproduction apparatus 500 implemented by fifth embodiment to which an embodiment of the information-signal process apparatus and information-signal process method provided by the present invention is applied. FIGS. 28A to 28C and 29A to 29C are explanatory diagrams showing an outline of operations carried out by the recording/reproduction apparatus 500 implemented by the fifth embodiment.

The recording/reproduction apparatus 500 implemented by the fifth embodiment makes video information of similar-picture segments extractable from principal information of a television broadcast program and makes the extracted video information of similar-picture segments usable in advance during a process to record the television broadcast program onto a recording medium, or creates summary information to be added to the principal information in advance during the recording process. Thus, the so-called digest reproduction process can be carried out.

In addition, the recording/reproduction apparatus 500 implemented by the fifth embodiment is provided with a plurality of digest reproduction methods and capable of selecting a proper one of the methods as a method to be adopted in a digest reproduction process in accordance with the genre of a recorded television broadcast program or capable of selecting a proper one of the methods as a method to prevent the reproduction time from becoming long.

<Principle of Operation>

The following description explains the principle of operation of the recording/reproduction apparatus 500 implemented by the fifth embodiment. Much like the recording/reproduction apparatus implemented by the embodiments described earlier, the recording/reproduction apparatus 500 shown in FIG. 27 is capable of converting an analog information signal, which is typically analog video and audio signals of a television broadcast program, into digital data, compressing the digital data, multiplexing the compressed digital data and recording the multiplexed compressed digital data onto the recording medium 8. The recording medium 8 is typically a disk-shaped recording medium having a large storage capacity. An example of such a disk-shaped recording medium is a hard disk.

In addition, the recording/reproduction apparatus 500 shown in FIG. 27 is capable of reading out a multiplexed compressed digital signal from the recording medium 8, demultiplexing the multiplexed compressed digital signal read out from the recording medium 8 to generate compressed digital video and audio data separated from each other, decompressing the compressed digital video and audio data to recover the pre-compression digital video and audio data, converting the pre-compression digital video and audio data into analog video and audio signals and outputting the analog video and audio signals.

Much like the recording/reproduction apparatus implemented by the embodiments described earlier, the recording/reproduction apparatus 500 shown in FIG. 27 is also capable of recognizing I pictures similar to each other, classifying similar pictures into similar-picture segments, adding an identification information to similar pictures so as to make each of the similar-picture segments recognizable and recording the similar-picture segments onto the recording medium.

In addition, the recording/reproduction apparatus 500 implemented by the fifth embodiment basically discriminates similar pictures included in an input picture series, identifies similar-picture segments (similar-picture scenes) and makes the identified similar-picture segments usable in a digest reproduction process.

As will be described below, however, the recording/reproduction apparatus 500 implemented by the fifth embodiment has four digest reproduction modes A, B, C and D. These digest reproduction modes are explained below by taking a process to record an input picture sequence shown in FIG. 28A onto a recording medium as an example.

In the input picture sequence shown in FIG. 28A, a similar-picture segment A1 includes pictures 3, 4 and 5 similar to each other. By the same token, a similar-picture segment A2 includes pictures 13, 14, 15 and 16 similar to each other. In the same way, a similar-picture segment A3 includes pictures 22, 23, 24, 25 and 26 similar to each other.

In such a case, the digest reproduction mode A is a mode for sequentially reproducing the similar-picture segments A1, A2 and A3 along the time series as shown in FIG. 28B. The digest reproduction mode A shown in FIG. 2B is effective for a case in which contents of a program, which has relatively few changes, can be grasped with a relatively high degree of efficiency by viewing only similar-picture scenes in the program. Examples of the scenes are a picture scene of a news caster in the case of a news program and a picture scene of specific performers in the case of a talk-show program.

A picture segment B1 includes the similar-picture segment A1 and segments immediately preceding and succeeding the similar-picture segment A1. By the same token, a picture segment B2 includes the similar-picture segment A2 and segments immediately preceding and succeeding the similar-picture segment A2. In the same way, a picture segment B3 includes the similar-picture segment A3 and segments immediately preceding and succeeding the similar-picture segment A3. The digest reproduction mode B is a mode for sequentially reproducing the picture segments B1, B2 and B3 along the time series as shown in FIG. 28C. The digest reproduction mode B is effective for a case in which the similar-picture segment is for example a batting scene in the case of a baseball game program or a serving scene in the case of a tennis tournament program.

That is to say, if continuity exists throughout a program as is the case with certain kinds of sport program including a baseball game program and a tennis tournament program, by displaying also segments immediately preceding and succeeding each similar-picture segment along with the similar-picture segments rather than merely displaying only the similar-picture segments, the segments immediately preceding and succeeding each similar-picture segment can be used for indicating the context of each similar-picture segment so that contents of the program can be grasped effectively and with a high degree of efficiency without a sense of incompatibility.

In addition, it is possible to acquire information allowing the genre of a television broadcast program to be recorded, that is, information indicating whether the program is a news program, a sport program or a program of another type, from a presented EPG data included in the signal of the television broadcast program and also to store the acquired information onto the recording medium in advance so that a digest reproduction mode optimum for the genre of a program to be reproduced can be selected automatically in a digest reproduction process. Thus, the digest reproduction process can be carried out in the optimum digest reproduction mode.

It is needless to say that the user itself is allowed to specify a preferred digest reproduction mode to be used in a digest reproduction process so that the digest reproduction process can be carried out in the selected digest reproduction mode. In addition, the processing to detect similar pictures and the processing to determine similar-picture segments can be carried out and implemented in the same way as the processing performed by the picture-classification process unit employed in each of the other embodiments described earlier.

The descriptions of the embodiments are focused on similarity of pictures. However, attention can also be paid to attributes of an audio signal. Typically, an audio signal is classified into musical-sound segments and conversational-voice segments and the digest reproduction mode A or B is adopted.

In this case, for example, in the digest reproduction mode A of a musical program, only scenes are played back in a digest reproduction process to generate music, or the musical program is edited to produce only scenes generating music in a digest reproduction process. Thus, an effective digest reproduction process can be carried out.

In the digest reproduction mode B applied to a musical program such as a popular-song program, on the other hand, it is assumed that, for example, introduction of a singer or a performer prior to the start of each song can be displayed. Thus, a digest reproduction process can be carried out on only introductory portions each preceding a song to be sung as a portion introducing the song singer appearing in the popular-song program or the program can be edited to generate only such introductory portions to be displayed in a digest reproduction process. Thus, an effective digest reproduction process can be carried out.

It is to be noted that the processing to detect and classify musical-sound segments and conversational-voice segments can be carried out and realized in the same way as the processing performed by the audio classification process unit 20 employed in the recording/reproduction apparatus implemented by each of the other embodiments described earlier.

By the way, in the case of the digest reproduction modes A and B shown in FIGS. 28B and 28C respectively, if similar-picture segments are too long, the reproduction time is also prolonged excessively, conceivably giving rise also to a case, in which contents of a recorded program cannot be grasped in a short period of time with a high degree of efficiency, in consequence.

Figure 29A:
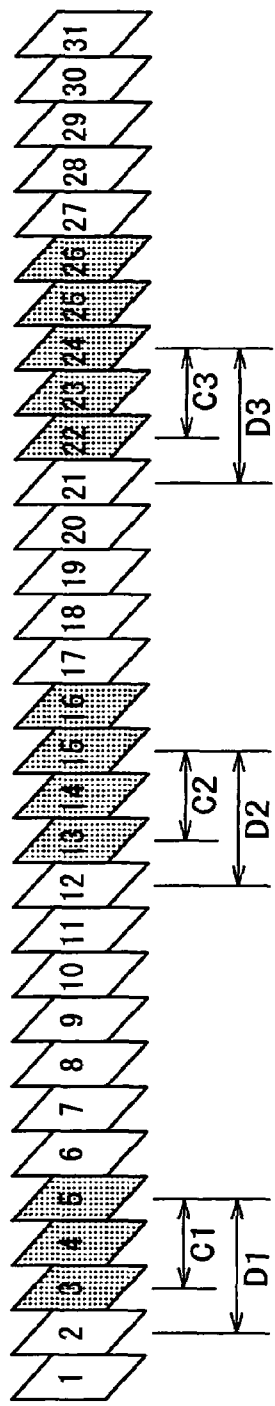
FIGS. 29A to 29C are explanatory diagrams showing an outline of operations carried out by the recording/reproduction apparatus implemented by the fifth embodiment shown in FIG. 27.

In order to solve this problem, assume that, in an input picture sequence shown in FIG. 29A, a similar-picture segment C1 includes pictures 3, 4 and 5 similar to each other, a similar-picture segment C2 includes pictures 13, 14, 15 and 16 similar to each other and a similar-picture segment C3 includes pictures 22, 23, 24, 25 and 26 similar to each other as is the case with the input picture sequence shown in FIGS. 28A to 28C. The similar-picture segments C1, C2 and C3 shown in FIG. 29A are used as digest reproduction segments.

Figure 29B:
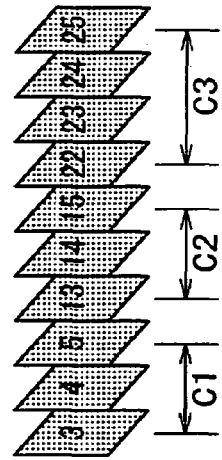

The digest reproduction mode C is a mode in which the length of each digest reproduction segment, that is, the length of each picture segment used in a digest reproduction process is determined in advance as shown in FIG. 29B so that it is possible to carry out a digest reproduction process with a digest reproduction time not exceeding the sum of the determined lengths of the digest reproduction segments.

Figure 29C:
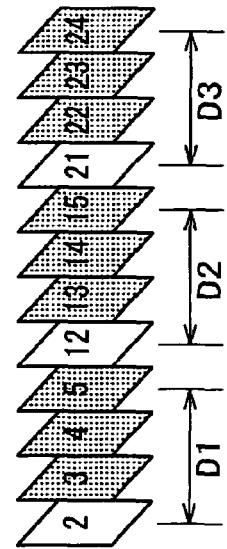

The digest reproduction mode D shown in FIG. 29C is a mode in which the digest reproduction process of each digest reproduction segment in the digest reproduction mode C shown in FIG. 29B is expedited to start at a point of time leading ahead of the head of the digest reproduction segment by a predetermined time interval. In the case of the digest reproduction mode D, a scene flow between a similar-picture segment and a picture segment preceding the similar-picture segment can also be grasped as is the case with the digest reproduction mode B. For certain program genres such as the genre of a sport program, a more effective digest reproduction process can be carried out and the digest reproduction time will never be prolonged more than necessary.

<Operations and Configuration of the Recording/Reproduction Apparatus 500 Implemented by the Fifth Embodiment>

Operations and configuration of the recording/reproduction apparatus 500 implemented by the fifth embodiment shown in FIG. 27 are explained. The configuration shown in FIG. 27 can be divided into portions on the left and right sides of the recording medium 8. The portion on the left side is mainly a recording system while the portion on the right side is mainly a reproduction system.

<Recording System>

First of all, the recording system is explained. An analog audio signal (an audio input) supplied to the recording/reproduction apparatus 400 implemented by the fifth embodiment is fed to an audio A/D converter 1 for converting the analog audio signal into a digital audio signal to be supplied to an audio encoder 2 and an audio classification process unit 20.

The audio encoder 2 carries out a band compression process on the digital audio signal by adoption of a predetermined compression technique such as an MPEG audio method. Audio data obtained as a result of the band compression process carried out on the digital audio signal is supplied to a multiplexing process unit 6.

The audio classification process unit 20 detects continuity of a frequency spectrum peak in the digital audio signal typically for each predetermined segment to determine whether or not the digital audio signal is a musical signal. The result of the determination is supplied to the multiplexing process unit 6, a system controller 17 and a picture-scene classification display and reproduction-position display unit 19, which is a unit for showing a picture scene classification display and reproduction position display. The picture-scene classification display and reproduction-position display unit 19 is also properly referred to hereafter as a classification display unit.

It is to be noted that, instead of processing the digital audio signal received from the audio A/D converter 1, the audio classification process unit 20 can also be designed into a configuration for receiving the audio data, which is obtained as a result of the band compression process carried out by the audio encoder 2 on the digital analog signal generated by the audio A/D converter 1, as indicated by a dashed line shown in FIG. 1, and carrying out the classification processing described earlier on the audio data.

On the other hand, an analog video signal (a video input) supplied to the recording/reproduction apparatus 400 implemented by the fourth embodiment is fed to a video A/D converter 3 for converting the analog video signal into a digital video signal to be supplied to a video encoder 4.

The video encoder 4 carries out a band compression process on the digital video signal by adoption of a predetermined compression technique such as an MPEG2 method. Video data obtained as a result of the band compression process carried out on the digital video signal is supplied to a video classification process unit 5, the multiplexing process unit 6, an I-picture detection unit 21 and a shrunk-picture process unit 22.

The video classification process unit 5 detects picture characteristics of I pictures of the video data received from the video encoder 4 and recognizes picture similarity on the basis of the detected characteristics. In addition, the video classification process unit 5 also recognizes similar-picture segments as explained earlier by referring to FIGS. 28A to 28C and 29A to 29C. The video classification process unit 5 also generates an identification information signal for identifying the similar-picture segments and supplies the signal to the multiplexing process unit 6 and the classification display unit 19. The signal identification information includes position information of the video data, and the position information of the video data includes information on how many consecutive similar frames are included in each similar-picture segment.

It is to be noted that, instead of receiving the compressed video data from the video encoder 4, the video classification process unit 5 may also receive the digital video signal output by the video A/D converter 3 as indicated by a dashed line shown in FIG. 27 and carries out the processes to identify and classify similar pictures of the digital video data in frame units as described above on the basis of the digital video signal.

In addition, it is also possible to provide a configuration in which the identification information signals obtained as results of the processes to classify the video and audio signals can also be generated by the system controller 17 on the basis of the classification-process results received from the video classification process unit 5 and the audio classification process unit 20 and supplied to the multiplexing process unit 6.

As is the case with the recording/reproduction apparatus 100 implemented by the first embodiment described earlier, the system controller 17 is a microcomputer including a CPU (Central Processing Unit), a ROM (Read Only Memory), a RAM (Random Access Memory), a non-volatile memory and a timer circuit, which are used for controlling the other components composing the recording/reproduction apparatus 500.

In this embodiment, the classification display unit 19 receives the classification result from the audio classification process unit 20, the identification information signal from the video classification process unit 5, sequentially displaying, among other information, picture classifications.

In addition, the multiplexing process unit 6 generates multiplexed data by typically carrying out a multiplexing process on the audio data, the video data and the additional identification information signal received from the video classification process unit 5, supplying the multiplexed data to the recording process unit 7.

On top of that, the multiplexed data includes additional information on the genre of a program, that is, program-genre information indicating that a program contained in the multiplexed data is a news program, a sport program or another kind of program. The program-genre information can be extracted from an EPG data included in the digital broadcast signal or can be entered by the user.

The recording process unit 7 carries out processing including a process to add error correction codes to the multiplexed data and a process to interleave the data to create a signal to be recorded, recording the signal into a predetermined area in the recording medium 8.

Then, in the case of this embodiment, as described before, by using the identification information signal multiplexed in the multiplexed data, it is possible to identify similar-picture segments to be used as summary information. Thus, it is possible to carry out a digest reproduction process by adoption of a predetermined digest reproduction method with a predetermined timing after the end of the recording process.

It is to be noted that, much like the first embodiment explained earlier by referring to FIGS. 4 to 6, the video classification process unit 5 detects information on characteristics of video data for each I picture, which is used as a processing unit, detects similar pictures on the basis of the detected information on characteristics and determines similar-picture segments each including pictures similar to each other. Also as described earlier, the same identification is assigned to similar pictures so that, by using such information on identification, it is possible to identify which range of pictures is included in each similar-picture segment.

In addition, much like the first embodiment explained earlier by referring to FIG. 7, the audio classification process unit 20 detects similarities of sounds for each predetermined time unit and, much like the second and third embodiments, the audio classification process unit 20 also detects audio levels.

<Reproduction System>

Next, the reproduction system is explained. A control signal generated by the system controller 17 controls the reproduction control unit 9 to read out multiplexed data specified by the user from the recording medium 8 and supply the data to the reproduction process unit 10. The reproduction process unit 10 carries out predetermined processes including deinterleave processing on the multiplexed data received thereby and supplies the processed multiplexed data to the separation process unit 11. The separation process unit 11 demultiplexes the multiplexed data supplied thereto to generate audio data, video data, shrunk-picture data and an identification information signal.

The audio data generated by the separation process unit 11 is supplied to an audio decoder 12. The audio data supplied to the audio decoder 12 is data compressed by adoption of a predetermined compression method. The audio decoder 12 thus decompresses the compressed audio data received thereby and supplies audio data obtained as a result of the decompression to an audio digital/analog converter 13, which is abbreviated hereafter to an audio D/A converter.

The audio D/A converter 13 converts the digital audio signal supplied thereto into an analog audio signal and outputs the analog audio signal to a speaker. The speaker generates a sound according to the analog audio signal supplied thereto.

In addition, the video data generated by the separation process unit 11 is supplied to a video decoder 14. The video data supplied to the video decoder 14 is data compressed by adoption of a predetermined compression method. The video decoder 14 thus decompresses the compressed video data received thereby and supplies video data obtained as a result of the decompression to a video digital/analog converter 15, which is abbreviated hereafter to a video D/A converter.

The video D/A converter 15 converts the digital video signal supplied thereto into an analog video signal and outputs the analog video signal to a monitor receiver. The monitor receiver displays a picture according to the analog video signal supplied thereto.

In addition, the identification information signal generated by the separation process unit 11 is supplied to an identification-signal detection unit 16. The identification-signal detection unit 16 detects necessary identification information signal for digest reproduction from the identification information signal received thereby, and supplies the identification information signal to the system controller 17 and if needed, to the classification display unit 19.

In addition, the identification-signal detection unit 16 also extracts a predetermined times tamp signal or frame numbers from the identification information signal received thereby and supplies the timestamp signal or the frame numbers to the system controller 17. By detecting a reproduction point of time on the basis of the timestamp signal, a reproduction position can also be displayed on the classification display unit 19.

When a digest reproduction process is requested for a specified program, the genre of the program is identified from program-genre information added to the multiplexed signal of the program. Then, the reproduction control unit 9 is operated so as to carry out the digest reproduction process in a digest reproduction mode suitable for the identified genre. In the digest reproduction process, picture data of similar-picture segments identified by information on identifications in accordance with control executed by the reproduction control unit 9 to serve as summary information is read out from the recording medium.

The picture data read out from the recording medium to be used as summary information is output to a speaker and a monitor receiver for carrying out the digest reproduction, by way of the classification display unit 19, the separation process unit 11, the audio decoder 12, the audio D/A converter 13, the video decoder 14 and the video D/A converter 15 as described earlier.

It is to be noted that, the digest reproduction mode to be used is by no means limited to a mode automatically selected in accordance with an automatically identified genre of a program even if a digest reproduction mode is automatically identified as described above. The user can also select a digest reproduction mode to be used for carrying out a requested digest reproduction process and make a request for use of the selected digest reproduction mode. As another alternative, a digest reproduction mode can be set in advance as a mode to be used for carrying out a requested digest reproduction process.

<Operations of the Recording/Reproduction Apparatus 500 Implemented by the Fifth Embodiment>

Figure 30:
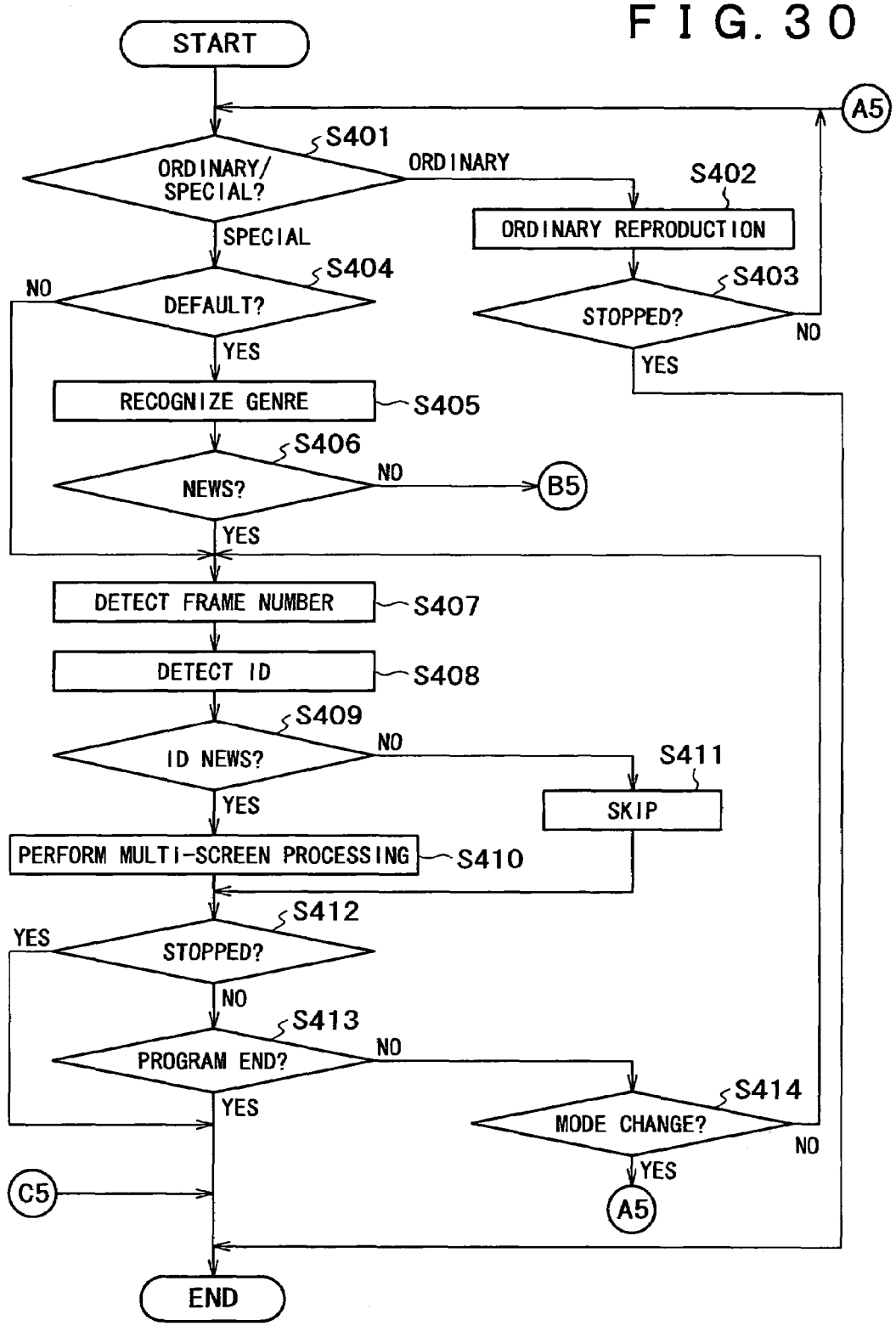
FIG. 30 shows a flowchart referred to in explanation of operations carried out by the recording/reproduction apparatus implemented by the fifth embodiment shown in FIG. 27.
Figure 31:
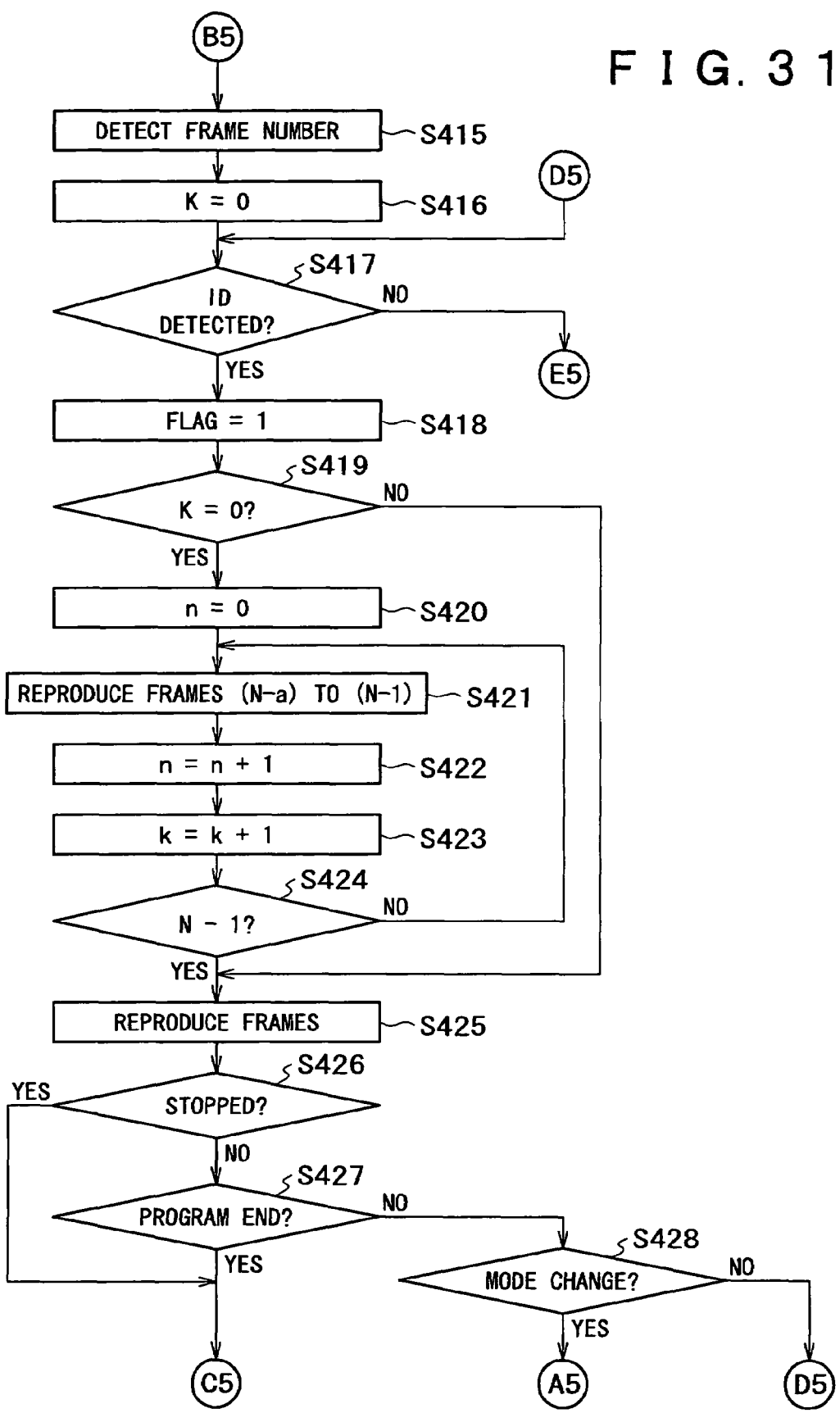
FIG. 31 shows a continuation flowchart of the flowchart shown in FIG. 30.
Figure 32:
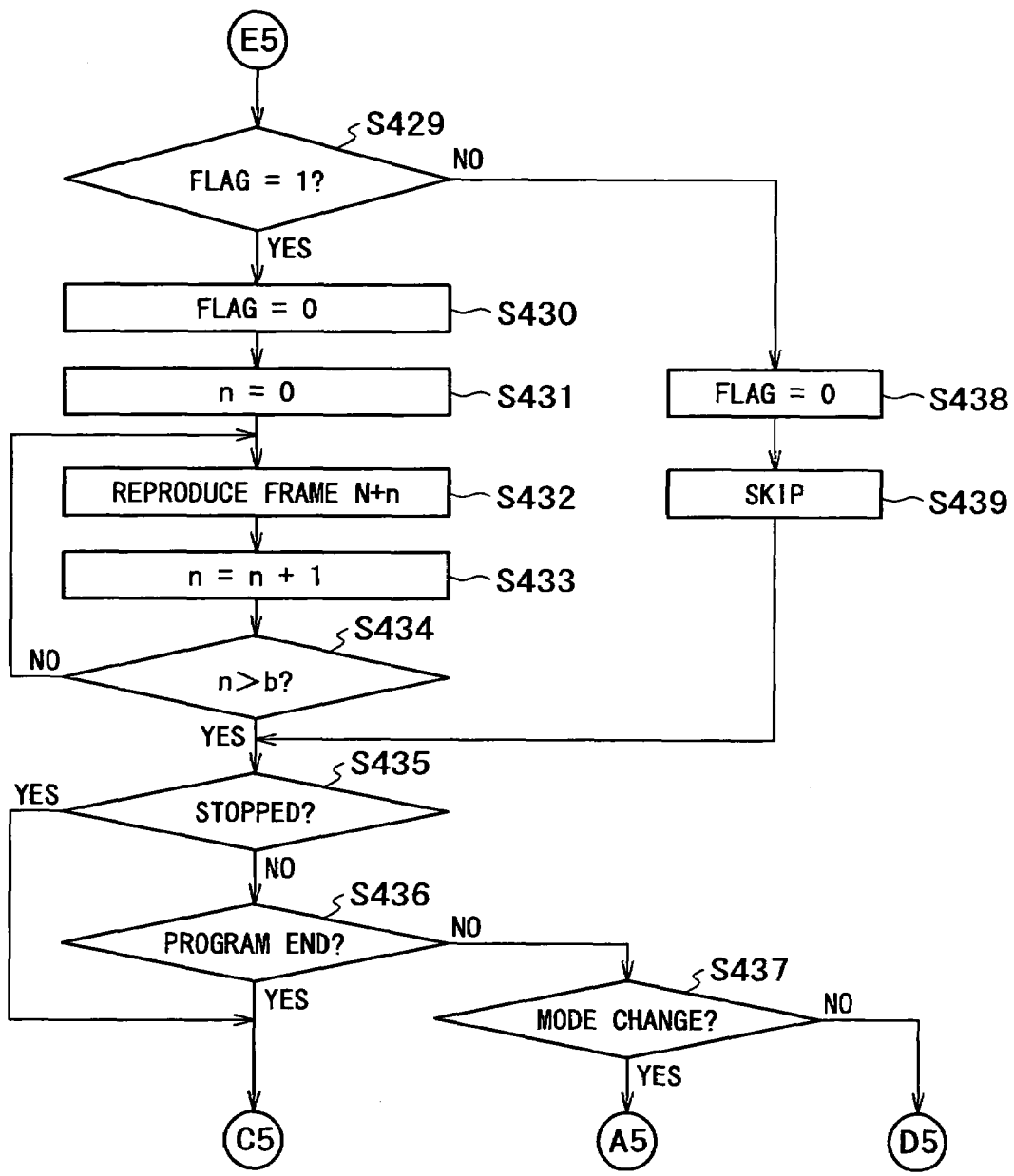
FIG. 32 shows a continuation flowchart of the flowchart shown in FIG. 31.

Next, operations carried out by the recording/reproduction apparatus 500 implemented by the fifth embodiment described above in a recording process are explained by referring to a flowchart shown in FIGS. 30 to 32. It is to be noted that, in order to make the explanation simple, the following description assumes that the digest reproduction mode A or B explained earlier by referring to FIGS. 28A to 28C is used as a digest reproduction mode.

In addition, in this embodiment, as a default special reproduction mode, the digest reproduction mode A or B explained earlier by referring to FIGS. 28A to 28C can be selected in accordance with the program genre.

The processing represented by the flowchart shown in FIGS. 30 to 32 is carried out by the recording/reproduction apparatus 500 in accordance with a command entered by the user via the user input I/F 18 to carry out an ordinary or digest reproduction process.

The flowchart begins with a step S401 at which the system controller 17 determines whether a reproduction process requested by the user is an ordinary or special reproduction process when the user enters a command making a request for the reproduction process. The ordinary reproduction process is a process to reproduce all principal information from the recording medium 8 whereas the special reproduction process in this embodiment is the digest reproduction process.

If the determination result produced by the operation carried out at the step S401 indicates that the command entered by the user is a command making a request for an ordinary reproduction process, the flow of the operations goes on to a step S402 at which the system controller 17 controls the components of the reproduction control unit 9 associated to this process, to carry out an ordinary reproduction process of reproducing all principal information of a program from the recording medium 8.

Then, the flow of the operations goes on to a step S403 to determine whether or not a command to stop the ordinary reproduction process has been received through the user input I/F 18. If the determination result indicates that no command to stop the ordinary reproduction process has been received, the flow of the operations goes back to the step S401 to repeat the operations described above all over again from this step. If the determination result produced by the operation carried out at the step S403 indicates that a command to stop the ordinary reproduction process has been received, on the other hand, the execution of the operations represented by the flowchart shown in FIGS. 30 and 32 is ended. Then, the recording/reproduction apparatus 500 typically enters a state of waiting for the user to enter a next command.

If the determination result produced by the operation carried out at the step S401 indicates that the command entered by the user is a command making a request for a special reproduction process, that is, a digest reproduction process, on the other hand, the flow of the operations goes on to a step S404 at which the system controller 17 examines typically setting information stored in its own non-volatile memory in order to determine whether or not setting of a default reproduction mode is adopted to set a default mode as a digest reproduction mode.

If the default mode setting is not adopted to set a default mode for a digest reproduction mode, in this embodiment, the digest reproduction mode A is assumed. It is needless to say that the default reproduction mode for the digest reproduction mode can be changed to the digest reproduction mode C or D explained earlier by referring to FIGS. 29A to 29C.

If the determination result produced by the operation carried out at the step S404 indicates that setting of a default reproduction mode is adopted, the flow of the operations goes on to a step S405 at which information on the genre of the program to be subjected to the digest reproduction process is acquired. As described before, the information on the genre of the program has been extracted from an EPG data or the like and added to the multiplexed data in the recording process. Then, the flow of the operations goes on to a step S406 to determine whether or not the program to be subjected to the digest reproduction process is a news program.

If the determination result produced by the operation carried out at the step S406 indicates that the program to be subjected to the digest reproduction process is a news program or if the determination result produced by the operation carried out at the step S404 indicates that the default mode setting is not adopted, the digest reproduction mode A is used.

In case the news program is indicated at the step S406, the flow of the operations goes on to a step S407 at which the system controller 17 controls the identification-signal detection unit 16 to detect a frame number added to the program to be subjected to the digest reproduction process. Then, at the next step S408, identification information added as information for identifying a similar-picture segment is detected.

Subsequently, the flow of the operations goes on to a step S409 to determine whether or not a video signal segment recognized as a similar-picture segment on the basis of the detected identification information is a scene of a news caster. If the similar-picture segment is a scene of a news caster, for example, the similar-picture segment also conceivably resembles a news-caster scene of another similar-picture segment. Thus, in the operation carried out at the step S409, a similar-picture segment resembling another similar-picture segment is recognized as a similar-picture segment to be subjected to the digest reproduction process.

If the determination result produced by the operation carried out at the step S409 indicates that the similar-picture segment to be subjected to the digest reproduction process is a scene of a news caster, the flow of the operations goes on to a step S410 at which frames of the similar-picture segments are reproduced. If the determination result produced by the operation carried out at the step S409 indicates that the similar-picture segment to be subjected to the digest reproduction process is not a scene of a news caster, on the other hand, the flow of the operations goes on to a step S411 at which frames of the similar-picture segments are skipped.

In either case, the flow of the operations then goes on to a step S412 to determine whether or not the user has entered a command to stop the digest reproduction process via the user input I/F 18. If the determination result indicates that the user has entered a command to stop the digest reproduction process, the execution of the operations represented by the flowchart shown in FIGS. 30 and 32 is ended. Then, the recording/reproduction apparatus 500 typically enters a state of waiting for the user to enter a next command.

If the determination result produced by the operation carried out at the step S412 indicates that the user has not entered a command to stop the digest reproduction process, on the other hand, the flow of the operations goes on to a step S413 to determine whether or not the digest reproduction process has ended. If the determination result produced by the operation carried out at the step S413 indicates that the digest reproduction process has ended, the execution of the operations represented by the flowchart shown in FIGS. 30 and 32 is terminated. Then, the recording/reproduction apparatus 500 typically enters a state of waiting for the user to enter a next command.

If the determination result produced by the operation carried out at the step S413 indicates that the digest reproduction process has not ended, on the other hand, the flow of the operations goes on to a step S414 to determine whether or not the user has entered a command to change the reproduction mode via the user input I/F 18.

If the determination result produced by the operation carried out at the step S414 indicates that the user has not entered a command to change the reproduction mode, the flow of the operations goes back to the step S407 to repeat the operations described above from this step. In this case, the digest reproduction process is continued in the digest reproduction mode A.

If the determination result produced by the operation carried out at the step S414 indicates that the user has entered a command to change the reproduction mode, on the other hand, the flow of the operations goes back to the step S401 to repeat the operations described above all over again from this step.

If the determination result produced by the operation carried out at the step S406 indicates that the program to be subjected to the digest reproduction process is not a news program, on the other hand, the flow of the operations goes on to a step S415 of a continuation flowchart shown in FIG. 31. At this step, the digest reproduction process is started in the digest reproduction mode B.

At the step S415, the system controller 17 controls the identification-signal detection unit 16 to detect frame numbers added to the program to be subjected to the digest reproduction process. Then, at the next step S416, a variable k is initialized by setting it at 0 (zero). The variable k is a counter for counting the number of iterative executions of a loop starting with a step S418.

Subsequently, at the next step S417, the system controller 17 determines whether of not predetermined identification information associated with a picture segment has been detected. The picture segment indicated by the identification information is one of picture segments to be sequentially reproduced. This picture segment includes a similar-picture segment and predetermined picture segments immediately preceding and succeeding the similar-picture segment as explained earlier by referring to FIG. 28C.

If the determination result produced by the operation carried out at the step S417 indicates that the predetermined identification information associated with a picture segment has been detected, the flow of the operations goes on to the step S418. At this step, a flag, which indicates that the predetermined identification assigned to frames of the similar-picture segment has been detected, is set at 1 for the purpose of indicating that the digest reproduction operation of this similar-picture segment has been completed as will be described later.

Then, the flow of the operations goes on to a step S419 at which the system controller 17 determines whether or not operations starting with a step S420 are to be carried out for the first time. Since the variable k has a value of 0, the determination result produced by the operation carried out at the step S419 indicates that the operations starting with a step S420 have not been carried out so far. In this case, the flow of the operations goes on to a step S420 at which a first-frame set variable n is initialized by setting the variable n at 0 for the purpose of reproducing frames (N−a) to (N−1) immediately preceding frame N located at the head of the similar-picture segment.

Then, at the next step S421, a first one of frames (N−a) to (N−1) immediately preceding frame N located at the head of the similar-picture segment is reproduced. Subsequently, at the next step S422, the variable n is incremented by 1. Then, at the next step S423, the variable k is incremented by 1. Subsequently, the flow of the operations goes on to a step S424 to determine whether or not frames (N−a) to (N−1) have all been reproduced.

If the determination result produced by the operation carried out at the step S424 indicates that frames (N−a) to (N−1) have not all been reproduced, the flow of the operations goes back to the step S421 to repeat the operations described above starting from this step. If the determination result produced by the operation carried out at the step S424 indicates that frames (N−a) to (N−1) have all been reproduced, on the other hand, the flow of the operations goes on to a step S425 at which frames of the similar-picture segment are reproduced. The flow of the operations also goes on to the step S425 if the determination result produced by the operation carried out at the step S419 indicates that the predetermined picture segment immediately preceding the similar-picture segment has been reproduced.

Subsequently, at the next step S426, the system controller 17 determines whether or not the user has entered a command to stop the digest reproduction process via the user input I/F 18. At step S426, if the determination result indicates that the user has entered a command to stop the digest reproduction process, the execution of the operations represented by the flowchart shown in FIGS. 30 and 32 is ended. Then, the recording/reproduction apparatus 500 typically enters a state of waiting for the user to enter a next command.

If the determination result produced by the operation carried out at the step S426 indicates that the user has not entered a command to stop the digest reproduction process, on the other hand, the flow of the operations goes on to a step S427 to determine whether or not the digest reproduction process to reproduce the desired program has been completed. If the determination result produced by the operation carried out at the step S427 indicates that the digest reproduction process to reproduce the desired program has been completed, the execution of the operations represented by the flowchart shown in FIGS. 30 and 32 is ended. Then, the recording/reproduction apparatus 500 typically enters a state of waiting for the user to enter a next command.

If the determination result produced by the operation carried out at the step S427 indicates that the digest reproduction process to reproduce the desired program has not been completed, on the other hand, the flow of the operations goes on to a step S428 to determine whether or not the user has entered a command to change the reproduction mode. If the determination result produced by the operation carried out at the step S428 indicates that the user has not entered a command to change the reproduction mode, the flow of the operations goes back to the step S417 to repeat the operations described above from this step. In this case, the digest reproduction process is continued in the digest reproduction mode B.

If the determination result produced by the operation carried out at the step S428 indicates that the user has entered a command to change the reproduction mode, on the other hand, the flow of the operations goes back to the step S401 of the main flowchart shown in FIG. 30 to repeat the operations described above all over again from this step.

If the determination result produced by the operation carried out at the step S417 indicates that the predetermined identification information of a similar-picture segment to be reproduced was not detected to prove that the reproduction of the similar-picture segment has been completed, the flow of the operations goes on to a step S429 of another continuation flowchart shown in FIG. 32. At this step, the digest reproduction process of a predetermined picture segment immediately following the reproduced similar-picture segment is started.

First of all, at the step S429, the system controller 17 examines the flag, which is set at the step S418, to determine whether the flag has been indeed set at 1, that is, whether or not the digest reproduction process to reproduce the segment immediately preceding the similar-picture segment and the similar-picture segment itself has been completed.

If the determination result produced by the operation carried out at the step S429 indicates that the flag has been set at 1, the flow of the operations goes on to a step S430 at which the flag is reset to 0. Then, at the next step S431, the variable n is initialized at 0. Subsequently, at the next step S432, frame (N+n) immediately following the similar-picture segment is reproduced. Then, at the next step S433, the variable n is incremented by 1.

Subsequently, the flow of the operations goes on to a step S434 to determine whether or not the variable n has exceeded a predetermined value b, that is, whether or not the digest reproduction process to reproduce a predetermined segment immediately following the similar-picture segment has been completed. If the determination result produced by the operation carried out at the step S434 indicates that the digest reproduction process to reproduce the predetermined segment has not been completed, the flow of the operations goes back to the step S432 to repeat the operations described above from this step.

If the determination result produced by the operation carried out at the step S434 indicates that the digest reproduction process to reproduce the predetermined segment immediately following the similar-picture segment has been completed, on the other hand, the flow of the operations goes on to a step S435 at which the system controller 17 determines whether or not the user has entered a command to stop the digest reproduction process via the user input I/F 18. If the determination result indicates that the user has entered a command to stop the digest reproduction process, the execution of the operations represented by the flowchart shown in FIGS. 30 and 32 is ended. Then, the recording/reproduction apparatus 500 typically enters a state of waiting for the user to enter a next command.

If the determination result produced by the operation carried out at the step S435 indicates that the user has not entered a command to stop the digest reproduction process, on the other hand, the flow of the operations goes on to a step S436 to determine whether or not the digest reproduction process to reproduce the desired program has been completed. If the determination result produced by the operation carried out at the step S436 indicates that the digest reproduction process to reproduce the desired program has been completed, the execution of the operations represented by the flowchart shown in FIGS. 30 and 32 is ended. Then, the recording/reproduction apparatus 500 typically enters a state of waiting for the user to enter a next command.

If the determination result produced by the operation carried out at the step S436 indicates that the digest reproduction process to reproduce the desired program has not been completed, on the other hand, the flow of the operations goes on to a step S437 to determine whether or not the user has entered a command to change the reproduction mode. If the determination result produced by the operation carried out at the step S437 indicates that the user has not entered a command to change the reproduction mode, the flow of the operations goes back to the step S417 of the continuation flowchart shown in FIG. 31 to repeat the operations described above from this step. In this case, the digest reproduction process is continued in the digest reproduction mode B.

If the determination result produced by the operation carried out at the step S437 indicates that the user has entered a command to change the reproduction mode, on the other hand, the flow of the operations goes back to the step S401 of the main flowchart shown in FIG. 30 to repeat the operations described above all over again from this step.

It is to be noted that, if the determination result produced by the operation carried out at the step S429 indicates that the flag has not been set at 1, on the other hand, the flow of the operations goes on to a step S438 at which the flag is reset to 0. Then, at the next step S439, frames being processed are skipped. Subsequently, the flow of the operations goes on to the step S435 as shown in FIG. 32.

It is also worth noting that, even though the above description explains the use of the digest reproduction modes A and B, the embodiment is not limited to these modes. For example, the above description is also applicable to the digest reproduction modes C and D.

In addition, if the information on the genre of a program indicates that the program is a sport program, the digest reproduction mode B or D can also be used.

<Summary of the Fifth Embodiment>

As described above, in a digest reproduction process to reproduce segments of a program from a recording medium, the recording/reproduction apparatus implemented by the fifth embodiment uses a digest reproduction mode selected thereby in accordance with the genre of the program or in accordance with information entered by the user. Thus, the digest reproduction process can be carried out effectively and with a high degree of efficiency.

In addition, even if a plurality of digest reproduction modes can be used to carry out a digest reproduction process effectively and with a high degree of efficiency, with a simple configuration of the recording/reproduction apparatus, a digest reproduction process can be carried out effectively and with a high degree of efficiency without causing the configuration to become complex.

It is to be noted that the digest reproduction mode is by no means limited to the four digest reproduction modes A, B, C and D explained earlier by referring to FIGS. 28A to 28C and 29A to 29C. That is to say, any other digest reproduction modes having a variety of reproduction patterns can also be used.

In addition, in the recording/reproduction apparatus 500 implemented by the fifth embodiment, similarity of pictures and similar-picture segments are recognized in I-picture units. However, the recognition unit is by no means limited to the I picture. For example, similarity of pictures and similar-picture segments can also be recognized in frame units. As another alternative, similarity of pictures and similar-picture segments are recognized in I-picture units while processing of others is carried out in frame units.

On top of that, in the recording/reproduction apparatus 500 implemented by the fifth embodiment, video information is classified into similar-picture segments on the basis of information on characteristics of the video information. However, the basis used in classifying the video information into similar-picture segments is by no means limited to characteristics of the video information. For example, similar-picture segments usable as summary information can also be set on the basis of an audio signal. As another alternative, similar-picture segments usable as summary information can also be set on the basis of both audio and video signals.

Sixth Embodiment

Even in the case of the fifth embodiment described above, if each of similar-picture segments included in a video signal representing a television broadcast program stored on the recording medium becomes too long, contents of the television broadcast program cannot be grasped fast even by carrying out a digest reproduction process to produce the similar-picture segments. In order to solve this problem, only a predetermined portion of every similar-picture segment is reproduced as shown in FIGS. 29B and 29C.

Nevertheless, there is also conceivably a television broadcast program including a very long continuous similar-picture segment. Examples of such a television broadcast program are a news-analysis program or a discussion program. In a news-analysis program or a discussion program, a scene showing a speaking performer continues over a long period of time. Another example is a marathon program or a relay-road race program. In such programs, a picture taken from an unchanged camera angle as a picture showing the running condition of a runner may continue over a long period of time.

In such a case, if a digest reproduction process is carried out to reproduce only a predetermined portion at the head of every similar-picture segment, it may be conceivably impossible to effectively and efficiently grasp contents of a program including the similar-picture segments reproduced in the digest reproduction process.

In order to solve this problem, in a recording/reproduction apparatus implemented by a sixth embodiment, with a simple configuration of the recording/reproduction apparatus, a digest reproduction process can be carried out effectively and efficiently without causing the configuration to become complex even if a similar-picture segment continues over a relatively long period of time.

It is to be noted that the recording/reproduction apparatus implemented by the sixth embodiment has the same configuration as the recording/reproduction apparatus 500 implemented by the fifth embodiment explained earlier by referring to FIG. 27. Thus, the recording/reproduction apparatus implemented by the sixth embodiment is explained by also referring to FIG. 27 showing the recording/reproduction apparatus 500 implemented by the fifth embodiment.

Much like the recording/reproduction apparatus 500 implemented by the fifth embodiment, the recording/reproduction apparatus 500 implemented by the sixth embodiment having a configuration shown in FIG. 27 is capable of data-compressing video and audio signals as digital signals of a television broadcast program, storing the compressed digital video and audio signals onto a recording medium and reproducing the compressed digital video and audio signals from the recording medium.

In a process to store compressed digital video and audio signals onto a recording medium, much like the other embodiments explained earlier, similar I pictures are detected and classified into similar-picture segments, and identification information is added to make each of the similar-picture segments identifiable before storing the video and audio signals onto the recording medium.

In addition, also in the case of the recording/reproduction apparatus 500 implemented by the sixth embodiment, basically, a digest reproduction process is carried out by reproducing similar-picture segments. In this case, however, the length of every similar-picture segment is taken into consideration. FIGS. 33A and 33B as well as FIGS. 34A to 34C are explanatory diagrams showing the principle of operation of the recording/reproduction apparatus 500 implemented by the sixth embodiment.

In an input picture series shown in FIG. 33A, for example, pictures 1, 2 and 3 are similar to each other, pictures 13, 14, 15, 16 and 17 are similar to each other and pictures 22, 23, 24, 25, 26, 27, 28 and 29 are similar to each other. In addition, a reproduction segment length (or a set segment length) t is set in advance as a length considered to be proper for a digest reproduction process as shown in FIG. 33A.

In accordance with this set segment length t, segments A1, A2 and A3 are taken as picture segment for a digest reproduction process as shown in FIG. 33A. If a similar-picture segment has a length greater than the set segment length t, a portion of the similar-picture segment beyond the set segment length t is examined. If the portion is longer than a predetermined interval segment length s, a part of the portion beyond the predetermined interval segment length s is taken as another additional picture segment. This other additional picture segment is also trimmed if necessary to a length not exceeding the set segment length t.

That is to say, a segment A4 shown in FIG. 33A is the other additional picture segment for a digest reproduction process. In the case of the typical input picture series shown in FIG. 33A, video signals representing the picture segments A1, A2, A3 and A4 extracted from the input picture series shown in FIG. 33A are used in a digest reproduction process as shown in FIG. 33B.

Thus, in the case of a similar-picture segment having a length exceeding the sum of the set segment length t and the predetermined interval segment length s, a plurality of picture segments used for a digest reproduction process is set. In this way, even if a program includes a long similar-picture segment, contents of the program subjected to a digest reproduction process can be grasped effectively and efficiently.

In addition, besides similar-picture segments, levels of the audio signal are also taken into consideration in setting picture segments used for a digest reproduction process as is the case with an example shown in FIGS. 34A to 34C. FIG. 34A is a diagram showing an input picture series and FIG. 34B is a diagram showing an input sound series accompanying the input picture series shown FIG. 34A.

In an input picture series shown in FIG. 34A, for example, pictures 1, 2 and 3 are similar to each other, pictures 13, 14, 15, 16, 17 and 18 are similar to each other and pictures 22, 23, 24, 25, 26, 27, 28 and 29 are similar to each other. In addition, much like the input signal series shown in FIG. 33A, a set segment length t and a predetermined interval segment length s are used in setting picture segments to be utilized for a digest reproduction process. In the case of the input picture series shown in FIG. 34A, however, a segment with an audio signal exceeding a predetermined level is preferred as a picture segment used for a digest reproduction process.

Thus, in the case of the input picture series shown in FIG. 34A, as described above, pictures 13, 14, 15, 16, 17 and 18 are similar to each other. However, the level of an audio signal for pictures 16, 17 and 18 is higher as shown in FIG. 34B. Accordingly, as a picture segment used for a digest reproduction process, a segment comprising pictures 16, 17 and 18 is set as shown in FIG. 34A.

As described above, a portion included in a similar-picture segment as a portion having audio signal exceeding a predetermined level and having a length not exceeding the set segment length t is set as a picture segment used for a digest reproduction process. In addition, if a similar-picture segment is long so that its portion set as a picture segment used for a digest reproduction process has a length greater than the set segment length t, the portion beyond the set segment length t is examined. If the portion is longer than a predetermined interval segment length s, a portion part beyond the predetermined interval segment length s is taken as another additional picture segment. This other additional picture segment is also trimmed if necessary to a length not exceeding the set segment length t.

By doing so, in the case of an input picture series shown in FIG. 34A, segments B1, B2, B3 and B4 are each set as a picture segment used for a digest reproduction process. The digest reproduction process is then carried out to reproduce the segments B1, B2, B3 and B4 consecutively as shown in FIG. 34C.

It is to be noted that, in the case of a long similar-picture segment like the ones shown in FIGS. 33A and 34A, a plurality of picture segments used for a digest reproduction process is set and a skip segment having a length equal to the predetermined interval segment length s is resulted in within the similar-picture segment.

<Operations and Configuration of the Recording/Reproduction Apparatus 500 Implemented by the Sixth Embodiment>

Operations and configuration of the recording/reproduction apparatus 500 implemented by the fifth embodiment shown in FIG. 27 are explained. Operations carried out by a recording system of the sixth embodiment are the same as those in the fifth embodiment explained before. If the level of an audio signal is taken into consideration as explained earlier by referring to FIGS. 34A to 34C, however, the audio classification process unit 20 supplies identification information for identifying an audio-signal segment having an audio-signal level at least equal to a predetermined level to the multiplexing unit 6. The multiplexing unit 6 also adds this identification information to multiplexed data so that a picture segment in a similar-picture segment can be recognized as a picture segment corresponding to an audio-signal segment having an audio-signal level at least equal to the predetermined level.

In addition, operations carried out by a reproduction system of the sixth embodiment are also the same as those in the fifth embodiment explained before. Furthermore, when a command making a request for execution of a digest reproduction process is received, in order to carry out the digest reproduction process, a signal of picture segments for the digest reproduction process is read out from the recording medium 8 in accordance with control executed by the reproduction control unit 9, which is controlled by the system controller 17 as a part of multiplexed data. The multiplexed data has been recorded on the recording medium 8 along with identification information added to the multiplexed data as information for identifying similar-picture segments included in the multiplexed data as a result of classification processing. In this case, if a similar-picture segment has a length greater than the set segment length t, processing to skip a portion with duration equal to the interval segment length s is carried out.

On top of that, signals including a predetermined time stamp signal detected by the identification-signal detection unit 16 are supplied to the system controller 17, which then detects a reproduction point of time from these signals in order to display the present reproduction position on the classification display unit 19 and display a picture scene at a skipped point as a representative picture on the classification display unit 19 or the like. In this way, it is possible to make a digest reproduction process easily understandable to the user.

<Operations of the Recording/Reproduction Apparatus 500 Implemented by the Sixth Embodiment>

Figure 35:
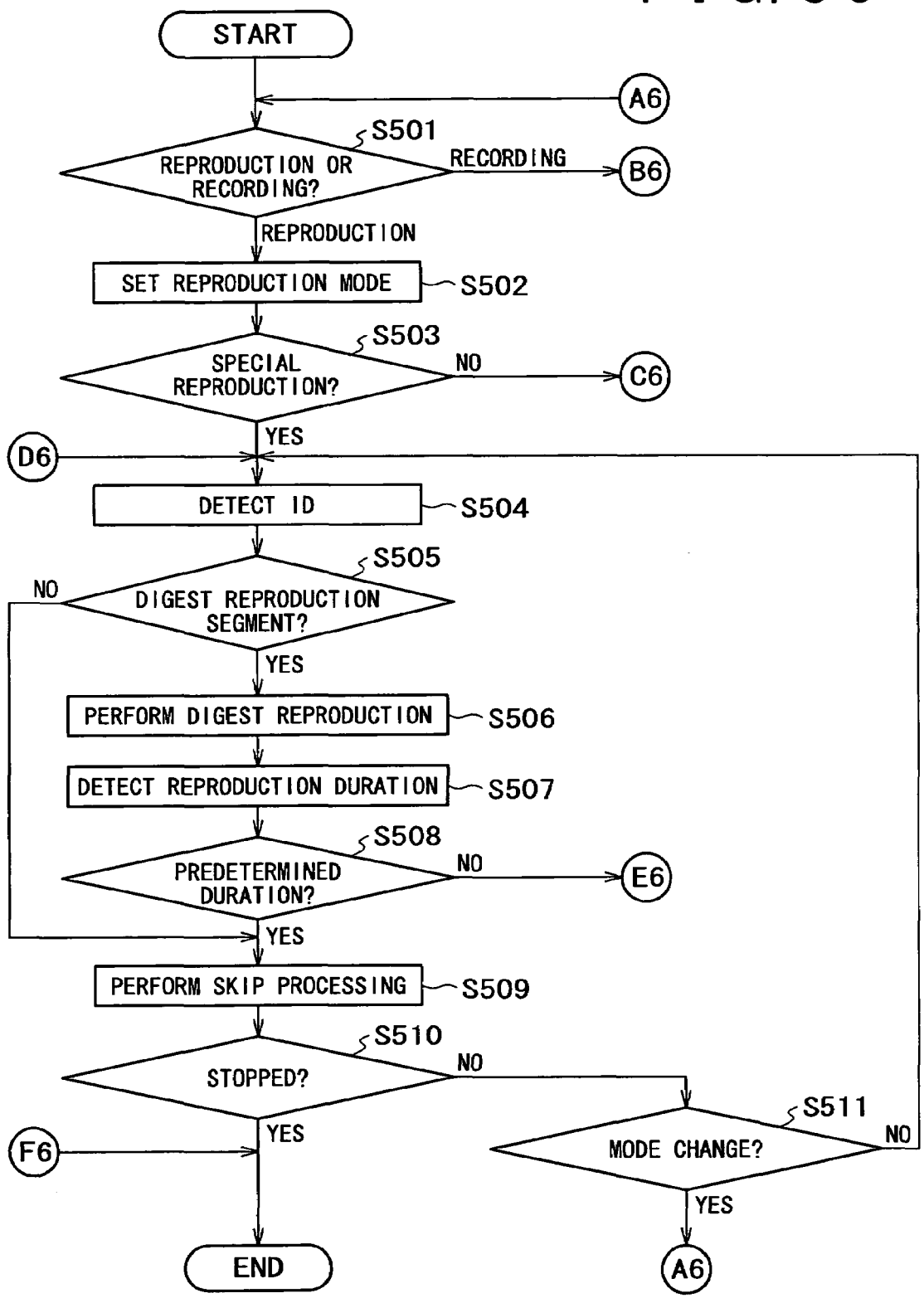
FIG. 35 shows a flowchart referred to in explanation of operations carried out by the recording/reproduction apparatus implemented by the sixth embodiment shown in FIG. 27.

By referring to a flowchart shown in FIGS. 35 and 36, the following description explains operations carried out by the recording/reproduction apparatus 500 of the sixth embodiment during reproduction and recording processes. The operations represented by the flowchart shown in FIGS. 35 and 36 are processing carried out by the recording/reproduction apparatus 500 when the user enters a command making a request for execution of a reproduction or recording process via the user input I/F 18.

It is to be noted that, in the case of a requested reproduction process, in the following description, it is assumed that multiplexed data has already been stored on the recording medium 8 along with the same identification information for every similar-picture segment obtained as a result of similarity classification processing.

When the user enters a command making a request for a reproduction or recording process, the flowchart begins with a step S501 at which the system controller 17 determines whether the command is a command requesting a reproduction or recording process. If the determination result produced by the operation carried out at the step S501 indicates that the command is a command making a request for a reproduction process, the flow of the operations goes on to a step S502 at which the system controller 17 controls components of the recording/reproduction apparatus 500 to put the recording/reproduction apparatus 500 in a reproduction mode to start an operation to read out multiplexed data of a desired program from the recording medium 8.

Then, at the next step S503, the reproduction command is further examined to determine whether or not the requested reproduction process is a special, that is a digest reproduction process. If the determination result produced by the operation carried out at the step S503 indicates that the requested reproduction process is a digest reproduction process, the flow of the operations goes on to a step S504 at which identification information of the multiplexed data to be reproduced through the identification-signal detection unit 16 is detected. Thereby, the flow of the operations goes on to a step S505 to determine whether or not the information signal to be reproduced is multiplexed data of a picture segment for a digest reproduction process.

If the determination result produced by the operation carried out at the step S505 indicates that the information signal to be reproduced is multiplexed data of a picture segment for a digest reproduction process, the flow of the operations goes on to a step S506 at which the digest reproduction process is carried out by reproducing the multiplexed data, and then, at the next step S507, the length of a lapsing reproduction time is detected.

Subsequently, the flow of the operations goes on to a step S508 to determine whether or not a length detected at the step S507 as the length of the lapsing reproduction time has become equal to the set segment length t. If the determination result produced by the operation carried out at the step S508 indicates that data of the length equal to the set segment length t has been reproduced, the flow of the operations goes on to a step S509 at which an operation to skip the interval segment length s is carried out. Subsequently, the flow of the operations goes on to a step S510 to determine whether or not the user has entered a command to stop the digest reproduction process.

If the determination result produced by the operation carried out at the step S510 indicates that the user has not entered a command to stop the digest reproduction process, the flow of the operations goes on to a step S511 to determine whether or not the user has entered a command to change the operation mode. If the determination result produced by the operation carried out at the step S511 indicates that the user has not entered a command to change the operation mode, the flow of the operations goes back to the step S504 to repeat the operations described above from this step. In this way, the digest reproduction process is continued.

If the determination result produced by the operation carried out at the step S511 indicates that the user has entered a command to change the operation mode, on the other hand, the flow of the operations goes back to the step S501 to repeat the operations described above all over again from this step. In this way, it is possible to carry out an ordinary reproduction process to reproduce a program from the recording medium, a digest reproduction process to reproduce a program from the recording medium or a recording process to store a program onto the recording medium in accordance with a command entered by the user.

If the determination result produced by the operation carried out at the step S510 indicates that the user has entered a command to stop the digest reproduction process, on the other hand, the system controller 17 ends the execution of the operations represented by the flowchart shown in FIGS. 35 and 36. Then, the recording/reproduction apparatus 500 typically enters a state of waiting for the user to enter a next command.

If the determination result produced by the operation carried out at the step S508 indicates that the digest reproduction process to reproduce data of the length equal to the set segment length t has not been completed, on the other hand the flow of the operations goes on to a step S512 of a continuation flowchart shown in FIG. 36 to determine whether or not the user has entered a command to stop the digest reproduction process.

If the determination result produced by the operation carried out at the step S512 indicates that the user has not entered a command to stop the digest reproduction process, the flow of the operations goes on to a step S513 to determine whether or not the user has entered a command to change the operation mode. If the determination result produced by the operation carried out at the step S513 indicates that the user has not entered a command to change the operation mode, the flow of the operations goes back to the step S504 of the main flowchart shown in FIG. 35 to repeat the operations described above from this step. In this way, the digest reproduction process is continued.

If the determination result produced by the operation carried out at the step S513 indicates that the user has entered a command to change the operation mode, on the other hand, the flow of the operations goes back to the step S501 of the main flowchart shown in FIG. 35 to repeat the operations described above all over again from this step. In this way, it is possible to carry out an ordinary reproduction process to reproduce a program from the recording medium, a digest reproduction process to reproduce a program from the recording medium or a recording process to store a program onto the recording medium in accordance with a command entered by the user.

If the determination result produced by the operation carried out at the step S512 indicates that the user has entered a command to stop the digest reproduction process, on the other hand, the system controller 17 ends the execution of the operations represented by the flowchart shown in FIGS. 35 and 36. Then, the recording/reproduction apparatus 500 typically enters a state of waiting for the user to enter a next command.

If the determination result produced by the operation carried out at the step S501 indicates that the command is a command making a request for a recording process, on the other hand, the flow of the operations goes on to a step S514 of the continuation flowchart shown in FIG. 36. At the step S514, the system controller 17 controls components of the recording/reproduction apparatus 500 to put the recording/reproduction apparatus 500 in a recording mode to start an operation to store supplied video and audio signals onto the recording medium 8.

Then, the flow of the operations goes on to a step S515 to determine whether or not the user has entered a command to stop the recording process. If the determination result produced by the operation carried out at the step S515 indicates that the user has not entered a command to stop the recording process, the flow of the operations goes on to a step S516 to determine whether or not the user has entered a command to change the operation mode.

If the determination result produced by the operation carried out at the step S516 indicates that the user has not entered a command to change the operation mode, the flow of the operations goes back to the step S514 to repeat the operations described above from this step. In this way, the recording process is continued.

If the determination result produced by the operation carried out at the step S516 indicates that the user has entered a command to change the operation mode, on the other hand, the flow of the operations goes back to the step S501 of the main flowchart shown in FIG. 35 to repeat the operations described above all over again from this step. In this way, it is possible to carry out an ordinary reproduction process to reproduce a program from the recording medium, a digest reproduction process to reproduce a program from the recording medium or a recording process to store a program onto the recording medium in accordance with a command entered by the user.

If the determination result produced by the operation carried out at the step S514 indicates that the user has entered a command to stop the recording process, on the other hand, the system controller 17 ends the execution of the operations represented by the flowchart shown in FIGS. 35 and 36. Then, the recording/reproduction apparatus 500 typically enters a state of waiting for the user to enter a next command.

If the determination result produced by the operation carried out at the step S503 of the main flowchart shown in FIG. 35 indicates that the requested reproduction process is not a digest reproduction process, on the other hand, the flow of the operations goes on to a step S517 of the continuation flowchart shown in FIG. 36. At this step, the system controller 17 controls components of the recording/reproduction apparatus 500 to put the recording/reproduction apparatus 500 in an ordinary reproduction mode to start an ordinary reproduction process to reproduce multiplexed data of a desired program from the recording medium 8.

Subsequently, the flow of the operations goes on to a step S518 to determine whether or not the user has entered a command to stop the ordinary reproduction process. If the determination result produced by the operation carried out at the step S518 indicates that the user has not entered a command to stop the ordinary reproduction process, the flow of the operations goes on to a step S519 to determine whether or not the user has entered a command to change the operation mode.

If the determination result produced by the operation carried out at the step S519 indicates that the user has not entered a command to change the operation mode, the flow of the operations goes back to the step S517 to repeat the operations described above from this step. In this way, the digest reproduction process is continued.

If the determination result produced by the operation carried out at the step S519 indicates that the user has entered a command to change the operation mode, on the other hand, the flow of the operations goes back to the step S501 of the main flowchart shown in FIG. 35 to repeat the operations described above all over again from this step. In this way, it is possible to carry out an ordinary reproduction process to reproduce a program from the recording medium, a digest reproduction process to reproduce a program from the recording medium or a recording process to store a program onto the recording medium in accordance with a command entered by the user.

If the determination result produced by the operation carried out at the step S517 indicates that the user has entered a command to stop the ordinary reproduction process, on the other hand, the system controller 17 ends the execution of the operations represented by the flowchart shown in FIGS. 35 and 36. Then, the recording/reproduction apparatus 500 typically enters a state of waiting for the user to enter a next command.

<Summary of the Sixth Embodiment>

As described above, in the recording/reproduction apparatus implemented by the sixth embodiment, even if a relatively long similar-picture segment exists in a recorded program, a digest reproduction process can be carried out by properly setting a picture segment for the digest reproduction process so as that the user can grasp contents of the program effectively and efficiently.

It is to be noted that the user is of course allowed to determine the set segment length t and the interval segment length s in advance or with a proper timing.

<Others>

In the first to sixth embodiments, the picture similarity processing and the processing to create similar-picture segments are based on I-picture units of compressed MPEG data. However, the basis of these pieces of processing is by no means limited to I pictures of compressed MPEG data. For example, characteristics can also be detected for each frame of pre-compression data and similar-picture segments are then generated on the basis of the detected characteristics.

In addition, it is also possible to provide a recording/reproduction apparatus with a configuration including all functions of the recording/reproduction apparatus implemented by the first to sixth embodiments or a configuration including functions of only properly selected two or more recording/reproduction apparatus implemented by the first to sixth embodiments.

On top of that, the recording medium 8 of the recording/reproduction apparatus is by no means limited to a magnetic disk such as a hard disk, but the recording medium 8 can be any kind of random accessible-recording medium having a relatively large storage capacity such as an optical disk, a magneto-optical disk or a semiconductor memory.

Furthermore, apparatus implemented by the embodiments described above are by no means limited to recording/reproduction apparatus, but the apparatus can also be, among others, a network-type home server connected to various kinds of home electronic equipment such as a communication apparatus and a broadcast-use receiving apparatus.

Moreover, the present invention can also be used as a method for controlling reproduction of information such as video and audio information by using data including the aforementioned shrunk pictures (or thumb-nail pictures), the summary information cited above and the aforementioned identifications for associating the shrunk pictures and the summary information with principal information as the so-called meta data.

INDUSTRIAL APPLICABILITY

A digital information signal recorded on a recording medium having a large storage capacity can be utilized effectively and efficiently, and efficient utilization of the recording medium can also be promoted. In addition, it is possible to provide an information-signal process apparatus offering much convenience to the user.

The invention claimed is:

1. An information-signal process apparatus comprising:
   characteristic information detection means for detecting information on characteristics of a first information signal to be recorded for each predetermined processing unit of said first information signal;
   identification information generation means for generating identification information for identifying a predetermined signal segment of said first information signal on the basis of a detection result produced by said characteristic information detection means; and
   recording means for recording said first information signal in a first recording area of a recording medium and a second information signal in a second recording area of said recording medium wherein:
   said first and second recording areas are set in accordance with a recording method determined in advance for said recording medium; and
   said second information signal is an information signal included in said first information signal as an information signal in said predetermined signal segment identified by said identification information,
   wherein said information-signal process apparatus further having selection-input reception means for receiving a selection input specifying a selected recording method, wherein said recording means:
   sets said first and second recording areas in said recording medium in accordance with a selected recording method specified by a selection input received by said selection-input reception means; and
   stores a first information signal in said first recording area and a second information signal in said second recording area.

2. The information-signal process apparatus according to claim 1 wherein said recording means records a plurality of said first information signals in said first recording area having a variable storage size for accommodating said first information signals as a cluster of said first information signals and a plurality of said second information signals in said second recording area having a variable storage size for accommodating said second information signals as a cluster of said second information signals.

3. The information-signal process apparatus according to claim 1 wherein said recording means provides said first recording area for recording only one piece of said first information signal and said second recording area for recording only one piece of said second information signal, and records said piece of said first information signal and said piece of said second information signal in said first and second recording areas, respectively.

4. The information-signal process apparatus according to claim 1 wherein said selected recording method can be at least:
   a first recording method of recording a plurality of said first information signals in said first recording area having a variable storage size for accommodating said first information signals as a cluster of said first information signals and a plurality of said second information signals in said second recording area having a variable storage size for accommodating said second information signals as a cluster of said second information signals; or
   a second recording method of providing said first recording area for recording only one piece of said first information signal and said second recording area adjacent to said first recording area as an area for recording only one piece of said second information signal to form an alternating arrangement, and recording said piece of said first information signal and said piece of said second information signal in said first and second recording areas, respectively.

5. An information-signal process apparatus comprising:
   characteristic information detection means for detecting information on characteristics of a first information signal to be recorded for each predetermined processing unit of said first information signal;
   identification information generation means for generating identification information for identifying a predetermined signal segment of said first information signal on the basis of a detection result produced by said characteristic information detection means; and
   recording means for recording said first information signal in a first recording area of a recording medium and a second information signal in a second recording area of said recording medium wherein:
   said first and second recording areas are set in accordance with a recording method determined in advance for said recording medium; and
   said second information signal is an information signal included in said first information signal as an information signal in said predetermined signal segment identified by said identification information;
   storage-size detection means for detecting the storage size of a free area left in said recording medium; and
   recording control means for executing control to record a most recent first information signal in a sub-area included in said first recording area as a sub-area for recording a least recent first information over said least recent first information without eroding said second recording area in case a detection result produced by said storage-size detection means indicates that the storage size of a free area left in said recording medium is not large enough for storing said least recent first information signal in a process to record said first information signal onto said recording medium.

6. An information-signal process method, executed by a processor, comprising the steps of
   detecting information on characteristics of a first information signal to be recorded for each predetermined processing unit of said first information signal;
   generating identification information for identifying a predetermined information signal of said first information signal on the basis of said detected information on characteristics of said first information signal; and
   recording said first information signal in a first recording area of a recording medium and a second information signal in a second recording area of said recording medium wherein:

said first and second recording areas are set in accordance with a recording method determined in advance for said recording medium; and said second information signal is said predetermined information signal identified by said identification information and located in a predetermined signal segment of said first information signal;

receiving a selection input specifying a selected recording method;

setting said first and second recording areas in said recording medium in accordance with a selected recording method specified by said selection input specifying said selected recording method; and recording a first information signal in said first recording area and a second information signal in said second recording area.

7. The information-signal process method according to claim 6 whereby a plurality of said first information signals is recorded in said first recording area having a variable storage size for accommodating said first information signals as a cluster of said first information signals and a plurality of said second information signals is recorded in said second recording area having a variable storage size for accommodating said second information signals as a cluster of said second information signals.

8. The information-signal process method according to claim 6 wherein said first recording area for recording only one piece of said first information signal and said second recording area for recording only one piece of said second information signal are provided, and said piece of said first information signal and said piece of said second information signal are recorded in said first and second recording areas, respectively.

9. The information-signal process method according to claim 6, wherein said selected recording method can be at least:

a first recording method of recording a plurality of said first information signals in said first recording area having a variable storage size for accommodating said first information signals as a cluster of said first information signals and a plurality of said second information signals in said second recording area having a variable storage size for accommodating said second information signals as a cluster of said second information signals; or a second recording method of providing said first recording area for recording only one piece of said first information signal and said second recording area adjacent to said first recording area as an area for recording only one piece of said second information signal to form an alternating arrangement and recording said piece of said first information signal and said piece of said second information signal in said first and second recording areas, respectively.

10. An information-signal process method, executed by a processor, comprising the steps of detecting information on characteristics of a first information signal to be recorded for each predetermined processing unit of said first information signal;

generating identification information for identifying a predetermined information signal of said first information signal on the basis of said detected information on characteristics of said first information signal; and recording said first information signal in a first recording area of a recording medium and a second information signal in a second recording area of said recording medium wherein:

said first and second recording areas are set in accordance with a recording method determined in advance for said recording medium;

said second information signal is said predetermined information signal identified by said identification information and located in a predetermined signal segment of said first information signal;

detecting the storage size of a free area left in said recording medium; and executing control to record a most recent first information signal in a sub-area included in said first recording area as a sub-area for recording a least recent first information over said least recent first information without eroding said second recording area in case a detection result produced by said storage-size detection means indicates that the storage size of a free area left in said recording medium is not large enough for storing said least recent first information signal in a process to record said first information signal onto said recording medium.

11. An information-signal process apparatus comprising:

characteristic information detection means for detecting information on characteristics of a first information signal to be recorded for each predetermined processing unit of said first information signal;

identification information generation means for generating identification information for identifying a predetermined information signal of said first information signal on the basis of a detection result produced by said characteristic information detection means;

identification information addition means for adding said identification information generated by said identification information generation means to said first information signal;

first recording means for recording said first information signal including said identification information added thereto by said identification information addition means onto a first recording medium;

storage-size detection means for detecting the storage size of a free area left in said first recording medium with a predetermined timing; and second recording means for moving all data of one or more said first information signals from said first recording medium to a second recording medium and leaving an information signal, which is stored in a signal segment included in each of said moved first information signals and identified by said identification, in said first recording medium as a second information signal in case a detection result produced by said storage-size detection means indicates that the storage size of a free area left in said recording medium is equal to or smaller than a predetermined value.

12. An information-signal process apparatus comprising:

characteristic information detection means for detecting information on characteristics of a first information signal to be recorded for each predetermined processing unit of said first information signal;

identification information generation means for generating an identification information for identifying a predetermined information signal of said first information signal on the basis of a detection result produced by said characteristic information detection means;

first recording means for recording said first information signal onto a first recording medium along with a second information signal, which is said predetermined information signal identified by said identification information and included in said first information signal;

storage-size detection means for detecting the storage size of a free area left in said first recording medium with a predetermined timing; and second recording means for moving only one or more said first information signals from said first recording medium to a second recording medium in case a detection result produced by said storage-size detection means indicates that the storage size of a free area left in said recording medium is smaller than a predetermined value.

13. An information-signal process method, executed by a processor, comprising the steps of:

detecting information on characteristics of a first information signal to be recorded for each predetermined processing unit of said first information signal;

generating identification information for identifying a predetermined information signal of said first information signal on the basis of said detected information on characteristics of said first information signal;

adding said generated identification to said first information signal;

recording said first information signal including said identification information added thereto onto a first recording medium;

detecting the storage size of a free area left in said first recording medium with a predetermined timing; and moving all data of one or more said first information signals from said first recording medium to a second recording medium and leaving an information signal, which is stored in a signal segment included in each of said moved first information signals and identified by said identification information, in said first recording medium as a second information signal in case a detection result indicates that the storage size of a free area left in said first recording medium is smaller than a predetermined value.

14. An information-signal process method, executed by a processor, comprising the steps of:

detecting information on characteristics of a first information signal to be recorded for each predetermined processing unit of said first information signal;

generating identification information for identifying a predetermined information signal of said first information signal on the basis of said detected information on characteristics of said first information signal;

recording said first information signal onto a first recording medium along with a second information signal, which is said predetermined information signal identified by said identification information and included in said first information signal;

detecting the storage size of a free area left in said first recording medium with a predetermined timing; and moving only all or a portion of one or more said first information signals from said first recording medium to a second recording medium in case a detection result indicates that the storage size of a free area left in said first recording medium is smaller than a predetermined value.

15. An information-signal process apparatus for reproducing an information signal recorded onto a recording medium after completing processes of detecting characteristics of said information signal for each predetermined processing unit, classifying segments of said information signal into similar-picture segments exhibiting similarity of said characteristics on the basis of said detected characteristics and adding identifications for identifying said classified segments to said information signal, said information-signal process apparatus comprising:

execution-command-input reception means for receiving a command input making a request for execution of a special reproduction process;

read means for reading out said information signal being reproduced from said recording medium; and reproduction control means for executing control to reproduce portions of each of said classified segments, which are read out by said read means from said recording medium as segments of said information signal, from said recording medium upon reception of said command input making a request for execution of a special reproduction process through said execution-command-input reception means, wherein said portions reproduced from said recording medium each have a length equal to a predetermined set segment length and are separated from each other by a predetermined interval segment length.

16. The information-signal process apparatus according to claim 15, further having important-segment detection means for detecting an important segment among segments included in said information signal as said segments exhibiting similarity of said characteristics, wherein said reproduction control means sets such a reproduction segment that said reproduction segment has a length equal to said predetermined set segment length and includes said important segment detected by said important-segment detection means.

17. An information-signal process method, executed by a processor, for reproducing an information signal recorded onto a recording medium after completing processes of detecting characteristics of said information signal for each predetermined processing unit, classifying segments of said information signal into similar-picture segments exhibiting similarity of said characteristics on the basis of said detected characteristics and adding identifications for identifying said classified segments to said information signal, said information-signal process method comprising the steps of:

receiving a command input making a request for execution of a special reproduction process;

reading out said information signal being reproduced from said recording medium upon reception of said command input making a request for execution of a special reproduction process; and executing control to reproduce portions of each of said classified segments, which are read out from said recording medium as segments of said information signal, from said recording medium upon reception of said command input making a request for execution of a special reproduction process, wherein said portions reproduced from said recording medium each have a length equal to a predetermined set segment length and are separated from each other by a predetermined interval segment length.

18. The information-signal process method according to claim 17, further having the step of detecting an important segment among segments included in said information signal, whereby such a reproduction segment is set that said reproduction segment has a length equal to said predetermined set segment length and includes said detected important segment detected by said important-segment detection means.

* * * * *

UNITED STATES PATENT AND TRADEMARK OFFICE
CERTIFICATE OF CORRECTION

| | | |
|---|---|---|
| PATENT NO. | : 7,630,613 B2 | Page 1 of 1 |
| APPLICATION NO. | : 10/501840 | |
| DATED | : December 8, 2009 | |
| INVENTOR(S) | : Murabayashi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1297 days.

Signed and Sealed this

Second Day of November, 2010

David J. Kappos
*Director of the United States Patent and Trademark Office*